(12) United States Patent
Jon et al.

(10) Patent No.: US 10,445,425 B2
(45) Date of Patent: Oct. 15, 2019

(54) EMOJI AND CANNED RESPONSES

(71) Applicant: Apple Inc., Cupertino, CA (US)

(72) Inventors: Tiffany S. Jon, Sunnyvale, CA (US); Imran Chaudhri, San Francisco, CA (US); Chanaka G. Karunamuni, San Jose, CA (US); Kenneth Kocienda, San Jose, CA (US); Giancarlo Yerkes, Menlo Park, CA (US); Woo-Ram Lee, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/188,081

(22) Filed: Jun. 21, 2016

(65) Prior Publication Data

US 2017/0075878 A1   Mar. 16, 2017

Related U.S. Application Data

(60) Provisional application No. 62/219,051, filed on Sep. 15, 2015.

(51) Int. Cl.
*G06F 17/22*   (2006.01)
*G06F 17/27*   (2006.01)
(Continued)

(52) U.S. Cl.
CPC ........ *G06F 17/276* (2013.01); *G06F 3/04886* (2013.01); *G06F 17/2765* (2013.01); *H04M 1/72552* (2013.01); *G06F 16/48* (2019.01)

(58) Field of Classification Search
CPC .... G06F 3/018; G06F 17/276; G06F 17/2785; G06F 17/2795; G06F 3/04886; G06F 17/2765; G06F 16/48; H04M 1/72552
See application file for complete search history.

(56) References Cited

U.S. PATENT DOCUMENTS 5,761,646 A   6/1998   Frid-Nielsen et al.
5,946,647 A   8/1999   Miller et al.
(Continued)

FOREIGN PATENT DOCUMENTS

AU   2015100705 A4   6/2015
CN   1248744 A   3/2000
(Continued)

OTHER PUBLICATIONS

Dunlop et al. "Text Input on a Smart Watch", IEEE, 2014, pp. 50-57.*

(Continued)

*Primary Examiner* — Maikhanh Nguyen
(74) *Attorney, Agent, or Firm* — Dentons US LLP

(57) ABSTRACT

At an electronic device, detect a first input on the touch-sensitive surface that represents selection of a first ideogram. Identify at least one attribute of the first ideogram. Select a plurality of suggested one or more characters to display, where at least a first set of suggested one or more characters is selected based on a set of selection criteria, the set of selection criteria including the identified at least one attribute of the first ideogram. Display at least the first set of suggested one or more characters. Detect a second input on the touch-sensitive surface that represents selection of the displayed first set of suggested one or more characters. In response to detecting the second input, displaying a composed electronic message, the composed electronic message including the first ideogram and the selected first set of suggested one or more characters.

21 Claims, 37 Drawing Sheets

(51) Int. Cl.
*H04M 1/725* (2006.01)
*G06F 3/0488* (2013.01)
*G06F 16/48* (2019.01)

(56) References Cited

U.S. PATENT DOCUMENTS

| | | | |
|---|---|---|---|
| 5,949,647 A | 9/1999 | Kolman et al. | |
| 6,323,846 B1 | 11/2001 | Westerman et al. | |
| 6,349,299 B1 | 2/2002 | Spencer et al. | |
| 6,570,557 B1 | 5/2003 | Westerman et al. | |
| 6,629,793 B1* | 10/2003 | Miller | G06F 3/0219 400/103 |
| 6,677,932 B1 | 1/2004 | Westerman | |
| 6,987,991 B2* | 1/2006 | Nelson | H04M 1/72547 340/7.56 |
| 6,990,452 B1* | 1/2006 | Ostermann | G06F 17/241 345/473 |
| 7,167,731 B2* | 1/2007 | Nelson | H04M 1/72547 340/7.56 |
| 7,209,916 B1 | 4/2007 | Seshadri et al. | |
| 7,419,469 B2* | 9/2008 | Vacca | G06Q 50/22 600/437 |
| 7,480,870 B2 | 1/2009 | Anzures et al. | |
| 7,502,606 B2 | 3/2009 | Flynt et al. | |
| 7,573,984 B2 | 8/2009 | Ger et al. | |
| 7,657,849 B2 | 2/2010 | Chaudhri et al. | |
| 7,669,135 B2* | 2/2010 | Cunningham | G06F 3/0219 455/466 |
| 7,730,143 B1 | 6/2010 | Appelman | |
| 7,890,996 B1 | 2/2011 | Chauhan et al. | |
| 7,903,801 B1 | 3/2011 | Ruckart | |
| 8,069,166 B2 | 11/2011 | Alvarado et al. | |
| 8,074,172 B2 | 12/2011 | Kocienda et al. | |
| 8,078,978 B2 | 12/2011 | Perry et al. | |
| 8,232,973 B2 | 7/2012 | Kocienda et al. | |
| 8,255,810 B2* | 8/2012 | Moore | G06F 3/04817 715/752 |
| RE43,835 E | 11/2012 | Knight et al. | |
| 8,423,577 B1 | 4/2013 | Lee et al. | |
| 8,502,856 B2 | 8/2013 | Cranfill et al. | |
| 8,539,382 B2 | 9/2013 | Lyon et al. | |
| 8,543,927 B1* | 9/2013 | McKinley | H04M 1/72552 715/753 |
| 8,832,584 B1 | 9/2014 | Agarwal et al. | |
| 8,893,023 B2 | 11/2014 | Perry et al. | |
| 8,903,718 B2 | 12/2014 | Akuwudike | |
| 8,930,820 B1 | 1/2015 | Elwell et al. | |
| 8,996,639 B1 | 3/2015 | Faaborg et al. | |
| 9,015,149 B2 | 4/2015 | Lucovsky et al. | |
| 9,213,754 B1 | 12/2015 | Zhang et al. | |
| 9,246,870 B2 | 1/2016 | Parker et al. | |
| 9,460,290 B2 | 10/2016 | Glew et al. | |
| 9,665,574 B1 | 5/2017 | Rose | |
| 9,817,436 B2 | 11/2017 | Christie et al. | |
| 9,819,768 B2 | 11/2017 | Toledo et al. | |
| 9,928,272 B1 | 3/2018 | Niyogi et al. | |
| 10,013,601 B2* | 7/2018 | Ebersman | G06K 9/00308 |
| 2002/0015024 A1 | 2/2002 | Westerman et al. | |
| 2003/0078981 A1 | 4/2003 | Harms et al. | |
| 2003/0115189 A1 | 6/2003 | Srinivasa et al. | |
| 2003/0158855 A1 | 8/2003 | Farnham et al. | |
| 2003/0158860 A1 | 8/2003 | Caughey | |
| 2004/0054736 A1 | 3/2004 | Daniell et al. | |
| 2004/0066404 A1 | 4/2004 | Malik et al. | |
| 2004/0109025 A1 | 6/2004 | Hullot et al. | |
| 2004/0186848 A1 | 9/2004 | Kobashikawa et al. | |
| 2005/0081150 A1* | 4/2005 | Beardow | H04M 1/27455 715/256 |
| 2005/0131888 A1 | 6/2005 | Tafoya et al. | |
| 2005/0156873 A1* | 7/2005 | Walter | H04L 51/04 345/156 |
| 2005/0190059 A1 | 9/2005 | Wehrenberg | |
| 2005/0197846 A1 | 9/2005 | Pezaris et al. | |
| 2005/0204007 A1 | 9/2005 | Mcgregor et al. | |
| 2006/0017692 A1 | 1/2006 | Wehrenberg et al. | |
| 2006/0025091 A1 | 2/2006 | Buford | |
| 2006/0053386 A1* | 3/2006 | Kuhl | G06F 3/0236 715/773 |
| 2006/0080276 A1 | 4/2006 | Suzuki et al. | |
| 2006/0184584 A1 | 8/2006 | Dunn et al. | |
| 2006/0206713 A1 | 9/2006 | Hickman et al. | |
| 2006/0267931 A1 | 11/2006 | Vainio et al. | |
| 2007/0002077 A1* | 1/2007 | Gopalakrishnan | H04N 1/00307 345/619 |
| 2007/0064882 A1 | 3/2007 | Ger et al. | |
| 2007/0100898 A1 | 5/2007 | Petras et al. | |
| 2007/0125860 A1 | 6/2007 | Lapstun et al. | |
| 2007/0162454 A1 | 7/2007 | D et al. | |
| 2007/0171924 A1 | 7/2007 | Eisner et al. | |
| 2008/0009300 A1 | 1/2008 | Vuong | |
| 2008/0122796 A1 | 5/2008 | Jobs et al. | |
| 2008/0126075 A1 | 5/2008 | Thorn | |
| 2008/0126314 A1 | 5/2008 | Thorn | |
| 2008/0133479 A1 | 6/2008 | Zelevinsky et al. | |
| 2008/0168144 A1 | 7/2008 | Lee | |
| 2008/0207184 A1 | 8/2008 | Wassingbo et al. | |
| 2008/0208812 A1 | 8/2008 | Quoc et al. | |
| 2008/0235242 A1 | 9/2008 | Swanburg et al. | |
| 2008/0261569 A1 | 10/2008 | Britt et al. | |
| 2008/0270559 A1 | 10/2008 | Milosavljevic | |
| 2008/0281643 A1 | 11/2008 | Wertheimer et al. | |
| 2009/0040875 A1 | 2/2009 | Buzescu et al. | |
| 2009/0089342 A1 | 4/2009 | Runstedler et al. | |
| 2009/0106695 A1 | 4/2009 | Perry et al. | |
| 2009/0149204 A1 | 6/2009 | Riley et al. | |
| 2009/0158173 A1 | 6/2009 | Palahnuk et al. | |
| 2009/0219166 A1 | 9/2009 | Macfarlane et al. | |
| 2009/0248415 A1 | 10/2009 | Jablokov et al. | |
| 2009/0284471 A1 | 11/2009 | Longe et al. | |
| 2009/0292690 A1 | 11/2009 | Culbert | |
| 2009/0305730 A1 | 12/2009 | Herz et al. | |
| 2009/0306969 A1 | 12/2009 | Goud et al. | |
| 2009/0319288 A1 | 12/2009 | Slaney et al. | |
| 2010/0082239 A1 | 4/2010 | Hardy et al. | |
| 2010/0088302 A1 | 4/2010 | Block | |
| 2010/0112989 A1 | 5/2010 | Andreasson | |
| 2010/0123724 A1* | 5/2010 | Moore | G06F 3/04817 345/473 |
| 2010/0125785 A1* | 5/2010 | Moore | G06F 3/04817 715/702 |
| 2010/0138933 A1 | 6/2010 | Yamashita et al. | |
| 2010/0144323 A1 | 6/2010 | Collins et al. | |
| 2010/0175001 A1 | 7/2010 | Lazarus et al. | |
| 2010/0248757 A1 | 9/2010 | Baek | |
| 2010/0287241 A1 | 11/2010 | Swanburg et al. | |
| 2010/0291948 A1 | 11/2010 | Wu et al. | |
| 2010/0312838 A1 | 12/2010 | Lyon et al. | |
| 2010/0323730 A1 | 12/2010 | Karmarkar | |
| 2011/0009109 A1* | 1/2011 | Hyon | H04M 1/72544 455/418 |
| 2011/0047492 A1 | 2/2011 | Bostrom et al. | |
| 2011/0072394 A1 | 3/2011 | Victor | |
| 2011/0093328 A1 | 4/2011 | Woolcott | |
| 2011/0105190 A1 | 5/2011 | Cha et al. | |
| 2011/0141493 A1 | 6/2011 | Berger et al. | |
| 2011/0161878 A1 | 6/2011 | Stallings et al. | |
| 2011/0184768 A1 | 7/2011 | Norton et al. | |
| 2011/0201387 A1 | 8/2011 | Paek et al. | |
| 2011/0252351 A1 | 10/2011 | Sikora et al. | |
| 2011/0294525 A1* | 12/2011 | Jonsson | G06F 17/27 455/466 |
| 2011/0302249 A1 | 12/2011 | Orr et al. | |
| 2012/0030194 A1 | 2/2012 | Jain | |
| 2012/0079373 A1 | 3/2012 | Kocienda et al. | |
| 2012/0084340 A1 | 4/2012 | McCormack et al. | |
| 2012/0096389 A1 | 4/2012 | Flam et al. | |
| 2012/0108217 A1 | 5/2012 | Iwaki | |
| 2012/0117036 A1 | 5/2012 | Lester et al. | |
| 2012/0124153 A1 | 5/2012 | Carroll et al. | |
| 2012/0136855 A1 | 5/2012 | Ni et al. | |
| 2012/0173222 A1 | 7/2012 | Wang et al. | |
| 2012/0185486 A1 | 7/2012 | Voigt et al. | |

(56) References Cited

U.S. PATENT DOCUMENTS

| | | |
|---|---|---|
| 2012/0259842 A1 | 10/2012 | Oman et al. |
| 2012/0271676 A1 | 10/2012 | Aravamudan et al. |
| 2012/0271957 A1 | 10/2012 | Carney et al. |
| 2012/0278765 A1 | 11/2012 | Kuwahara |
| 2013/0007036 A1 | 1/2013 | Childs et al. |
| 2013/0024910 A1 | 1/2013 | Verma et al. |
| 2013/0067039 A1 | 3/2013 | Hartzler et al. |
| 2013/0085786 A1 | 4/2013 | Longtine et al. |
| 2013/0132964 A1 | 5/2013 | Kim et al. |
| 2013/0159919 A1* | 6/2013 | Leydon .......... G06F 3/0236 715/780 |
| 2013/0173600 A1 | 7/2013 | Edwards et al. |
| 2013/0173602 A1 | 7/2013 | James et al. |
| 2013/0185285 A1 | 7/2013 | Shuman et al. |
| 2013/0189961 A1 | 7/2013 | Channakeshava et al. |
| 2013/0204897 A1 | 8/2013 | McDougall |
| 2013/0211869 A1 | 8/2013 | Subramanyaiah |
| 2013/0218982 A1 | 8/2013 | Hymel et al. |
| 2013/0246329 A1 | 9/2013 | Pasquero et al. |
| 2013/0246518 A1 | 9/2013 | Nace |
| 2013/0253906 A1 | 9/2013 | Archer et al. |
| 2013/0275923 A1 | 10/2013 | Griffin et al. |
| 2013/0282421 A1 | 10/2013 | Graff et al. |
| 2013/0297317 A1 | 11/2013 | Lee et al. |
| 2013/0300645 A1 | 11/2013 | Fedorov |
| 2013/0325970 A1 | 12/2013 | Roberts et al. |
| 2013/0326385 A1 | 12/2013 | Verstraete |
| 2013/0332525 A1 | 12/2013 | Liu et al. |
| 2013/0339283 A1 | 12/2013 | Grieves et al. |
| 2014/0006970 A1 | 1/2014 | Casey et al. |
| 2014/0010358 A1 | 1/2014 | Patil et al. |
| 2014/0025371 A1 | 1/2014 | Min |
| 2014/0032550 A1 | 1/2014 | Park et al. |
| 2014/0040243 A1 | 2/2014 | Rubinstein et al. |
| 2014/0040368 A1 | 2/2014 | Janssens |
| 2014/0066044 A1 | 3/2014 | Ramnani et al. |
| 2014/0067702 A1 | 3/2014 | Rathod |
| 2014/0143687 A1 | 5/2014 | Tan et al. |
| 2014/0156262 A1 | 6/2014 | Yuen et al. |
| 2014/0163954 A1 | 6/2014 | Joshi et al. |
| 2014/0165006 A1 | 6/2014 | Chaudhri et al. |
| 2014/0179358 A1 | 6/2014 | Khan et al. |
| 2014/0181681 A1 | 6/2014 | Keinanen et al. |
| 2014/0278379 A1 | 9/2014 | Coccaro et al. |
| 2014/0282211 A1 | 9/2014 | Ady et al. |
| 2014/0288990 A1 | 9/2014 | Moore et al. |
| 2014/0317502 A1 | 10/2014 | Brown et al. |
| 2014/0334616 A1 | 11/2014 | Jeong et al. |
| 2014/0337438 A1 | 11/2014 | Govande et al. |
| 2014/0349690 A1 | 11/2014 | Yang |
| 2014/0365226 A1 | 12/2014 | Sinha et al. |
| 2014/0372898 A1 | 12/2014 | Ayres et al. |
| 2015/0012554 A1 | 1/2015 | Midtun |
| 2015/0015511 A1 | 1/2015 | Kwak et al. |
| 2015/0046828 A1 | 2/2015 | Desai et al. |
| 2015/0100537 A1 | 4/2015 | Grieves et al. |
| 2015/0127628 A1 | 5/2015 | Rathod |
| 2015/0172241 A1 | 6/2015 | Sharma et al. |
| 2015/0172419 A1 | 6/2015 | Toledo et al. |
| 2015/0188858 A1 | 7/2015 | Nagata et al. |
| 2015/0188861 A1 | 7/2015 | Esplin et al. |
| 2015/0188869 A1 | 7/2015 | Gilad et al. |
| 2015/0199371 A1 | 7/2015 | Loofbourrow et al. |
| 2015/0201062 A1* | 7/2015 | Shih .......... H04M 1/72552 455/564 |
| 2015/0220774 A1* | 8/2015 | Ebersman .......... G06K 9/00308 382/118 |
| 2015/0222586 A1* | 8/2015 | Ebersman .......... G06F 17/276 715/752 |
| 2015/0227611 A1 | 8/2015 | Bao et al. |
| 2015/0269164 A1 | 9/2015 | Jo et al. |
| 2015/0294220 A1 | 10/2015 | Oreif |
| 2015/0324420 A1 | 11/2015 | Rubinstein et al. |
| 2015/0347534 A1 | 12/2015 | Gross et al. |
| 2015/0347586 A1 | 12/2015 | Fasen et al. |
| 2015/0347630 A1 | 12/2015 | Li |
| 2015/0347985 A1 | 12/2015 | Gross et al. |
| 2015/0350118 A1 | 12/2015 | Yang et al. |
| 2015/0358447 A1 | 12/2015 | Horling et al. |
| 2016/0021168 A1 | 1/2016 | Chaudhri et al. |
| 2016/0125071 A1 | 5/2016 | Gabbai |
| 2016/0182410 A1 | 6/2016 | Janakiraman et al. |
| 2016/0196577 A1 | 7/2016 | Reese et al. |
| 2016/0224540 A1 | 8/2016 | Stewart et al. |
| 2016/0337301 A1 | 11/2016 | Rollins et al. |
| 2016/0359771 A1 | 12/2016 | Sridhar |
| 2017/0010769 A1 | 1/2017 | Gross et al. |
| 2017/0011354 A1 | 1/2017 | Gross et al. |
| 2017/0011355 A1 | 1/2017 | Gross et al. |
| 2017/0024697 A1 | 1/2017 | Baessler et al. |
| 2017/0325056 A1 | 11/2017 | Mehta et al. |
| 2018/0032997 A1 | 2/2018 | Gordon et al. |
| 2018/0302501 A1 | 10/2018 | Toledo et al. |

FOREIGN PATENT DOCUMENTS

| | | |
|---|---|---|
| CN | 1413008 A | 4/2003 |
| CN | 101247366 A | 8/2008 |
| CN | 101326523 A | 12/2008 |
| CN | 101401407 A | 4/2009 |
| CN | 101557409 A | 10/2009 |
| CN | 101895623 A | 11/2010 |
| CN | 102055832 A | 5/2011 |
| CN | 102289431 A | 12/2011 |
| CN | 103079008 A | 5/2013 |
| CN | 103377276 A | 10/2013 |
| CN | 205038557 U | 2/2016 |
| EP | 0987641 A2 | 3/2000 |
| EP | 2172833 A1 | 4/2010 |
| EP | 2393046 A1 | 12/2011 |
| EP | 2688014 A1 | 1/2014 |
| EP | 2713323 A1 | 4/2014 |
| EP | 2770762 A1 | 8/2014 |
| GB | 2412546 A | 9/2005 |
| JP | 9-244969 A | 9/1997 |
| JP | 10-171827 A | 6/1998 |
| JP | 2005-32160 A | 2/2005 |
| JP | 2005-517234 A | 6/2005 |
| JP | 2012-059083 A | 3/2012 |
| JP | 2013137592 A | 7/2013 |
| JP | 5287315 B2 | 9/2013 |
| JP | 2014-509804 A | 4/2014 |
| WO | 99/16181 A1 | 4/1999 |
| WO | 2000/55739 A1 | 9/2000 |
| WO | 03/067365 A2 | 8/2003 |
| WO | 2015/087084 A1 | 6/2015 |

OTHER PUBLICATIONS

Hara et al. "Sentiment Learning Using Twitter Ideograms", 2017 8th Annual Industrial Automation and Electromechanical Engineering Conference, Bangkok, 2017, pp. 115-120.*
Non-Final Office Action received for U.S. Appl. No. 14/719,163, dated Oct. 20, 2016, 36 pages.
Office Action received for Danish Patent Application No. PA201670430, dated Oct. 27, 2016, 7 pages.
Office Action received for Taiwanese Patent Application No. 104117505, dated Sep. 23, 2016, 17 pages (7 pages of English Translation and 10 pages of Official Copy).
Tomic et al., "Emoticons", FIP, vol. 1, No. 1, 2013, pp. 35-42.
Extended European Search Report received for European Patent Application No. 16190201.0, dated Mar. 24, 2017, 7 Pages.
Extended European Search Report received for European Patent Application No. 16190204.4, dated Mar. 24, 2017, 7 pages.
Office Action received for Australian Patent Application No. 2015266840, dated Mar. 27, 2017, 3 Pages.
Office Action received for Taiwanese Patent Application No. 104117530, dated Mar. 2, 2017, 13 pages (6 pages of English Translation and 7 pages of Official Copy).
Extended European Search Report received for European Patent Application No. 16190186.3, dated Mar. 28, 2017, 7 pages.

(56) References Cited

OTHER PUBLICATIONS

Extended European Search Report received for European Patent Application No. 16190190.5, dated Feb. 27, 2017, 7 pages.
Final Office Action received for U.S. Appl. No. 14/719,163, dated Apr. 20, 2017, 36 pages.
International Search Report and Written Opinion received for PCT Patent Application No. PCT/US2016/048044, dated Oct. 31, 2016, 9 pages.
Office Action received for Australian Patent Application No. 2016231587, dated Apr. 27, 2017, 3 pages.
Office Action received for Australian Patent Application No. 2016231588, dated Apr. 27, 2017, 3 pages.
Office Action received for Australian Patent Application No. 2016231589, dated Apr. 27, 2017, 3 pages.
Office Action received for Australian Patent Application No. 2016231590, dated Apr. 27, 2017, 3 pages.
Office Action received for Netherland Patent Application No. 2016997, dated Feb. 6, 2017, 12 pages (1 page of English Translation and 11 pages of Official Copy).
"WhatsApp", Online available at http://web.archive.org/web/20140122054942/http://www.whatsapp.com/, Jan. 22, 2014, 2 pages.
Final Office Action received for U.S. Appl. No. 14/719,163, dated Feb. 26, 2016, 36 pages.
Non-Final Office Action received for U.S. Appl. No. 14/719,163, dated Sep. 25, 2015, 37 pages.
Office Action received for Netherlands Patent Application No. 2014870, dated Feb. 1, 2016, 13 pages (6 pages of English Translation and 7 pages of Official copy).
Office Action received for Australian Patent Application No. 2015100705, dated Jul. 20, 2015, 6 pages.
Office Action received for Australian Patent Application No. 2015100705, dated Jan. 13, 2016, 3 pages.
Notice of Allowance received for Chinese Patent Application No. 201520364899.5, dated Jan. 12, 2016, 5 pages (3 pages of English Translation and 2 pages of Official copy).
IPHONEBLOG, "[iPhone-Game] The Secret of Monkey Island: Special Edition", available at https://www.youtube.com/watch?v=2YuxCWAOsEg, Jul. 23, 2009, 2 pages.
Intention to Grant received for Danish Patent Application No. PA201570316, dated Feb. 19, 2016, 3 pages.
Office Action received for Danish Patent Application No. PA201570316, dated Aug. 28, 2015, 8 pages.
International Search Report and Written Opinion received for PCT Patent Application No. PCT/US2015/032055, dated Oct. 15, 2015, 21 pages.
Invitation to Pay Additional Fees received for PCT Patent Application No. PCT/US2015/032055, dated Aug. 6, 2015, 9 pages.
International Search Report and Written Opinion received for PCT Patent Application No. PCT/US2015/033023, dated Aug. 12, 2015, 14 pages.
Rogerthat, "Quick Starter Guide | Rogerthat Enterprise", available at http://www.rogerthat.net/guide/quick-starter-guide/, 2014, 4 pages.
Smith, Shamblesguru, "Handwrite a Google Search on an iPad", Available at https://www.youtube.com/watch?v=2zlQ20whYak, Jul. 28, 2012, 2 pages.
Notice of Allowance received for Denmark Patent Application No. PA201570316, dated Jul. 7, 2016, 2 pages.
International Preliminary Report on Patentability received for PCT Patent Application No. PCT/US2015/032055, dated Dec. 15, 2016, 15 pages.
International Preliminary Report on Patentability received for PCT Patent Application No. PCT/US2015/033023, dated Dec. 15, 2016, 11 pages.
International Search Report and Written Opinion received for PCT Patent Application No. PCT/US2016/025418, dated Jul. 1, 2016, 20 pages.
Intention to Grant Received for Danish patent Application No. PA201670430, dated May 8, 2017, 2 pages.
Non-Final Office Action received for U.S. Appl. No. 14/718,049, dated May 16, 2017, 33 pages.

Non Final Office Action received for U.S. Appl. No. 14/724,751, dated May 26, 2017, 32 pages.
Decision to Grant received for Danish patent Application No. PA201670430, dated Jul. 18, 2017, 2 pages.
Non-Final Office Action received for U.S. Appl. No. 15/273,593, dated Jul. 11, 2017, 20 pages.
Notice of Allowance received for Taiwanese Patent Application No. 104117505, dated Jun. 30, 2017, 3 pages. (Official Copy only) (See communication under 37 CFR § 1.98(a) (3)).
Search Report and Opinion received for Netherlands Patent Application No. 2016996, dated Jun. 23, 2017, 8 pages. (1 pages of English Translation and 7 pages of Official Copy).
Search Report and Opinion received for Netherlands Patent Application No. 2017011, dated Jun. 23, 2017, 8 pages (1 pages of English Translation and 7 pages of Official Copy).
Search Report and Opinion received for Netherlands Patent Application No. 2017012, dated Jun. 23, 2017, 9 pages (1 page of English Translation and 8 pages of Official Copy).
Final Office Action received for U.S. Appl. No. 14/718,049, dated Dec. 6, 2017, 44 pages.
Final Office Action received for U.S. Appl. No. 14/724,751, dated Dec. 5, 2017, 38 pages.
Non-Final Office Action received for U.S. Appl. No. 14/846,574, dated Nov. 29, 2017, 27 pages.
Office Action received for Chinese Patent Application No. 201510291041.5, dated Jul. 24, 2017, 22 pages (6 pages of English Translation and 16 pages of Official Copy).
Office Action received for Korean Patent Application No. 10-2016-7033576, dated Sep. 8, 2017, 19 pages (11 pages of English Translation and 8 pages of Official Copy).
Non-Final Office Action received for U.S. Appl. No. 14/846,574, dated Jun. 22, 2017, 21 pages.
Filipowicz, Luke, "How to use the QuickType keyboard in iOS 8", available online at <https://www.imore.com/comment/568232>, Oct. 11, 2014, pp. 1-3.
Office Action received for Taiwanese Patent Application No. 104117530, dated Jul. 6, 2017, 7 pages (3 pages of English Translation and 4 pages of Official Copy).
International Preliminary Report on Patentability received for PCT Patent Application No. PCT/US2016/048044, dated Mar. 22, 2018, 8 pages.
Notice of Acceptance received for Australian Patent Application No. 2015266840, dated Mar. 14, 2018, 3 pages.
Notice of Acceptance received for Australian Patent Application No. 2016231588, dated Mar. 14, 2018, 3 pages.
Office Action received for Australian Patent Application No. 2016231587, dated Mar. 12, 2018, 2 pages.
Office Action received for Korean Patent Application No. 10-2016-7033576, dated Jul. 25, 2018, 5 pages (2 pages of English Translation and 3 pages of Official Copy).
Office Action received for Chinese Patent Application No. 201510291041.5, dated May 24, 2018, 18 pages (3 pages of English Translation and 15 pages of Official Copy).
Notice of Allowance received for Japanese Patent Application No. 2018-093215, dated Nov. 2, 2018, 5 pages (2 pages of English Translation and 3 pages of Official copy).
Office Action received for European Patent Application No. 16190190.5, dated Oct. 29, 2018, 8 pages.
Examiner's Answer to Appeal Brief received for U.S. Appl. No. 14/719,163, dated May 17, 2018, 48 pages.
Office Action received for European Patent Application No. 15728336.7 dated Jul. 17, 2018, 8 pages.
Office Action received for Japanese Patent Application No. 2018-093215, dated Jun. 19, 2018, 10 pages (5 pages of English Translation and 5 pages of Official copy).
International Preliminary Report on Patentability received for PCT Patent Application No. PCT/US2016/025418, dated Dec. 21, 2017, 16 pages.
Office Action received for Japanese Patent Application No. 2017-515016, dated Dec. 15, 2017, 10 pages (5 pages of English Translation and 5 pages of Official Copy).
Advisory Action received for U.S. Appl. No. 14/718,049, dated Apr. 19, 2018, 4 pages.

(56) References Cited

OTHER PUBLICATIONS

Advisory Action received for U.S. Appl. No. 14/724,751, dated Apr. 26, 2018, 4 pages.
Final Office Action received for U.S. Appl. No. 15/273,593, dated Apr. 5, 2018, 29 pages.
Notice of Acceptance received for Australian Patent Application No. 2016231589, dated Apr. 11, 2018, 3 pages.
Notice of Acceptance received for Australian patent Application No. 2016231590, dated Apr. 11, 2018, 3 pages.
Office Action received for Japanese Patent Application No. 2017-515016, dated Apr. 13, 2018, 4 pages (1 pages of English Translation and 3 pages of Official Copy).
Non-Final Office Action received for U.S. Appl. No. 14/724,751, dated Oct. 5, 2018, 40 pages.
Non-Final Office Action received for U.S. Appl. No. 14/718,049, dated Oct. 5, 2018, 70 pages.
Non-Final Office Action received for U.S. Appl. No. 14/846,574, dated Sep. 20, 2018, 61 pages.
Inews and Tech, "How to Use the QuickType Keyboard in IOS 8", Available online at: http://www.inewsandtech.com/how-to-use-the-quicktype-keyboard-in-ios-8/, Sep. 17, 2014, 6 pages.
Notice of Acceptance received for Australian Patent Application No. 2016231587, dated Apr. 23, 2018, 3 pages.
Search Report and Opinion received for Netherlands Patent Application No. 2017005, dated Sep. 5, 2018, 13 pages (Official Copy Only) (Please see communication under 37 CFR § 1.98(a) (3).
Extended European Search Report received for European Patent Application No. 16844879.3, dated Mar. 1, 2019, 6 pages.
Decision of Rejection received for Chinese Patent Application No. 201510291041.5, dated Feb. 27, 2019, 14 pages (3 pages of English Translation and 11 pages of Official Copy).
Extended European Search Report received for European Patent Application No. 16807953.1, dated Dec. 4, 2018, 7 pages.
Final Office Action received for U.S. Appl. No. 14/718,049, dated Mar. 11, 2019, 61 pages.
Final Office Action received for U.S. Appl. No. 14/846,574, dated May 10, 2019, 36 pages.
Final Office Action received for U.S. Appl. No. 15/273,593, dated May 20, 2019, 26 pages.
Final Office Action received for U.S. Appl. No. 14/724,751, dated Mar. 15, 2019, 50 pages.
Non Final Office Action received for U.S. Appl. No. 15/273,593, dated Nov. 27, 2018, 31 pages.
Non-Final Office Action received for U.S. Appl. No. 15/273,584, dated Jan. 31, 2019, 30 pages.
Non-Final Office Action received for U.S. Appl. No. 15/273,576, dated Mar. 7, 2019, 34 pages.
Notice of Allowance received for Korean Patent Application No. 10-2016-7033576, dated Jan. 24, 2019, 4 pages (2 pages of English Translation and 2 pages of Official Copy).
Office Action received for Chinese Patent Application No. 201580028663.7, dated Feb. 27, 2019, 16 pages (6 pages of English Translation and 10 pages of Official Copy).
Office Action received for European Patent Application No. 16190186.3, dated Nov. 30, 2018, 8 pages.
Office Action received for European Patent Application No. 16190201.0, dated Nov. 20, 2018, 8 pages.
Office Action received for European Patent Application No. 16190204.4, dated Nov. 20, 2018, 7 pages.
Office Action received for Korean Patent Application No. 10-2019-7012117, dated May 14, 2019, 15 pages (7 pages Of English Translation and 8 pages of Official copy).
Search Report received for Netherlands Patent Application No. 2017007, dated Jan. 8, 2019, 15 pages (5 pages of English Translation and 10 pages of Official Copy).
Search Report received for Netherlands Patent Application No. 2017009, dated Jan. 8, 2019, 12 pages (2 pages of English Translation and 10 pages of Official Copy).
iOs 8 Release, "Quick Type Keyboard on iOS 8 Makes Typing Easier", Online available at: < https://www.youtube.com/watch?v=0CIdLR4fhVU>, Jun. 3, 2014, 3 pages.
Smith, David A. "Detecting and Browsing Events in Unstructured Text", SIGIR '02, Tampere, Finland, Aug. 11-15, 2002, 8 pages.
Smith, David A., "Detecting Events with Date and Place Information in Unstructured Text", JCDL '02, Portland, Oregon, USA, Jul. 13-17, 2002, 6 pages.
Tang et al., "ConNexus to Awarenex: Extending Awareness to Mobile Users", Sun Microsystems Laboratories, CHI '01, ACM, vol. 3, Issue No. 1, Mar. 31-Apr. 5, 2001, pp. 221-228.

* cited by examiner

EMOJI AND CANNED RESPONSES

CROSS-REFERENCE TO RELATED APPLICATIONS

This application claims priority to U.S. Provisional application No. 62/219,051, filed Sep. 15, 2015, entitled "EMOJI AND CANNED RESPONSES", which is hereby incorporated by reference in its entirety for all purposes.

FIELD

The present disclosure is generally directed to computer user interfaces, and more specifically to techniques for suggesting content for electronic messages.

BACKGROUND

Portable electronic devices and wearable devices, such as cellular phones and smart watches, are useful for message-based communications. Exemplary message-based communications include the short message service (SMS), as well as iMessage technologies provided by Apple Inc., of Cupertino, Calif. The small form factors of portable electronic devices, however, present user interface challenges. One persistent challenge arises from the reduced-size input modalities typically employed by these devices, which are sub-optimal for typing. This difficulty is exacerbated by continued improvement in electronics packaging techniques that lend to smaller devices with even less room for keyboard placement. Techniques for suggesting content for insertion in messages—thereby reducing the need for manual user input—are thus desirable.

SUMMARY

The small form factors of portable electronic devices present user interface challenges with respect to inputting messages during message-based communication. One challenge arises from the reduced-size keyboards typically employed by these devices, which are sub-optimal for typing. Further improvements in electronics packaging techniques that lend to smaller devices with even less room for keyboard placement further exacerbate this difficulty.

The present invention provides techniques for predicting a user's likely response to an incoming message and presenting the predictions for user selection. In this way, manual user input is reduced. Such techniques reduce the cognitive burden on a user as required by manual typing, and produce a more efficient human-machine interface by offering the user relevant options that can be invoked quickly and easily.

Such methods and interfaces may also reduce the number of unnecessary, extraneous, repetitive, and/or redundant inputs—such as the manual typing of a message—and may create a faster and more efficient user interface arrangement, which may reduce the number of required inputs, reduce processing power, and reduce the amount of time for which user interfaces need to be displayed in order for desired functions to be accessed and carried out. For battery-operated computing devices, such methods and interfaces conserve power and increase the time between battery charges (and decrease the time to fully charge a battery), including by reducing unnecessary or accidental inputs and by obviating unnecessary extra user inputs.

In some embodiments, a method comprises, at an electronic device with a touch-sensitive surface: detecting a first input on the touch-sensitive surface that represents selection of a first ideogram; identifying at least one attribute of the first ideogram; selecting a plurality of suggested one or more characters to display, wherein at least a first set of suggested one or more characters is selected based on a set of selection criteria, the set of selection criteria including the identified at least one attribute of the first ideogram; displaying at least the first set of suggested one or more characters; detecting a second input on the touch-sensitive surface that represents selection of the displayed first set of suggested one or more characters; and in response to detecting the second input, displaying a composed electronic message, the composed electronic message including the first ideogram and the selected first set of suggested one or more characters.

In some embodiments, a method comprises, at an electronic device with a touch-sensitive surface: detecting a first input on the touch-sensitive surface selecting a first ideogram; detecting a second input on the touch-sensitive surface selecting a second ideogram; identifying at least one attribute of the first ideogram and at least one attribute of the second ideogram; selecting a plurality of suggested one or more characters to display, wherein at least a first set of suggested one or more characters is selected based on a set of selection criteria, the set of selection criteria including the identified at least one attribute of the first ideogram and the identified at least one attribute of the second ideogram; displaying at least the first set of suggested one or more characters; detecting a third input on the touch-sensitive surface selecting the displayed first set of suggested one or more characters; and in response to detecting the third input, displaying a composed electronic message, the composed electronic message including the first ideogram, the second ideogram, and the selected first set of suggested one or more characters.

In some embodiments, an electronic device comprises: a touch-sensitive surface; one or more processors; a memory; and one or more programs, wherein the one or more programs are stored in the memory and are configured to be executed by the one or more processors, the one or more programs including instructions for: detecting a first input on the touch-sensitive surface that represents selection of a first ideogram; identifying at least one attribute of the first ideogram; selecting a plurality of suggested one or more characters to display, wherein at least a first set of suggested one or more characters is selected based on a set of selection criteria, the set of selection criteria including the identified at least one attribute of the first ideogram; displaying at least the first set of suggested one or more characters; detecting a second input on the touch-sensitive surface that represents selection of the displayed first set of suggested one or more characters; and in response to detecting the second input, displaying a composed electronic message, the composed electronic message including the first ideogram and the selected first set of suggested one or more characters.

In some embodiments, an electronic device comprises: a touch-sensitive surface; one or more processors; a memory; and one or more programs, wherein the one or more programs are stored in the memory and configured to be executed by the one or more processors, the one or more programs including instructions for: detecting a first input on the touch-sensitive surface selecting a first ideogram; detecting a second input on the touch-sensitive surface selecting a second ideogram; identifying at least one attribute of the first ideogram and at least one attribute of the second ideogram; selecting a plurality of suggested one or more characters to display, wherein at least a first set of suggested one or more characters is selected based on a set of selection criteria, the set of selection criteria including the identified at least one attribute of the first ideogram and the identified at least one attribute of the second ideogram; displaying at least the first set of suggested one or more characters; detecting a third input on the touch-sensitive surface selecting the displayed first set of suggested one or more characters; and in response to detecting the third input, displaying a composed electronic message, the composed electronic message including the first ideogram, the second ideogram, and the selected first set of suggested one or more characters.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, a non-transitory computer readable storage medium stores one or more programs, the one or more programs comprising instructions that, when executed by one or more processors of an electronic device with a touch-sensitive surface, cause the electronic device to: detect a first input on the touch-sensitive surface that represents selection of a first ideogram; identify at least one attribute of the first ideogram; select a plurality of suggested one or more characters to display, wherein at least a first set of suggested one or more characters is selected based on a set of selection criteria, the set of selection criteria including the identified at least one attribute of the first ideogram; display at least the first set of suggested one or more characters; detect a second input on the touch-sensitive surface that represents selection of the displayed first set of suggested one or more characters; and in response to detection of the second input, display the composed electronic message, the composed electronic message including the first ideogram and the selected first set of suggested one or more characters.

In some embodiments, a non-transitory computer readable storage medium stores one or more programs, the one or more programs comprising instructions that, when executed by one or more processors of an electronic device with a touch-sensitive surface, cause the electronic device to: detect a first input on the touch-sensitive surface selecting a first ideogram; detect a second input on the touch-sensitive surface selecting a second ideogram; identify at least one attribute of the first ideogram and at least one attribute of the second ideogram; select a plurality of suggested one or more characters to display, wherein at least a first set of suggested one or more characters is selected based on a set of selection criteria, the set of selection criteria including the identified at least one attribute of the first ideogram and the identified at least one attribute of the second ideogram; display at least the first set of suggested one or more characters; detect a third input on the touch-sensitive surface selecting the displayed first set of suggested one or more characters; and in response to detection of the third input, display a composed electronic message, the composed electronic message including the first ideogram, the second ideogram, and the selected first set of suggested one or more characters.

In some embodiments, a transitory computer readable storage medium stores one or more programs, the one or more programs comprising instructions that, when executed by one or more processors of an electronic device with a touch-sensitive surface, cause the electronic device to: detect a first input on the touch-sensitive surface that represents selection of a first ideogram; identify at least one attribute of the first ideogram; select a plurality of suggested one or more characters to display, wherein at least a first set of suggested one or more characters is selected based on a set of selection criteria, the set of selection criteria including the identified at least one attribute of the first ideogram; display at least the first set of suggested one or more characters; detect a second input on the touch-sensitive surface that represents selection of the displayed first set of suggested one or more characters; and in response to detection of the second input, display the composed electronic message, the composed electronic message including the first ideogram and the selected first set of suggested one or more characters.

In some embodiments, a transitory computer readable storage medium stores one or more programs, the one or more programs comprising instructions that, when executed by one or more processors of an electronic device with a touch-sensitive surface, cause the electronic device to: detect a first input on the touch-sensitive surface selecting a first ideogram; detect a second input on the touch-sensitive surface selecting a second ideogram; identify at least one attribute of the first ideogram and at least one attribute of the second ideogram; select a plurality of suggested one or more characters to display, wherein at least a first set of suggested one or more characters is selected based on a set of selection criteria, the set of selection criteria including the identified at least one attribute of the first ideogram and the identified at least one attribute of the second ideogram; display at least the first set of suggested one or more characters; detect a third input on the touch-sensitive surface selecting the displayed first set of suggested one or more characters; and in response to detection of the third input, display a composed electronic message, the composed electronic message including the first ideogram, the second ideogram, and the selected first set of suggested one or more characters.

DESCRIPTION OF EMBODIMENTS

Figure 1A:
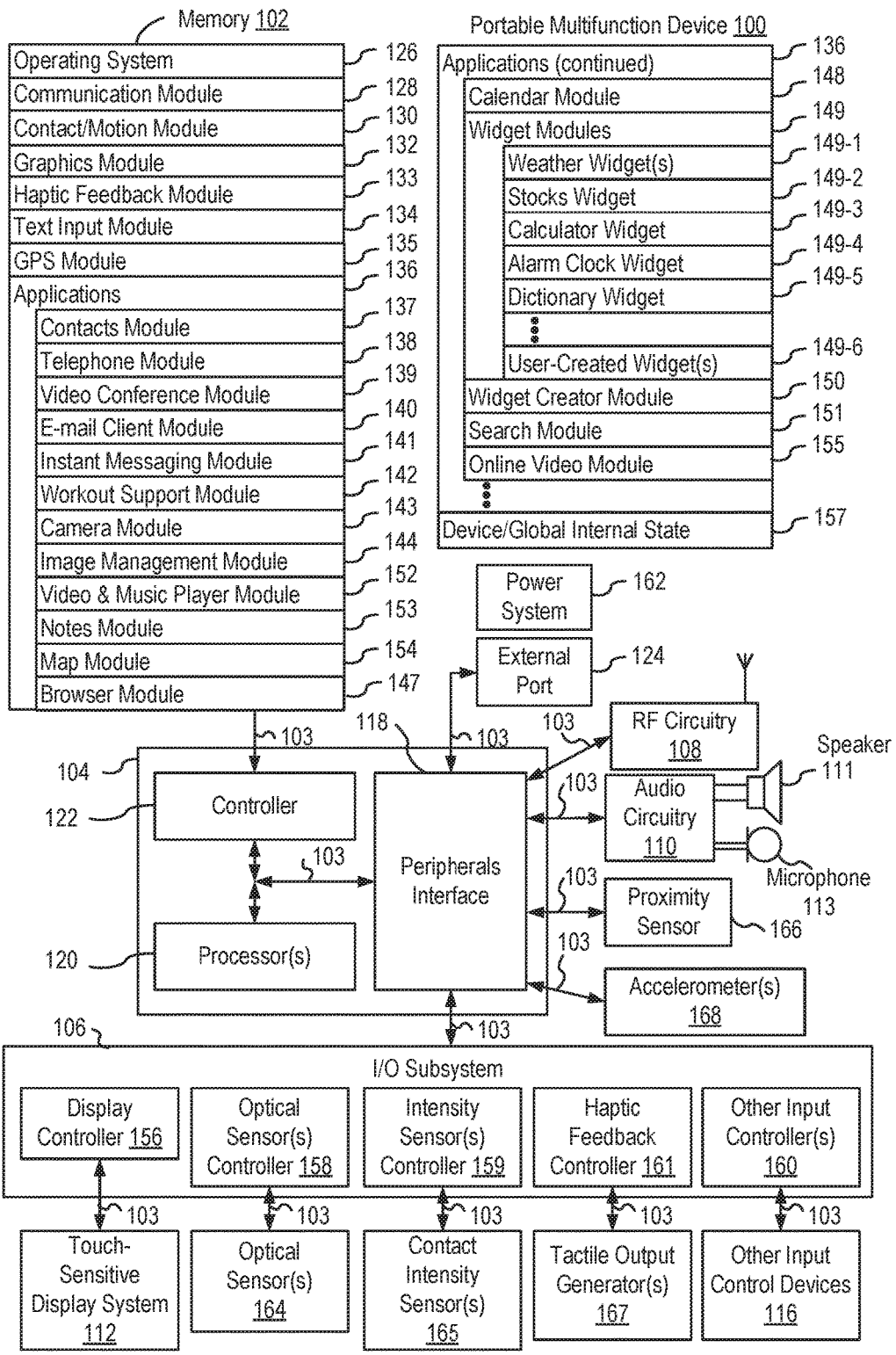
FIG. 1A is a block diagram illustrating a portable multifunction device with a touch-sensitive display in accordance with some embodiments.

In the following description of the disclosure and embodiments, reference is made to the accompanying drawings in which it is shown by way of illustration specific embodiments that can be practiced. It is to be understood that other embodiments and examples can be practiced and changes are, optionally, made without departing from the scope of the disclosure.

Below, FIGS. 1A-1B, 2, 3, 4A-4B, and 5A-5B provide a description of exemplary devices for performing the techniques described herein. For brevity, these techniques are, optionally, referred to as "predictive content" for creating user messages. FIGS. 6a-10g illustrate exemplary user interfaces for invoking predictive content. The user interfaces in the figures are also used to illustrate the processes described below, including those processes in FIGS. 11-12.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
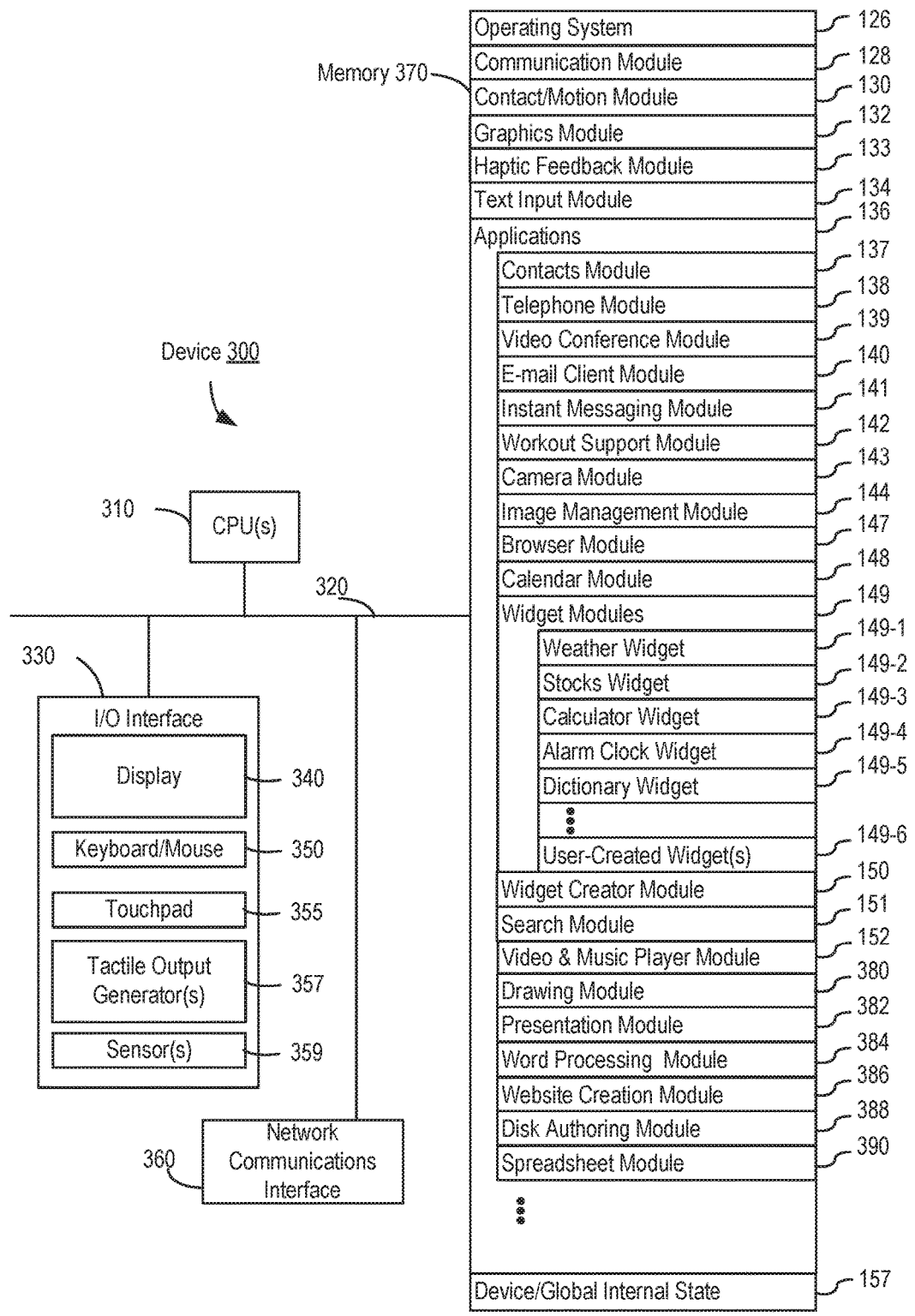
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web-pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location; and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
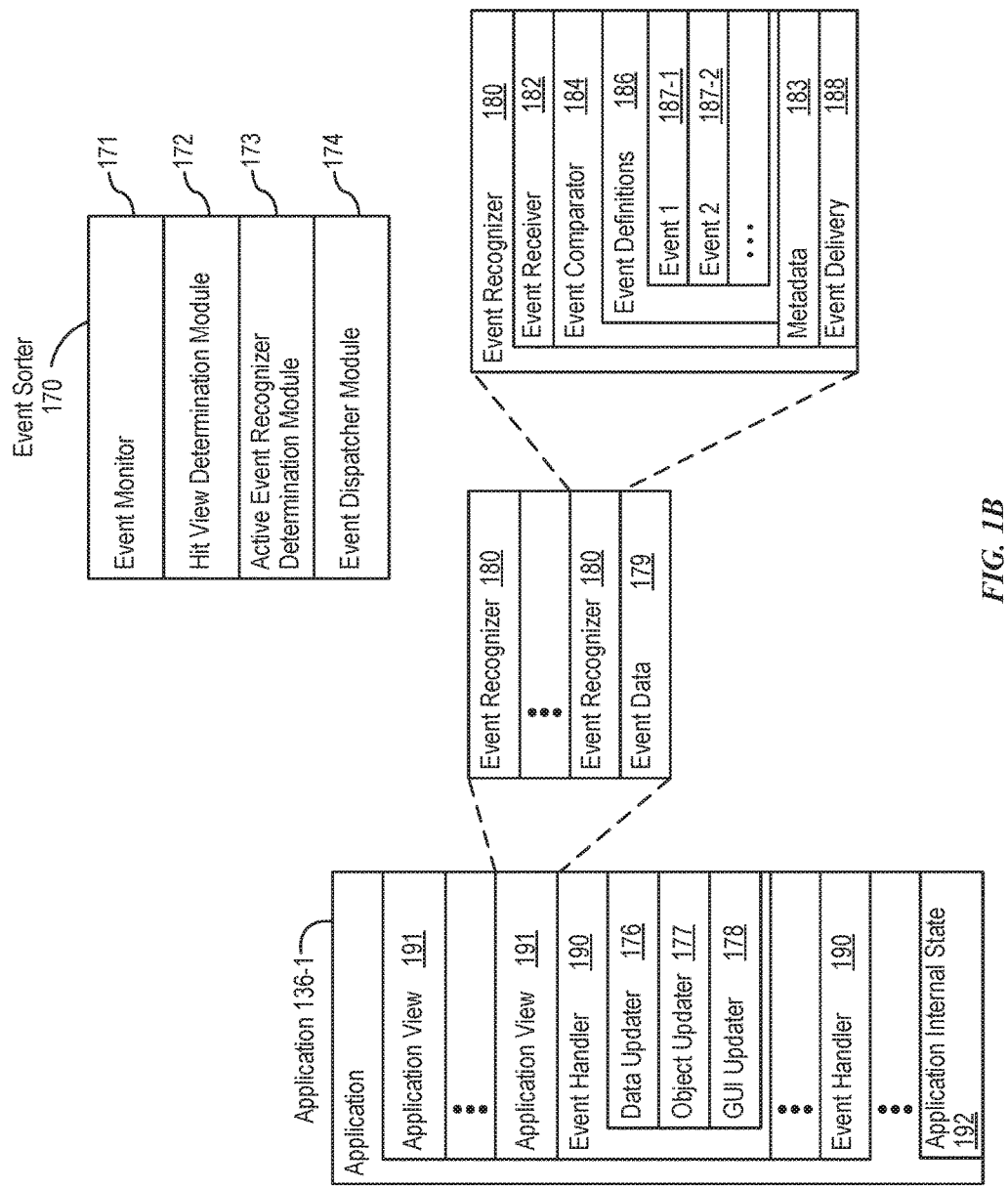
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration). In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
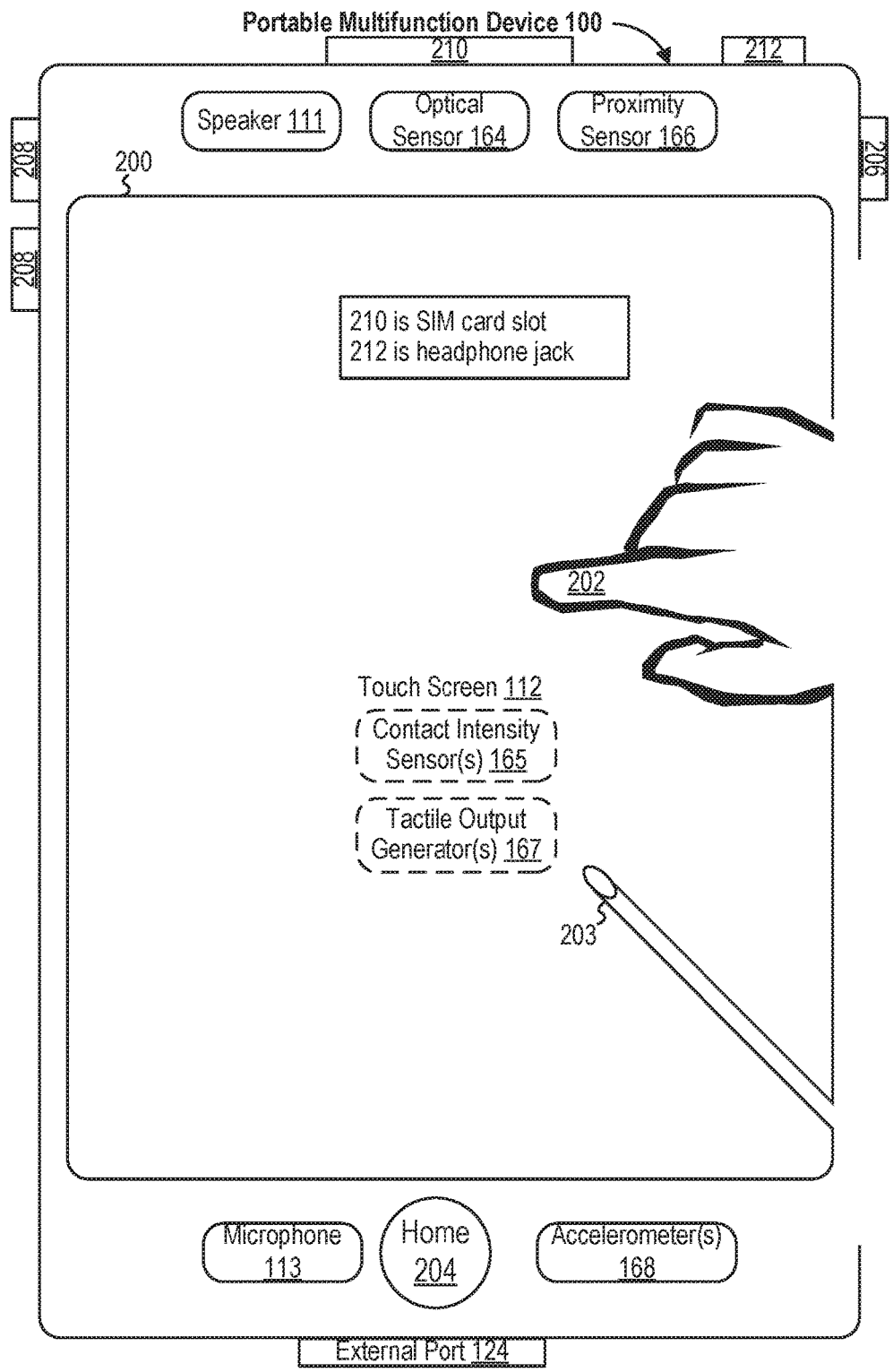
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
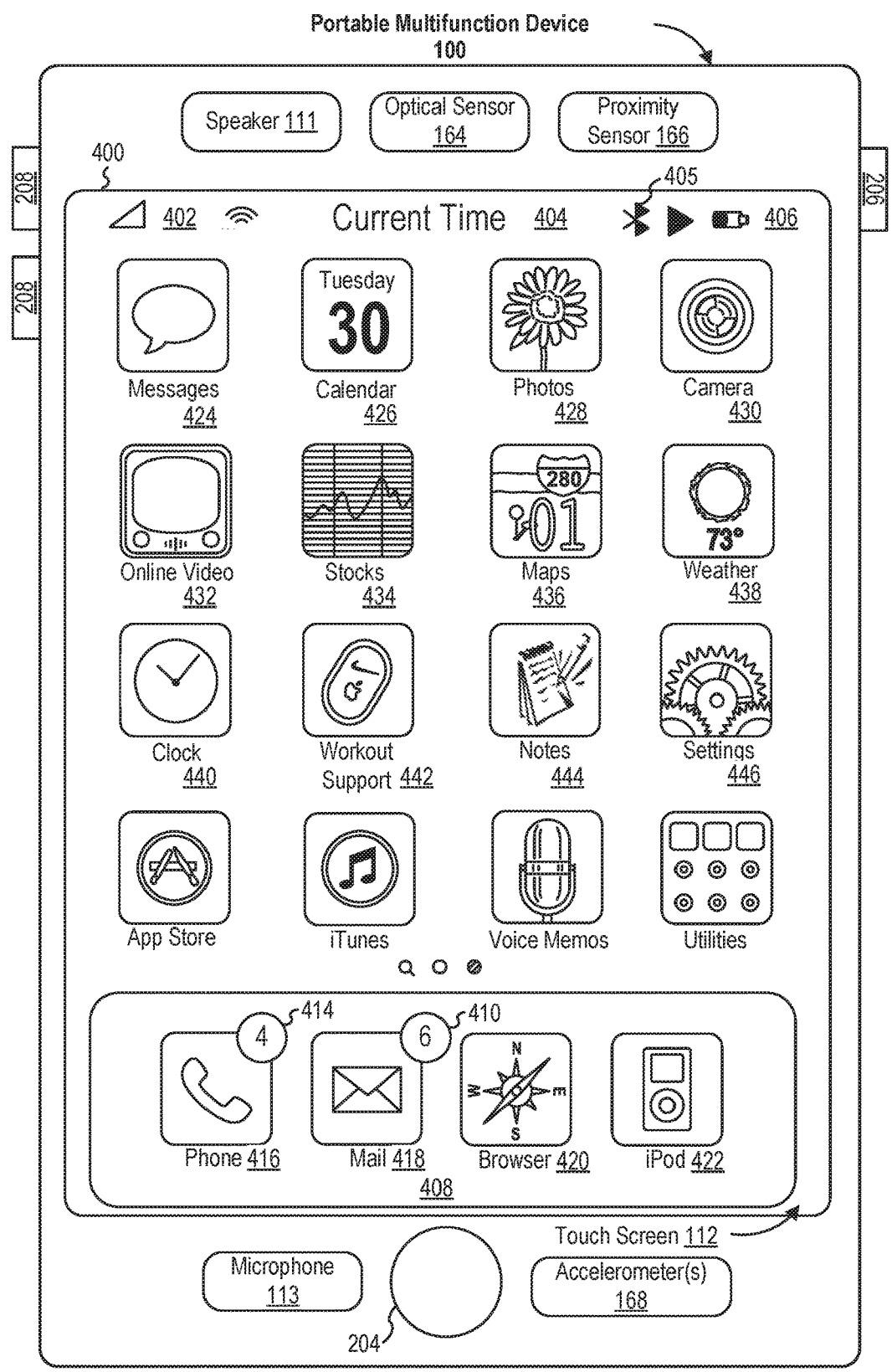
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
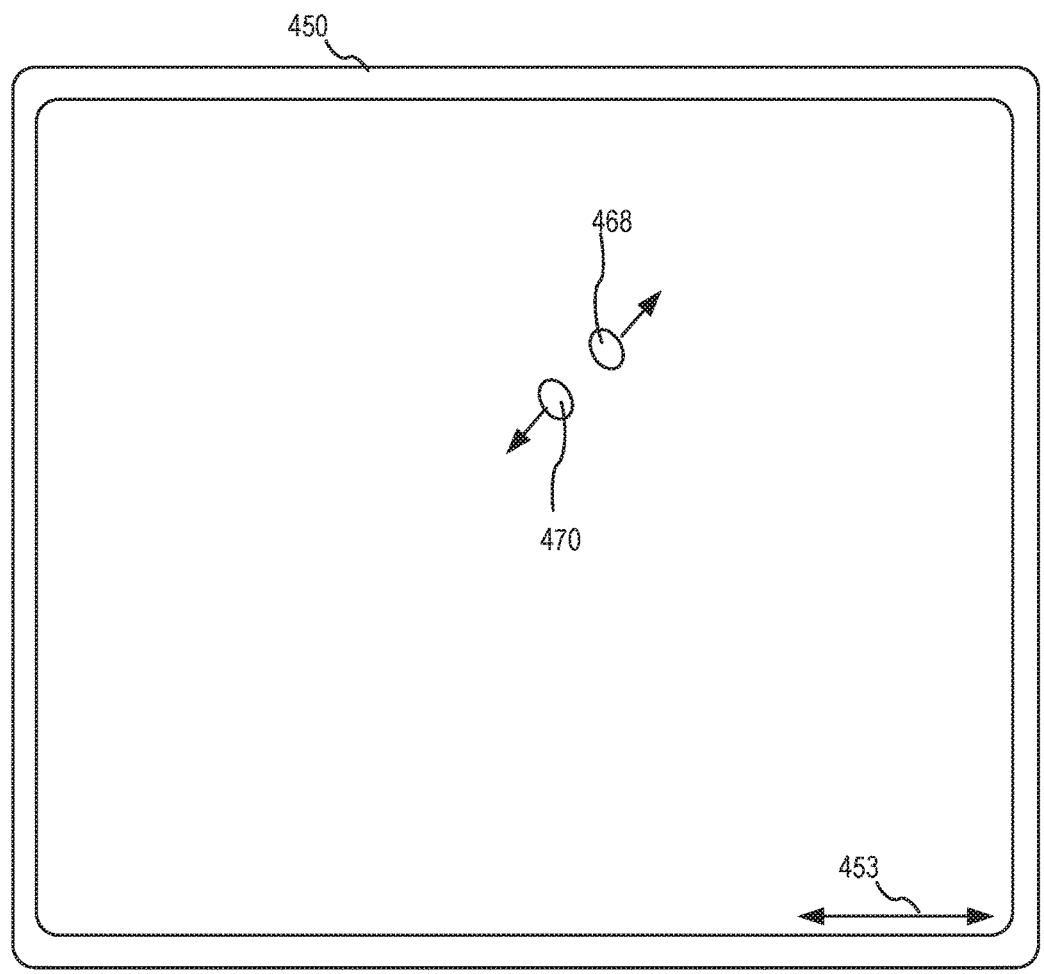
FIG. 4B illustrates an exemplary user interface for a multifunction device with a touch-sensitive surface that is separate from the display in accordance with some embodiments.
Figure 4B:
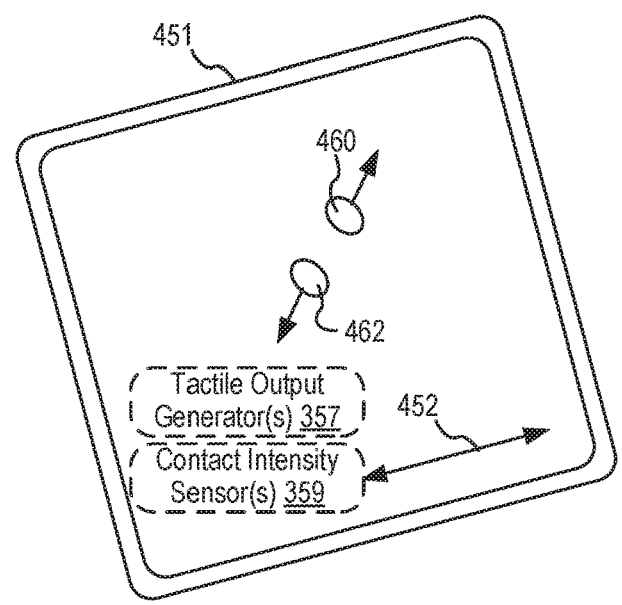

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used in the specification and claims, the term "open application" refers to a software application with retained state information (e.g., as part of device/global internal state 157 and/or application internal state 192). An open (e.g., executing) application is any one of the following types of applications:
- an active application, which is currently displayed on display 112 (or a corresponding application view is currently displayed on the display);
- a background application (or background process), which is not currently displayed on display 112, but one or more application processes (e.g., instructions) for the corresponding application are being processed by one or more processors 120 (i.e., running);
- a suspended application, which is not currently running, and the application is stored in a volatile memory (e.g., DRAM, SRAM, DDR RAM, or other volatile random access solid state memory device of memory 102); and
- a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 5A:
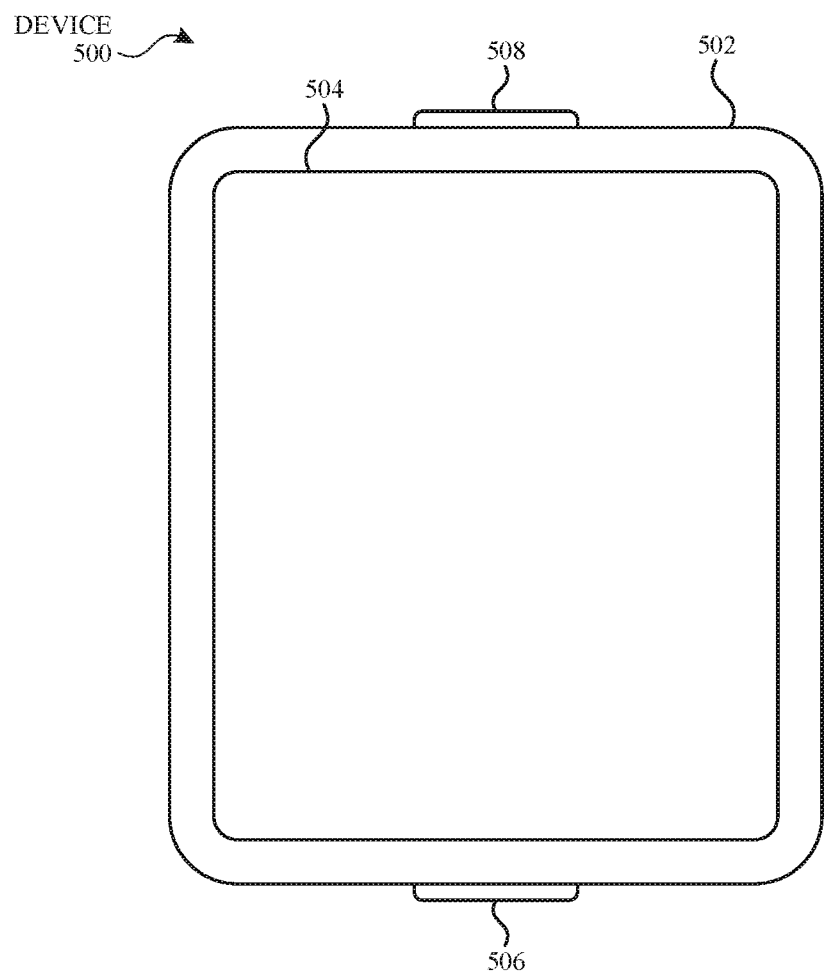
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
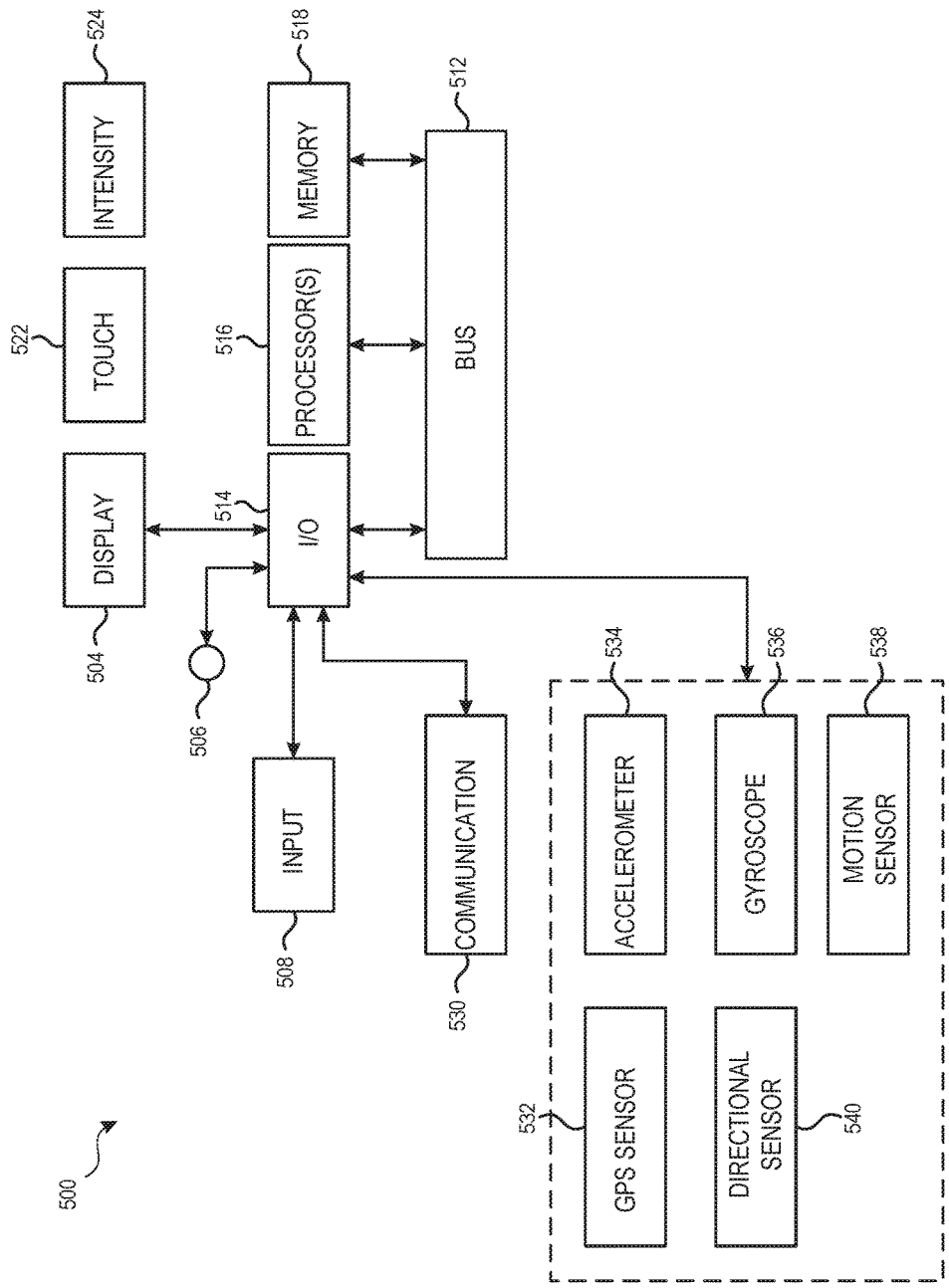
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Exemplary User Interfaces

Attention is now directed towards embodiments of user interfaces and associated processes that are implemented on an electronic device with a display and a touch-sensitive surface, to improve user experience in messaging applications. The techniques described herein are, optionally, referred to as "predictive content". For instance, FIGS. 6A-6F, 7A-7E, 8A-8B, and 9A-9E illustrate the use of predictive content on a touchscreen-equipped portable multifunction device such as device 100 (FIG. 1A), while FIGS. 10A-10G illustrate the use of predictive content on a wearable device such as device 500 (FIG. 5A). It should be appreciated that the illustrated predictive content techniques are not limited to the illustrated, exemplary devices. For example, a wearable device such as device 500 (FIG. 5A) or a device having a touchpad such as device 300 (FIG. 3) can also implement the techniques described with reference to FIGS. 6A-9E.

For purposes of this disclosure, a messaging application is a software application that supports the sending and receiving of electronic messages between different users or participants. An electronic message contains one or more of the following types of information: text; an image (including icons and other affordances, whether interactive or not); a video clip; an audio clip; an emoji character; etc. A "message transcript" refers to a listing of messages between participants of a message-based conversation.

Figure 6A:
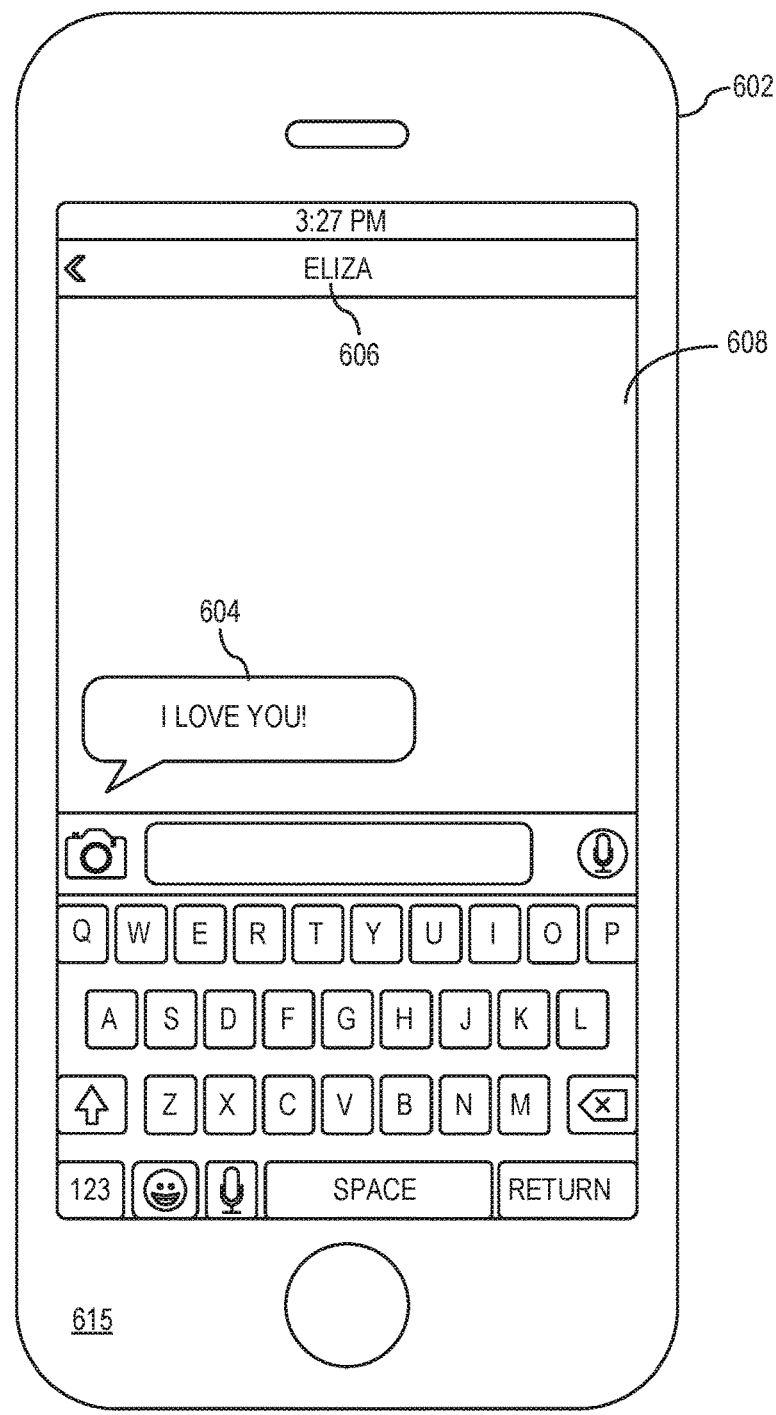
FIGS. 6A-6F illustrate exemplary user interfaces associated with a first sequence for composing a message using predictive content in accordance with some embodiments.
Figure 6B:
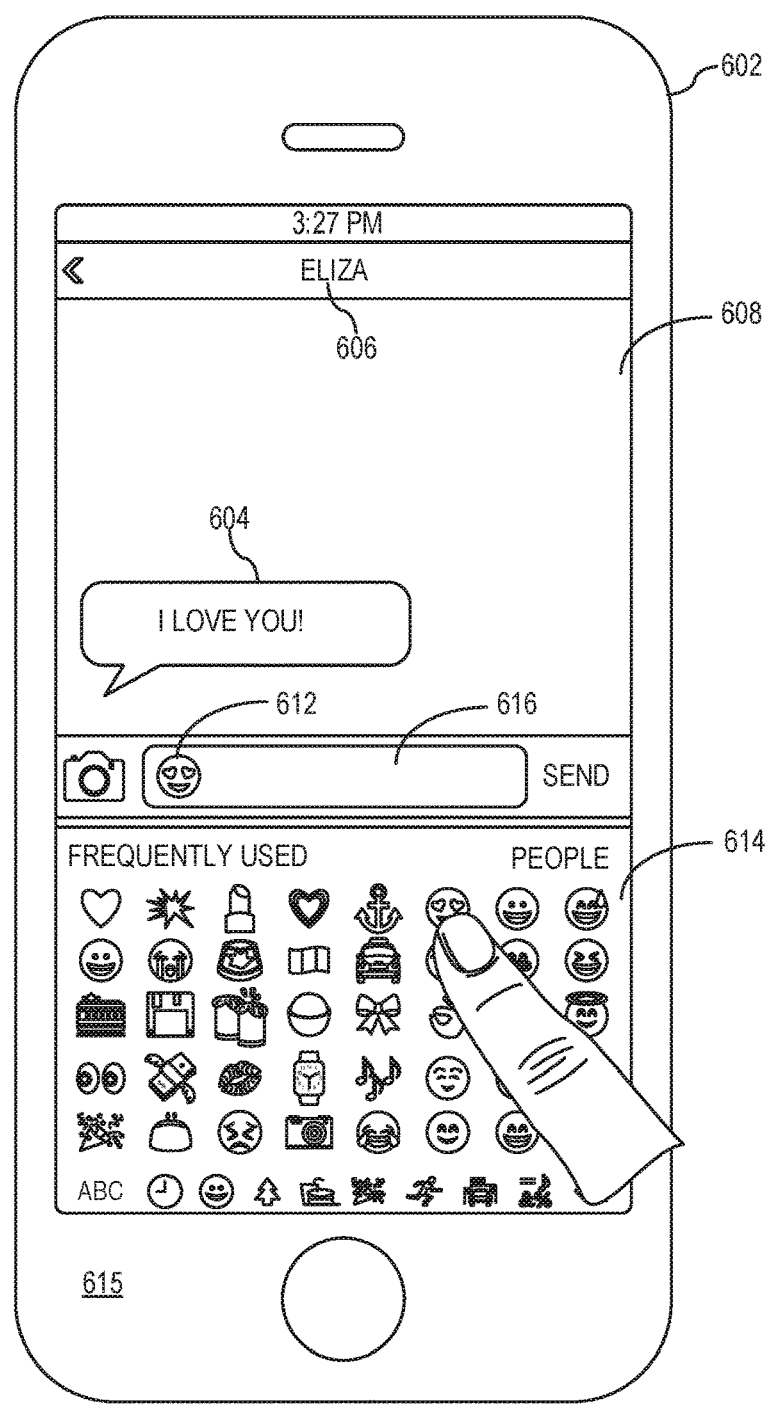
Figure 6C:
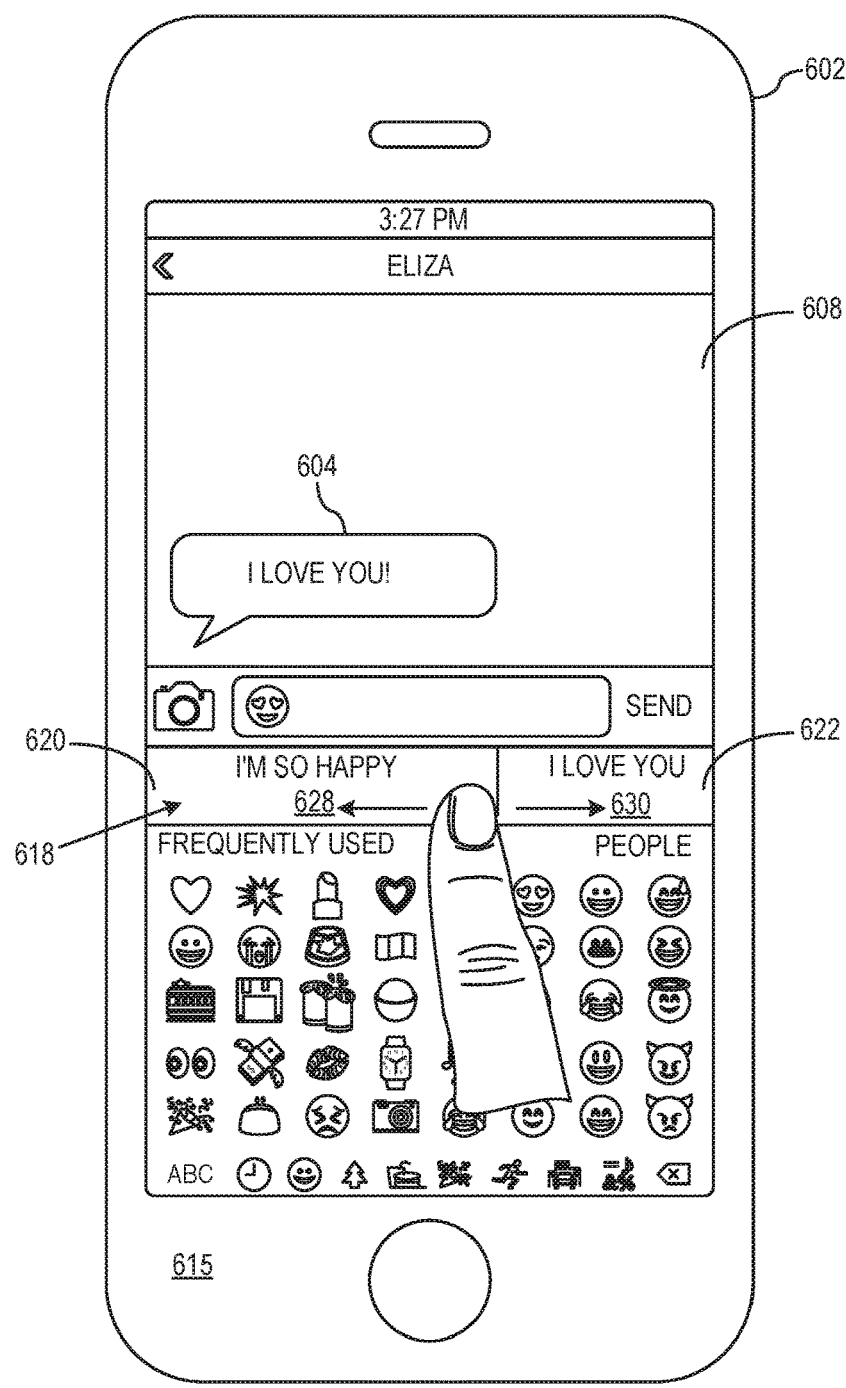
Figure 6D:
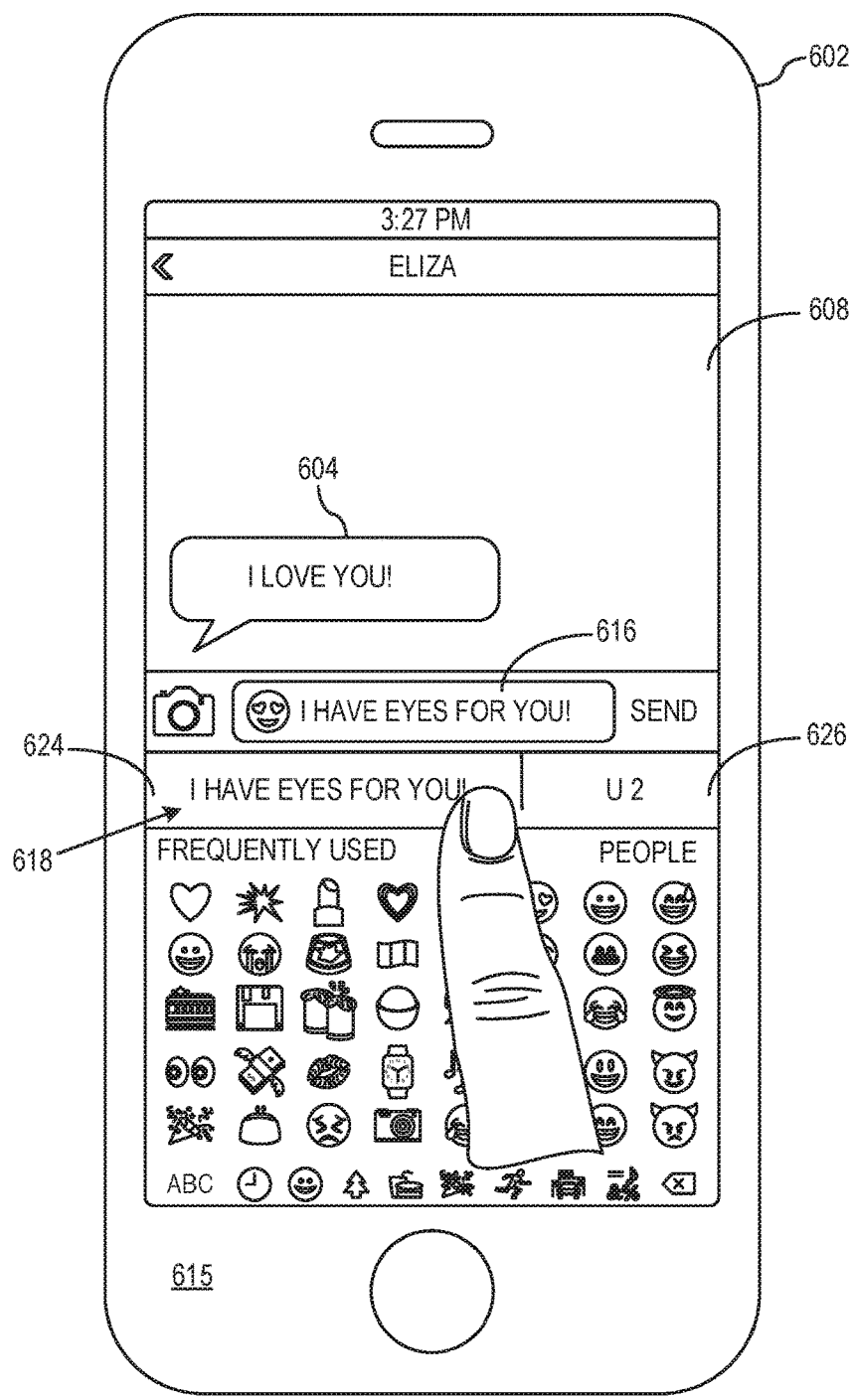
Figure 6E:
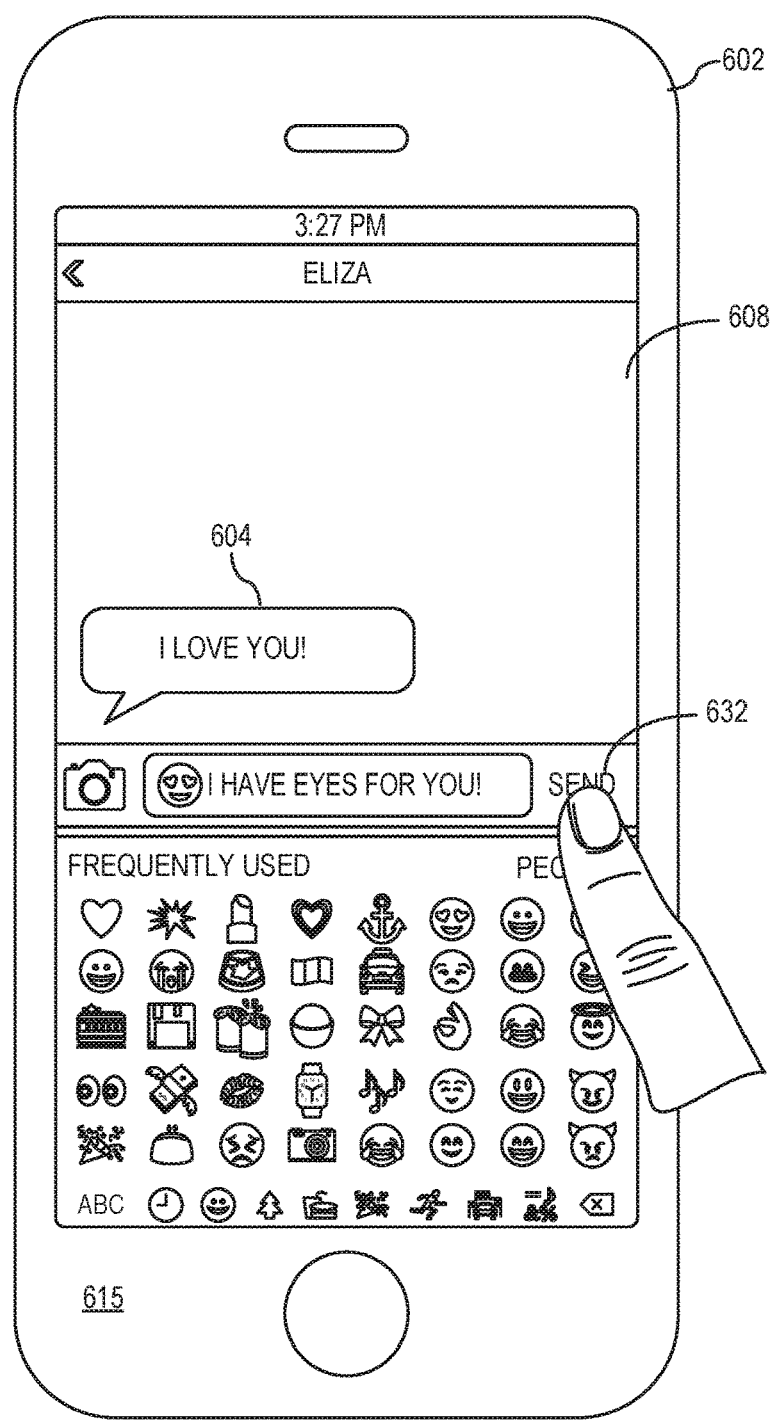
Figure 6F:
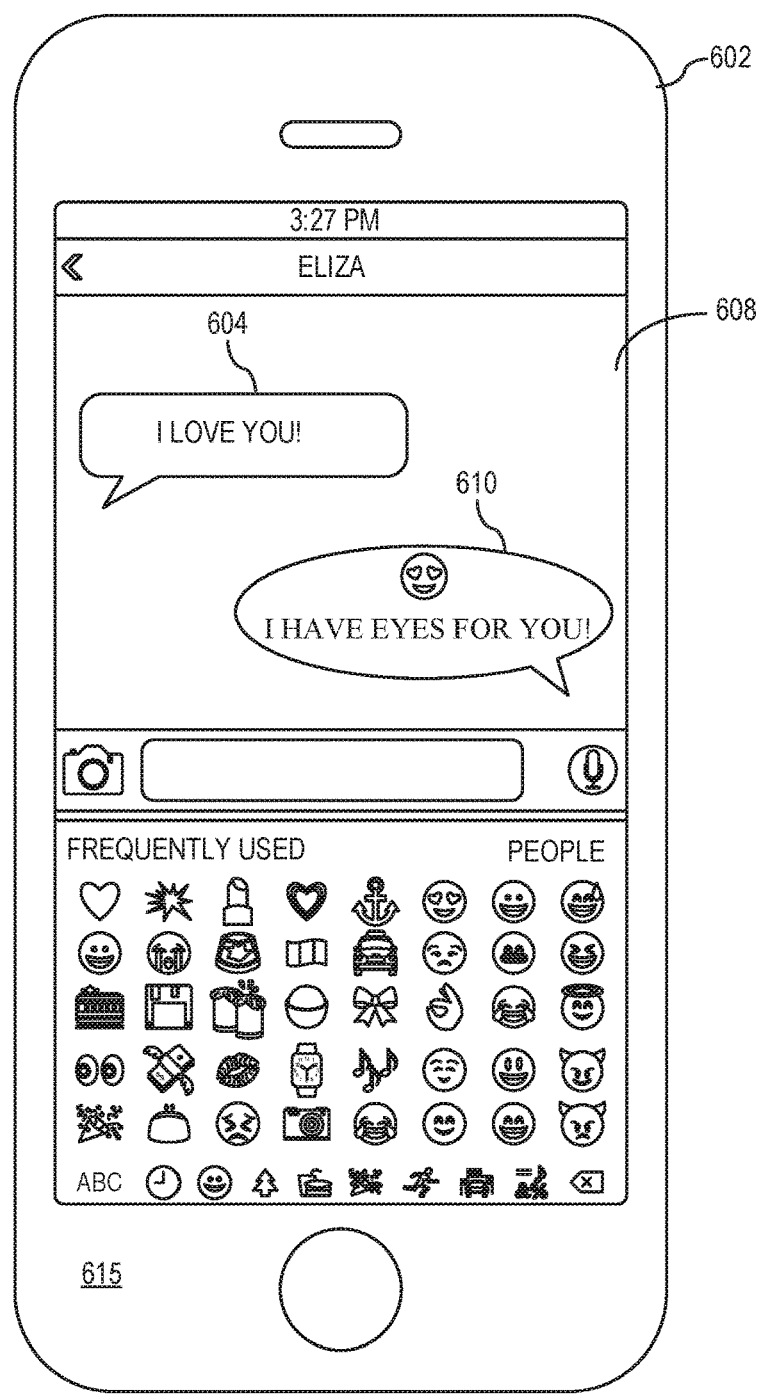

FIGS. 6A-6F illustrate exemplary user interfaces associated with a first sequence of user interfaces for composing a message using predictive content, in accordance with some embodiments. As shown in FIG. 6A, device 602 displays incoming message 604 received from participant 606 in message transcript 608. As shown in FIG. 6B and FIG. 6F, reply message 610 is optionally composed by selecting emoji character 612 from emoji keyboard 614. Device 602 displays the selected emoji character 612 in message input field 616. In addition, responsive to detecting selection of emoji character 612, device 602 displays affordance listing 618 having affordances 620, 622, 624, 626, etc., that are accessible via swipe gesture 628 or swipe gesture 630, as can be seen in FIGS. 6B-C. In some examples, these exemplary affordances 620, 622, 624, 626 represent predicted content selected by device 602 based on (at least) the identity and/or characteristics of the user-selected emoji character 612. In some examples, the exemplary affordances represent predicted content selected by device 602 based on (at least) the content of message 604.

Turning to FIG. 6D, a user optionally selects affordance 624 from affordance listing 618 via touch input, causing the message represented by affordance 624 to become displayed with emoji character 612 in message input field 616. Turning to FIGS. 6E-6F, a user optionally selects send affordance 632 to send the content of message input field 616 as reply message 610 to participant 606. Reply message 610 includes emoji character 612 and the expression associated with affordance 624. In some examples, reply message 610 occupies a region in the display of the message transcript area that is visually distinguishable from the background of the message transcript area.

Advantageously, the user interfaces described in connection with FIGS. 6A-6F enables an end-user to pair the expression "I HAVE EYES FOR YOU!" with emoji character 612 for transmission in an electronic message, without requiring the end-user to key-in or type each one of the characters of that expression. Instead, device 602 detects selection of emoji character 612, determines that (at least) the expression "I HAVE EYES FOR YOU!" is relevant as a suggestion to pair with emoji character 612, and then presents the expression "I HAVE EYES FOR YOU!" as a suggestion for insertion or inclusion in reply message 610. Additional details associated with how expressions are suggested based on emoji selection are described with reference to FIG. 11 and FIG. 12.

Figure 7A:
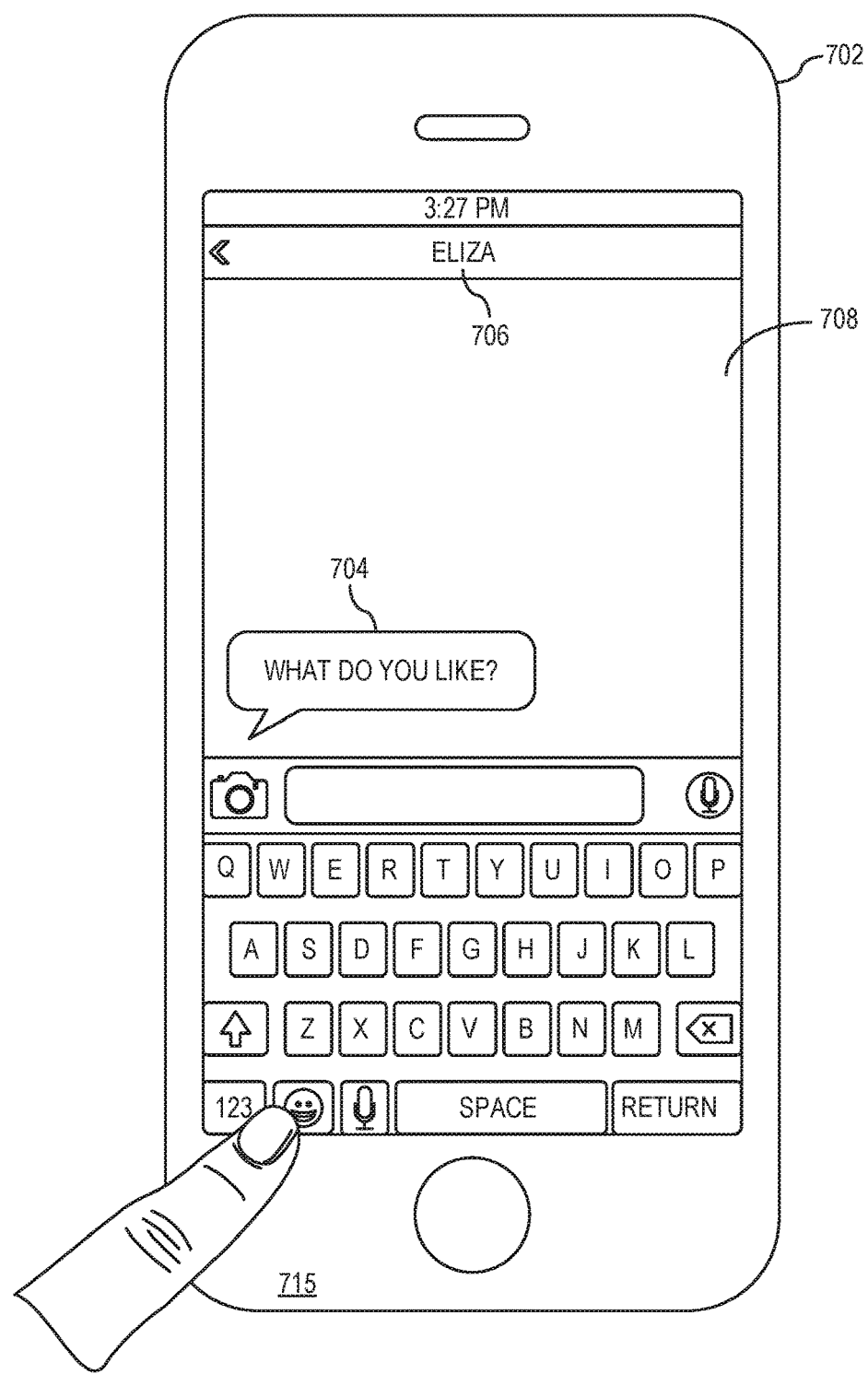
FIGS. 7A-7E illustrate exemplary user interfaces associated with a second sequence for composing a message using predictive content in accordance with some embodiments.
Figure 7B:
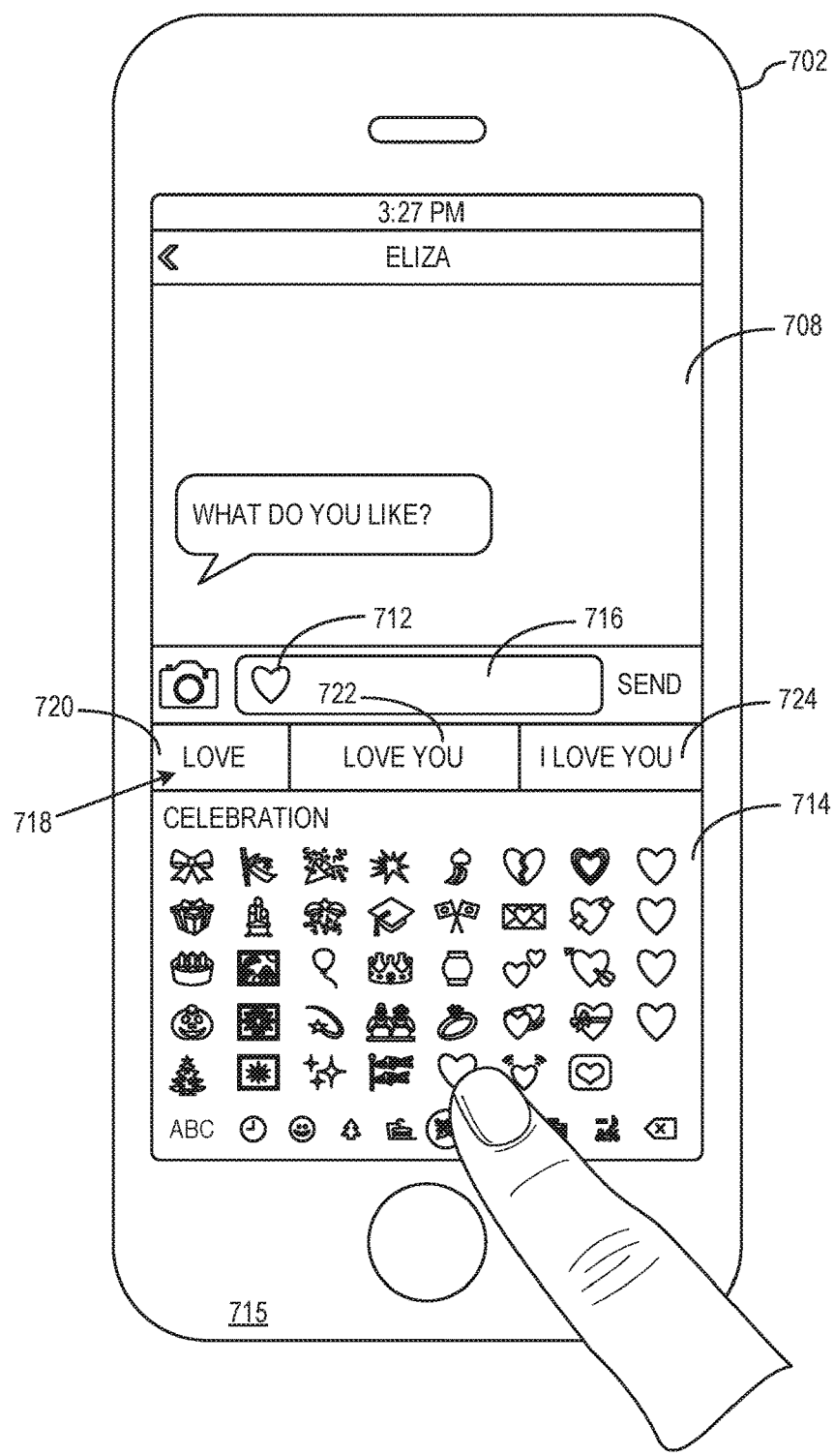
Figure 7C:
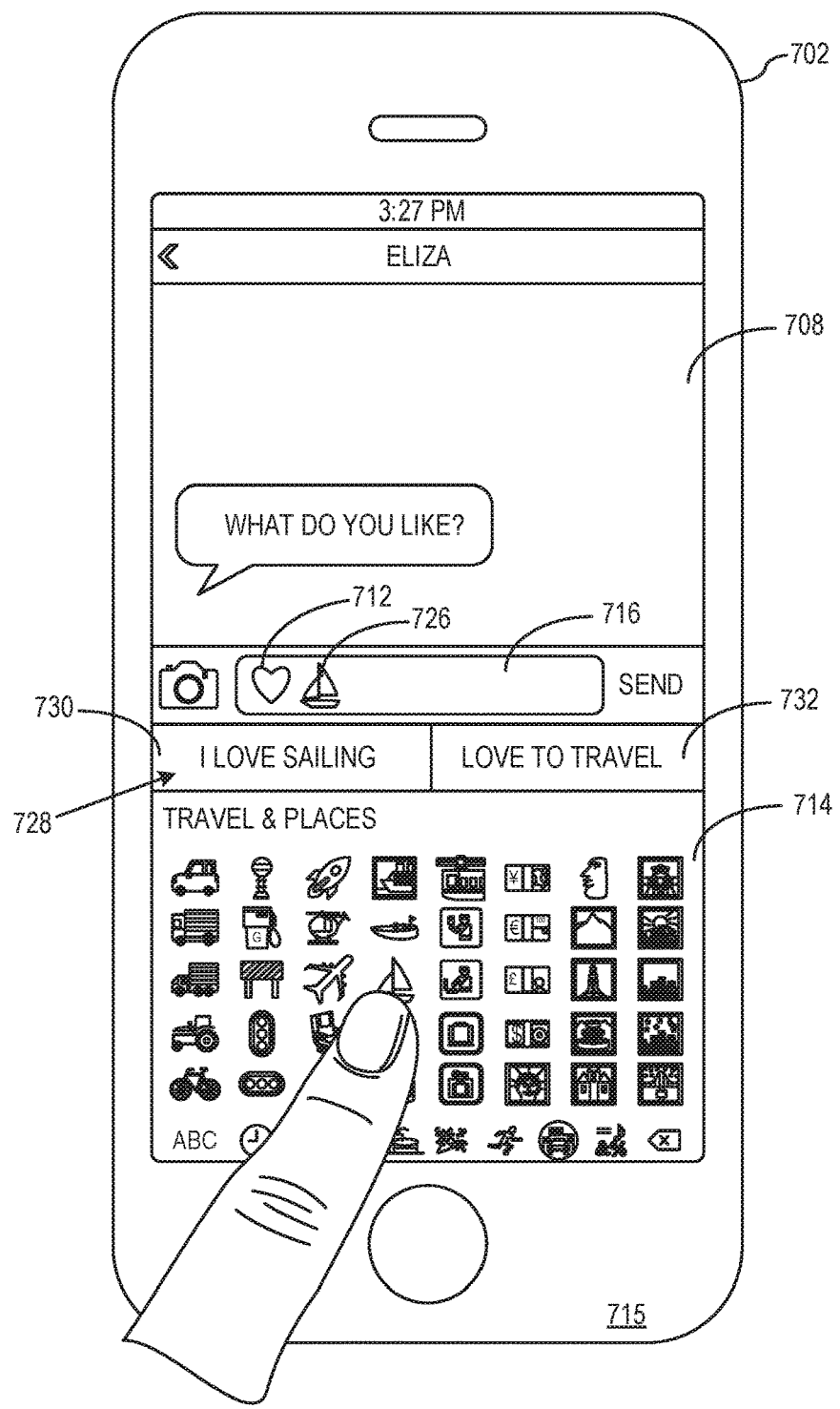

FIGS. 7A-7E illustrate exemplary user interfaces associated with a second sequence of user interfaces for composing a message using predictive content, in accordance with some embodiments. As shown in FIG. 7A, device 702 displays message 704 received from participant 706 in message transcript 708. As shown in FIGS. 7B-E, reply message 710 is optionally composed by selecting emoji character 712 from emoji keyboard 714. Device 702 displays the selected emoji character 712 in message input field 716. In response to detecting selection of emoji character 712, device 702 displays affordance listing 718 having affordances 720, 722, 724, etc., that are accessible via left or right swipe gestures. Turning to FIG. 7C, the user optionally selects additional emoji character 726 from emoji keyboard 714, thereby further populating message input field 716 together with emoji character 726 in addition to emoji character 712. In some examples, responsive to detecting selection of emoji characters 712 and 726, device 702 updates affordance listing 728 to include content predicted based on the combination of emoji characters 712 and 726.

Figure 7D:
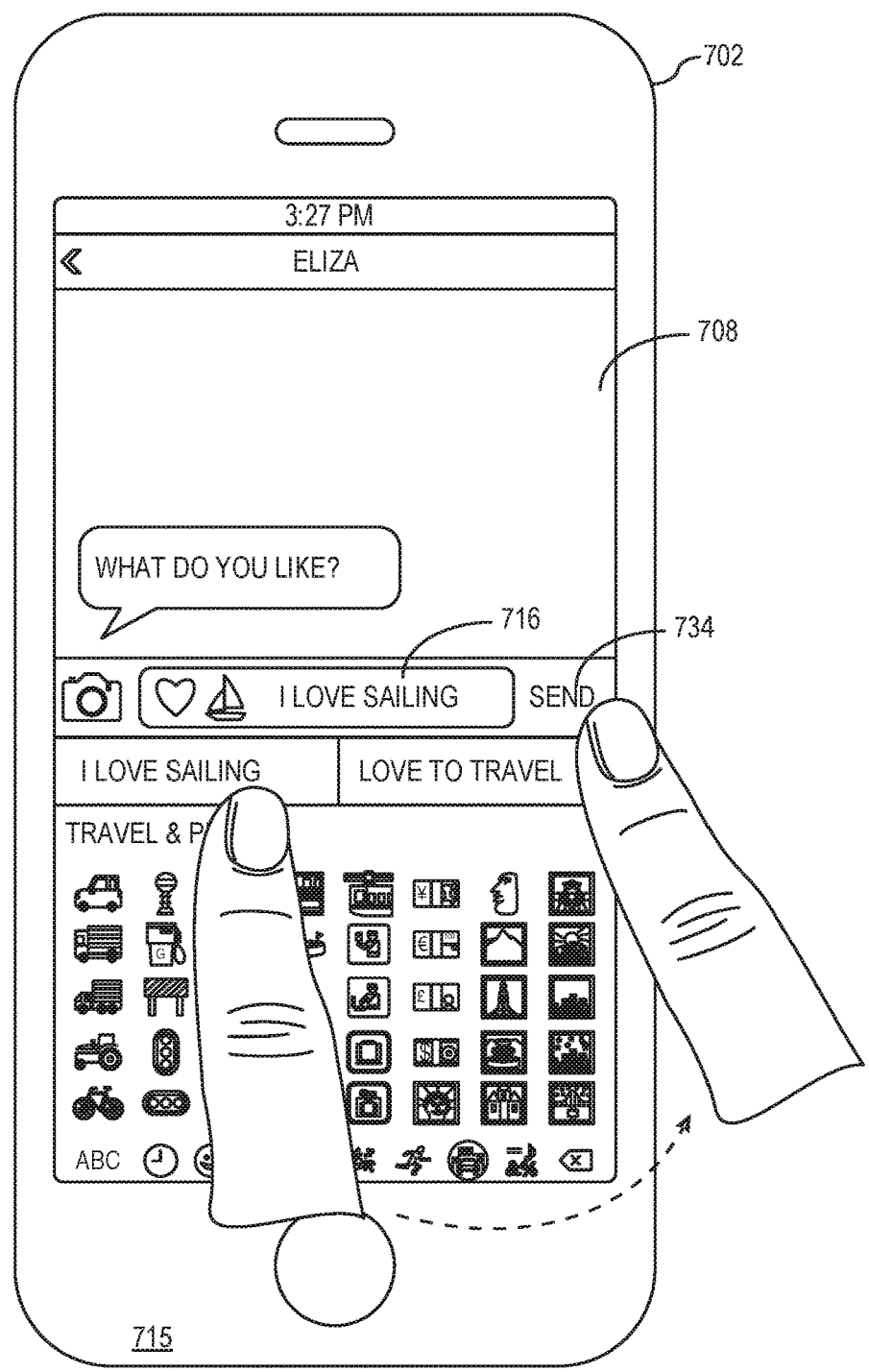
Figure 7E:
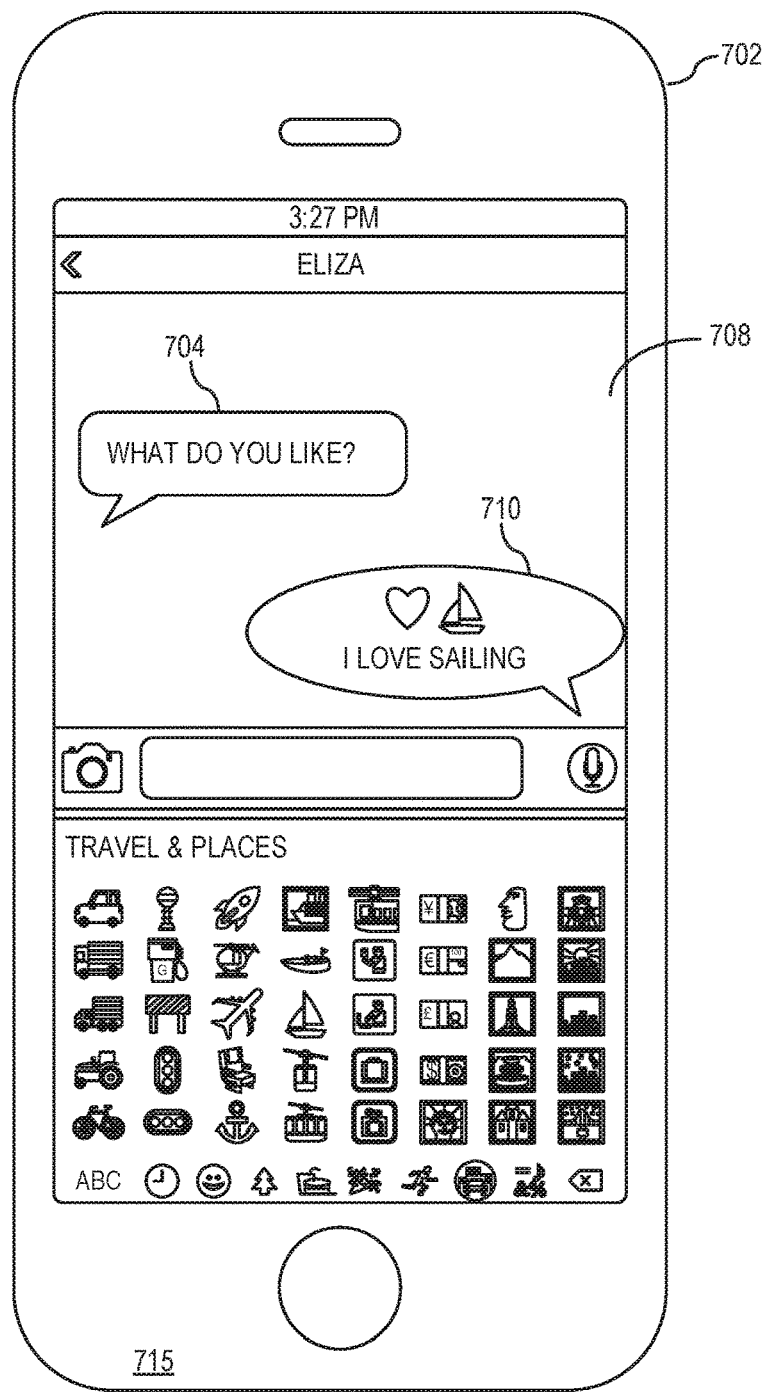

Turning to FIG. 7D, a user optionally selects affordance 730 from affordance listing 728 via touch input, causing the message represented by affordance 730 to become displayed with emoji characters 712 and 726 in message input field 716. Turning to FIG. 7E with continued reference to FIG. 7D, a user optionally selects send affordance 734, causing device 702 to create and send reply message 710, containing the content of message input field 716, to participant 706. In some examples, reply message 710 occupies a region in the display of the message transcript area that is visually distinguishable from the background of the message transcript area.

Advantageously, the user interfaces described in connection with FIGS. 7A-7E enables an end-user to pair the expression "I LOVE SAILING" with emoji character 712 (e.g., love) and emoji character 726 (e.g., sailboat) for transmission in an electronic message, without requiring the end-user to key-in or type each one of the characters of that expression. Instead, device 702 detects selection of emoji character 712, identifies at least one expression (e.g., "LOVE TO TRAVEL") that is relevant as a suggestion to pair with emoji character 712, and then presents the at least one expression as a suggestion for insertion or inclusion in reply message 710. Furthermore, device 702 also detects selection of emoji character 726, determines that (at least) the expression "I LOVE SAILING" is relevant as a suggestion to pair with both emoji character 712 and emoji character 726, and then presents the expression "I LOVE SAILING" as a suggestion for insertion or inclusion in reply message 710 together with emoji character 712 and emoji character 726. Additional details associated with how expressions are suggested based on emoji selection are described with reference to FIG. 11 and FIG. 12.

Figure 8A:
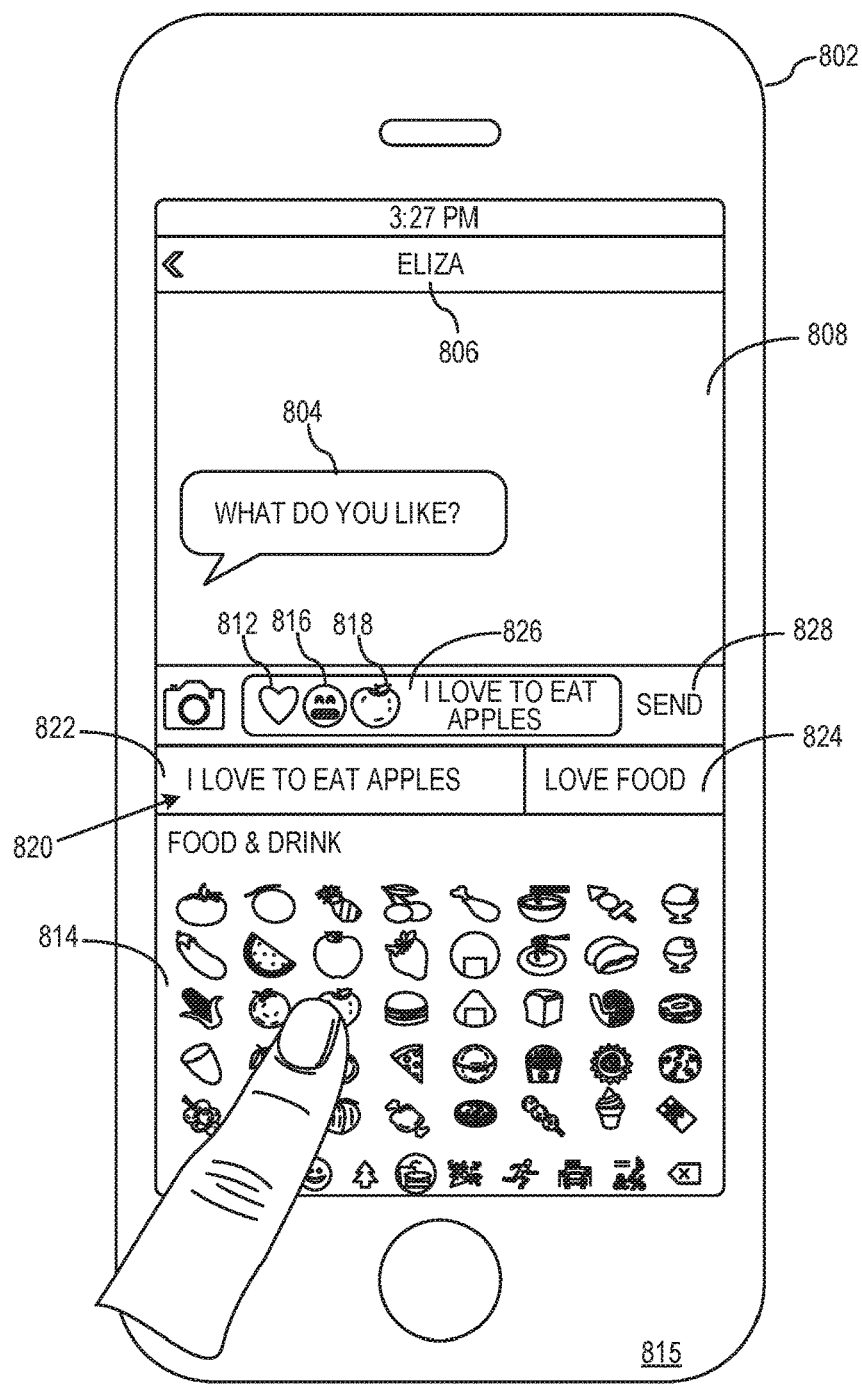
FIGS. 8A-8B illustrate exemplary user interfaces associated with a third sequence for composing a message using predictive content in accordance with some embodiments.
Figure 8B:
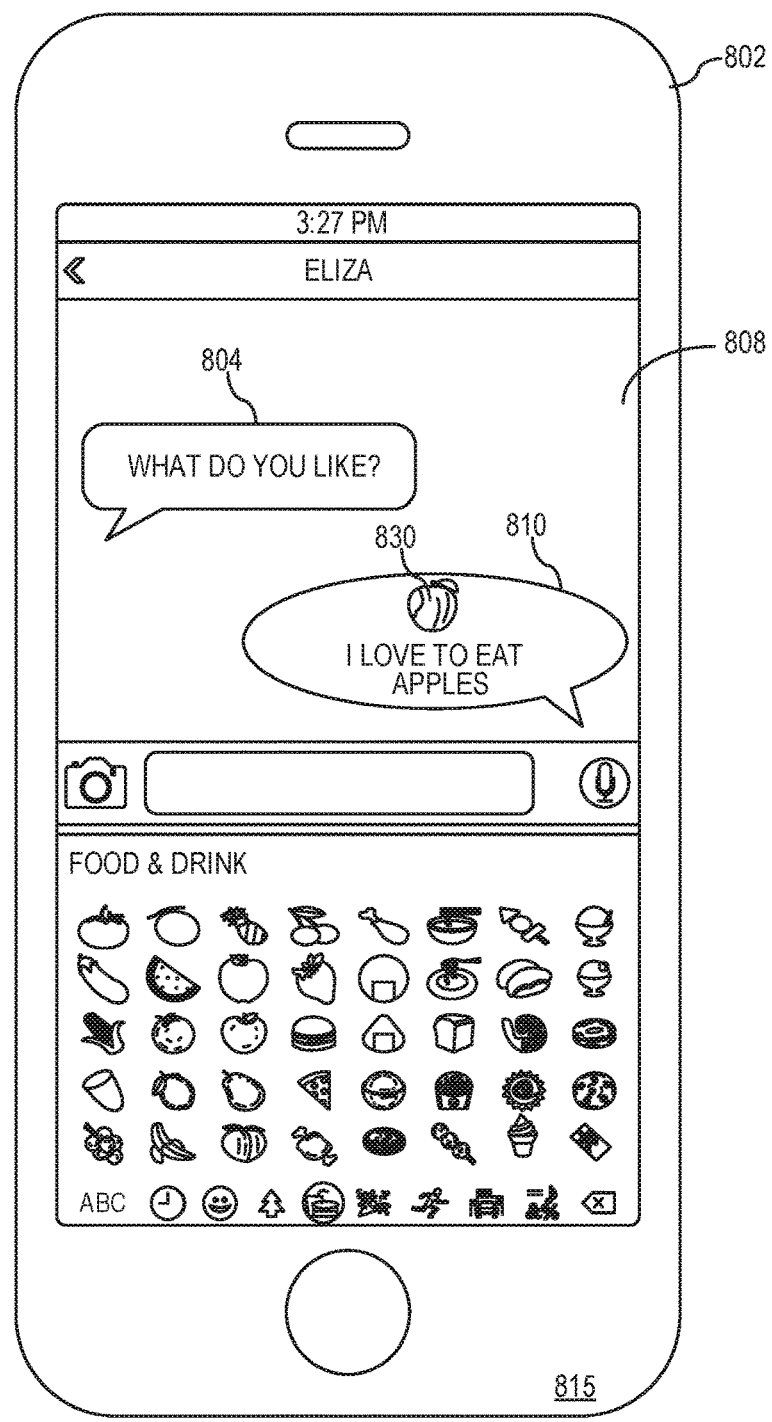

FIGS. 8A-8B illustrate exemplary user interfaces associated with a third sequence of user interfaces for composing a message using predictive content in accordance with some embodiments. As shown in FIG. 8A, device 802 displays message 804 received from participant 806 is displayed in message transcript 808. As shown in FIG. 8B, reply message 810 is optionally composed by selecting emoji characters 812, 816, and 818 from emoji keyboard 814. In response to detection of selection of emoji character 818, device 802 displays affordance listing 820 having affordances 822, 824, etc., are accessible via left or right swipe gesture. Affordances 822, 824, etc. represent predicted content selected by device 802 based on factors such as (1) the combination of user-selected emoji characters 812, 816, and 818 and/or (2) the content of message 804. In this example, affordance 822 is selected from affordance listing 820 via touch input, and the expression associated with affordance 822 is displayed in message input field 826 together with emoji character 812, emoji character 816, and emoji character 818 (e.g., FIG. 8A). Additionally, in response to detection of selection of control 828 (e.g., FIG. 8A), reply message 810 is displayed in message transcript 808 (e.g., FIG. 8B). In this example, reply message 810 includes emoji character 830 and the expression associated with affordance 822, whereby emoji character 830 corresponds to an "apple with a bite" and thus represents a combination of emoji character 812, emoji character 816, and emoji character 818.

Advantageously, the user interfaces described in connection with FIGS. 8A-8B enables an end-user to pair the expression "I LOVE TO EAT APPLES" with emoji characters 812, 816, 818 for transmission in an electronic message, without requiring the end-user to key-in or type each one of the characters of that expression. Instead, device 802 detects the entered sequence of emoji characters 812, 816, 818, determines that (at least) the expression "I LOVE TO EAT APPLES" is relevant as a suggestion to pair with emoji characters 812, 816, 818, and then presents the expression "I LOVE TO EAT APPLES" as a suggestion for insertion or inclusion in reply message 810. Furthermore, device 802 determines a relationship between emoji characters 812, 816, 818, and then generates and inserts emoji character 830 in reply message 810, together with the "I LOVE TO EAT APPLES" expression. It is contemplated that the emoji character 830 is static or animated (e.g., whereby emoji character 814 takes a "bite" of emoji character 818, and then emoji character 830 is presented or displayed). Additional details associated with how expressions are suggested based on emoji selection are described with reference to FIG. 11 and FIG. 12.

Figure 9A:
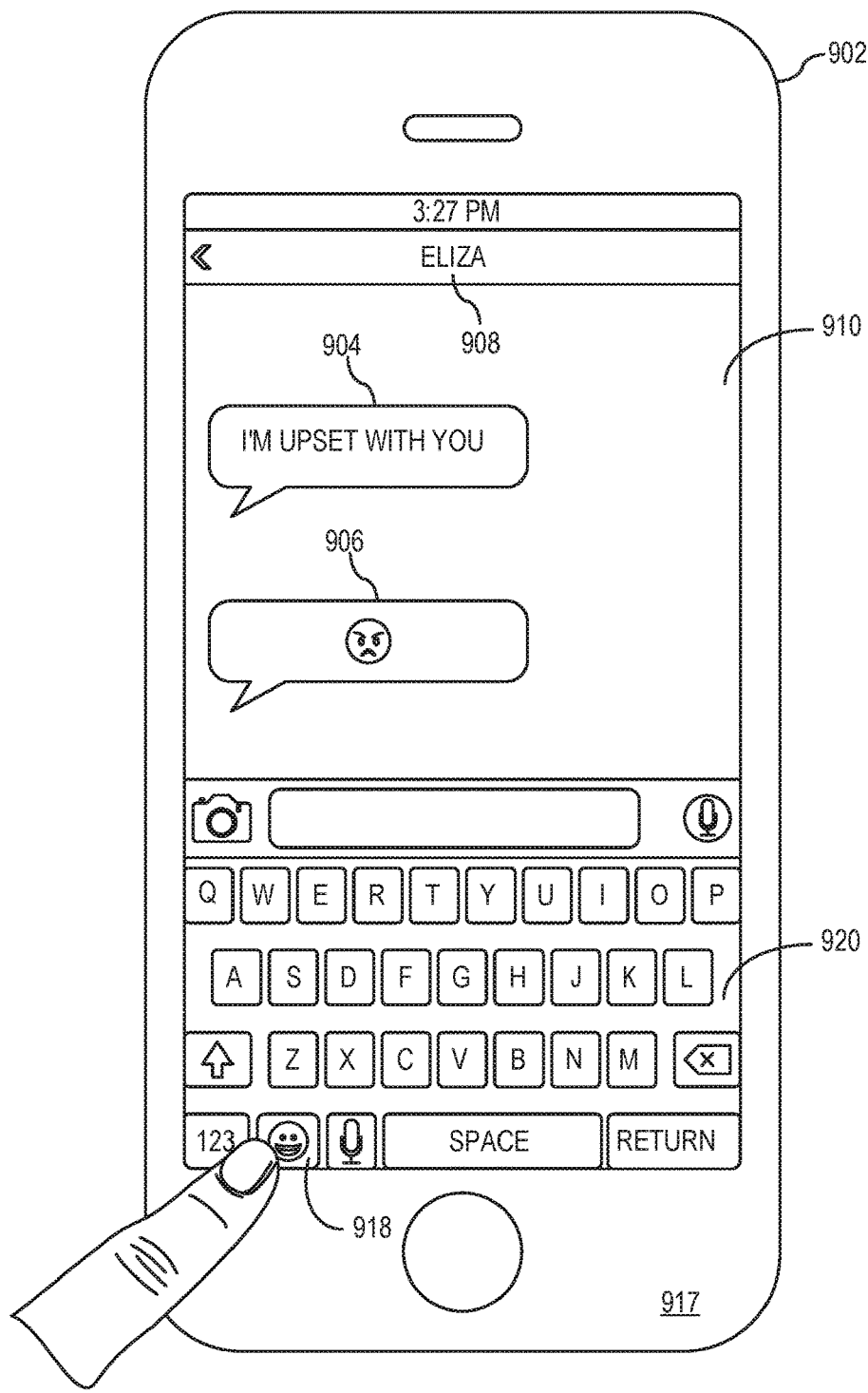
FIGS. 9A-9E illustrate exemplary user interfaces associated with a fourth sequence for composing a message using predictive content in accordance with some embodiments.
Figure 9B:
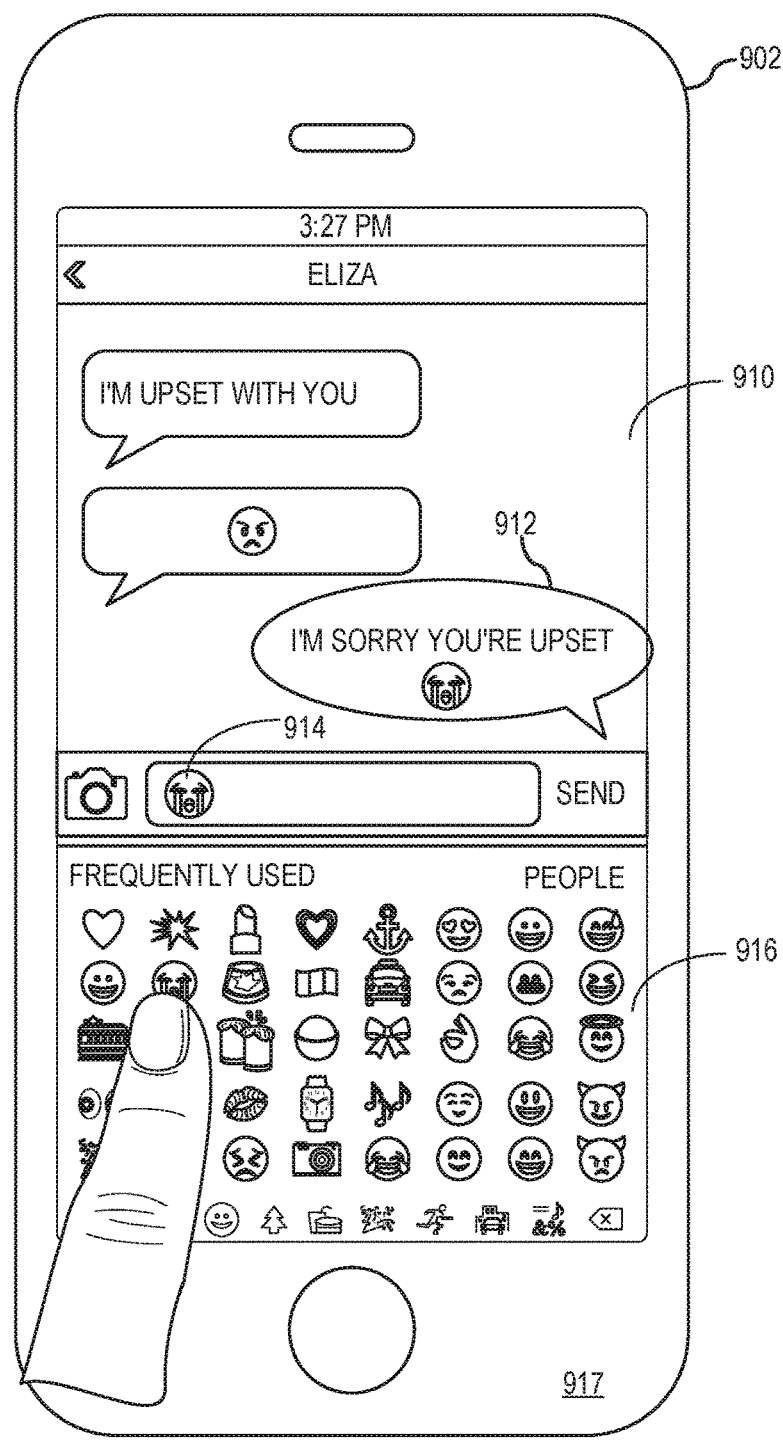

FIGS. 9A-9E illustrate exemplary user interfaces associated with a fourth sequence of user interfaces for composing a message using predictive content, in accordance with some embodiments. As shown in FIG. 9A, device 902 displays message 904 and message 906 created by participant 908 in message transcript 910. As shown in FIG. 9B, reply message 912 is optionally composed by selecting emoji character 914 from emoji keyboard 916 via touch input on touch-sensitive surface 917. In some examples, emoji keyboard 916 is displayed in response to a detected touch input of control 918 of virtual keyboard 920 (e.g., FIG. 9A). In some examples, device 902 analyzes at least one of message 904 and message 906, and suggests emoji characters as predicted content based on the analysis.

Figure 9C:
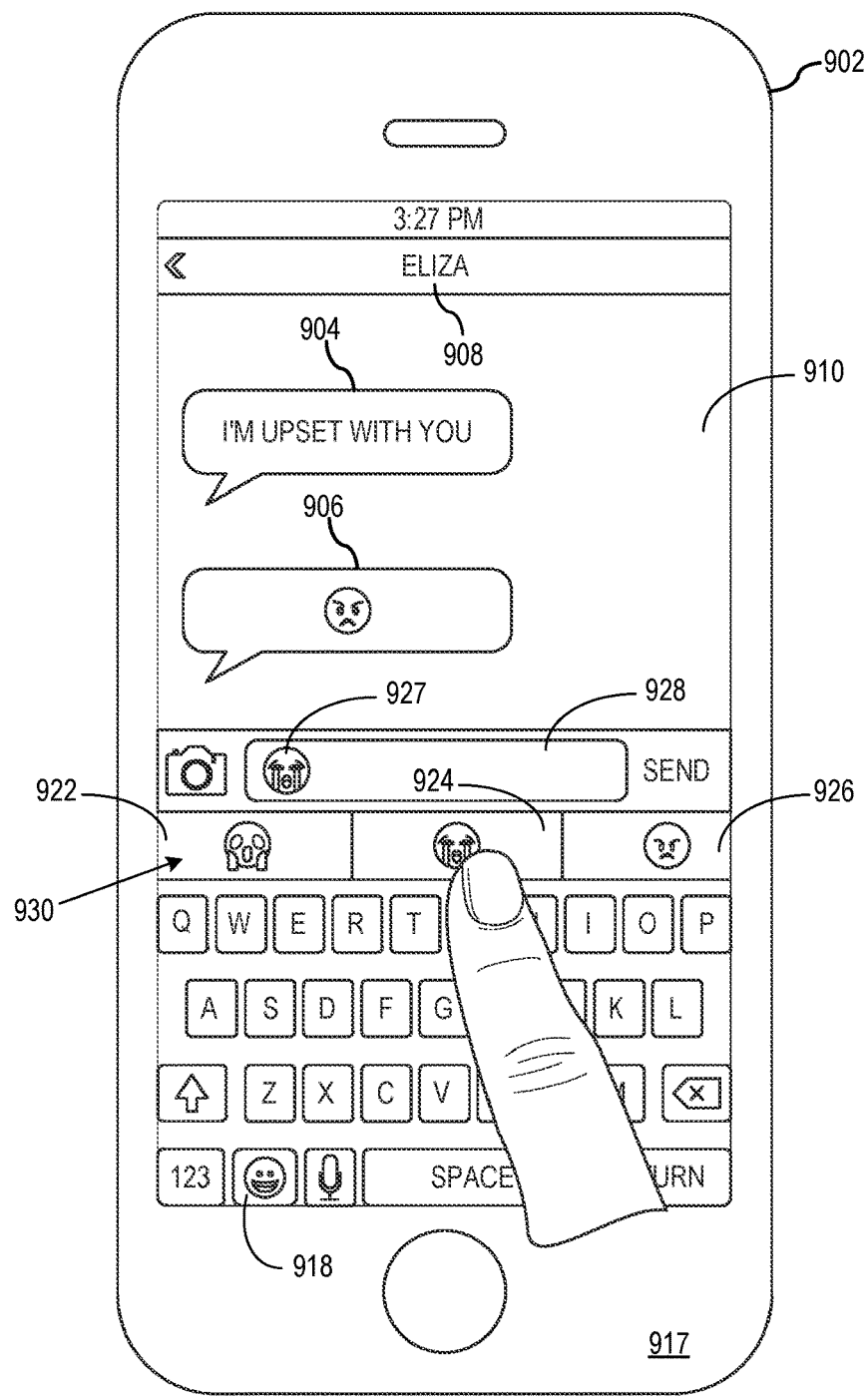

Turning to FIG. 9C, device 902 displays message 904 and message 906 created by participant 908 in message transcript 910. Reply message 912 is composed whereby, in response to detection of selection of control 918 for example, affordance listing 930 is displayed whereby affordances 922, 924, 926, etc., are accessed via left or right swipe gesture. In some examples, affordance 924 is selected from affordance listing 930 via touch input, and emoji character 927 is displayed in message input field 928. Additionally, in response to detecting selection of affordance 924, affordance listing 930 is displayed whereby affordances 932, 934, etc., are accessible via left or right swipe gesture (e.g., FIG. 9D). In some embodiments, affordance listing 930 is created in the same way as listing 728 of FIG. 7C. In this example, affordance 932 is selected from affordance listing 930 via touch input, and the associated phrase is displayed in message input field 928 together with emoji character 927 (e.g., FIG. 9D). Additionally, in response to detection of selection of control 936 (e.g., FIG. 9D), reply message 912 is displayed in message transcript 910 (e.g., FIG. 9E), and reply message 912 includes emoji character 927 and the expression associated with affordance 932.

Figure 9D:
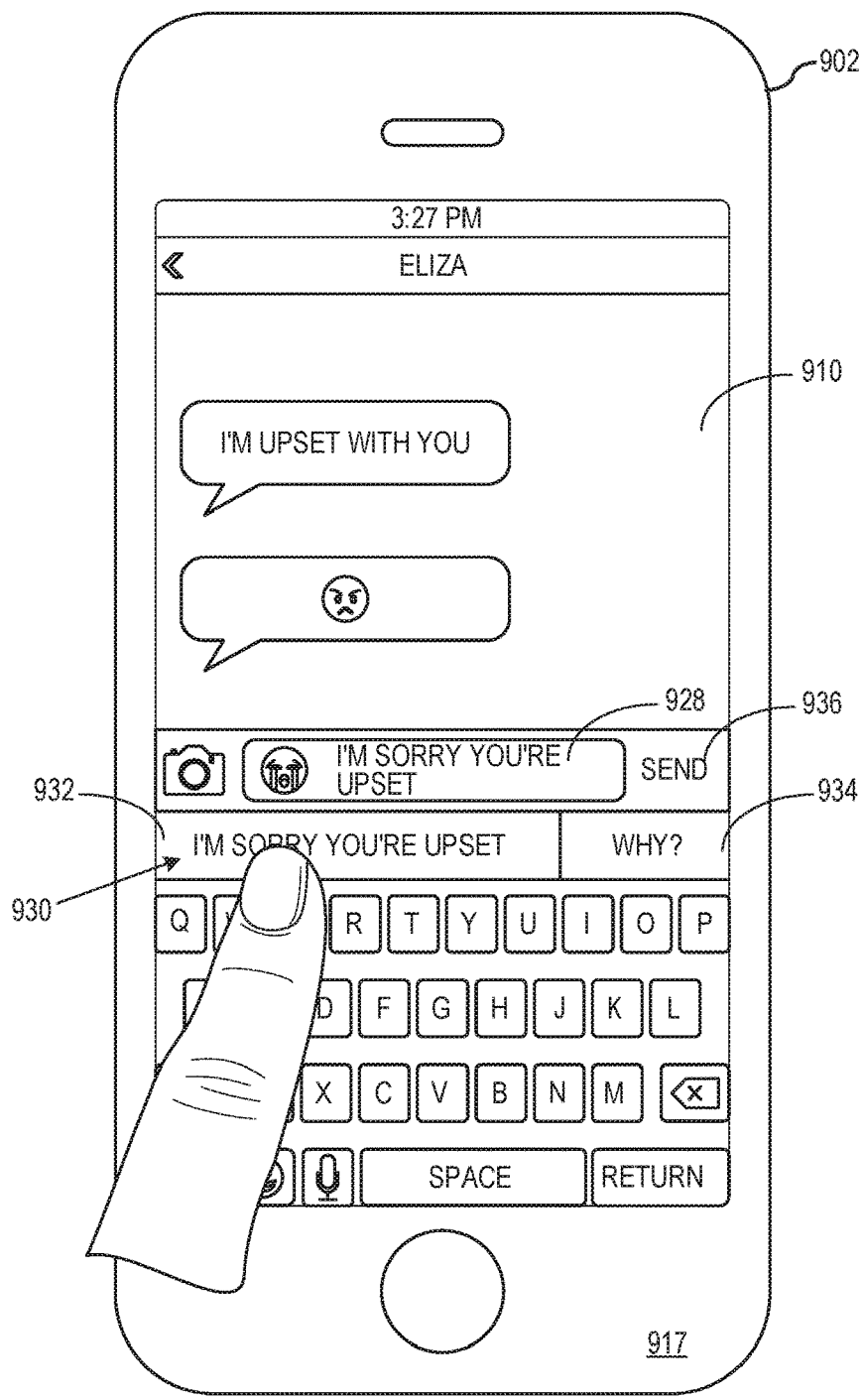
Figure 9E:
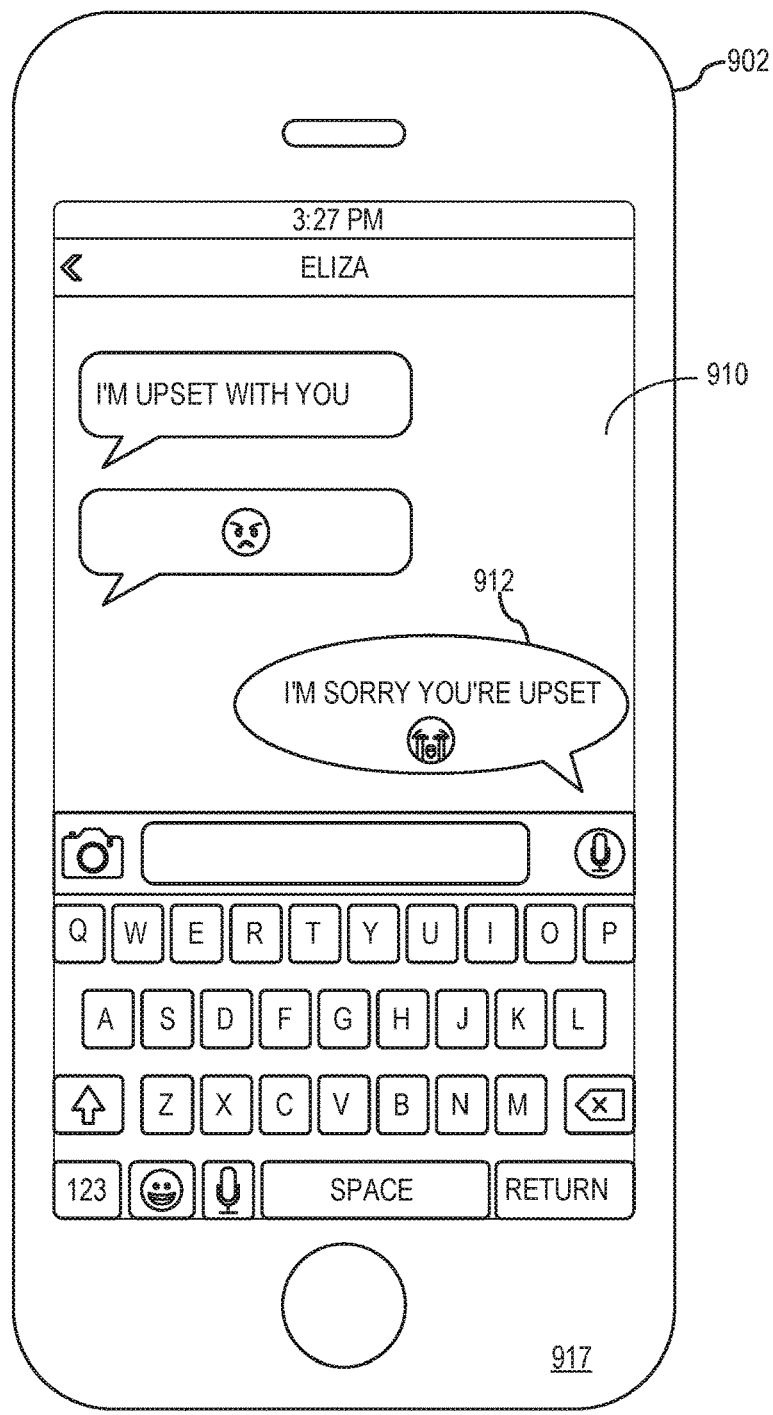

Advantageously, the user interfaces described in connection with FIGS. 9C-9E enables an end-user to pair the expression "I'M SORRY YOU'RE UPSET" with emoji character 927 for transmission in an electronic message, without requiring the end-user to key-in or type each one of the characters of that expression. Instead, device 902 detects selection of emoji character 927, identifies at least one expression that is relevant as a suggestion to pair with emoji character 927, and then presents the at least one expression as a suggestion for insertion or inclusion in reply message 912. Furthermore, device 902 detects selection of control 918 of virtual keyboard 920 (e.g., FIG. 9A), analyzes the content of one or both of message 904 and message 906 as displayed in message transcript 910, determines that (at least) emoji character 927 is relevant as a suggestion for insertion or inclusion in reply message 912, and presents emoji character 927 as a suggestion for insertion or inclusion in reply message 912. Additional details associated with how expressions are suggested based on emoji selection are described with reference to FIG. 11 and FIG. 12.

Figure 10A:
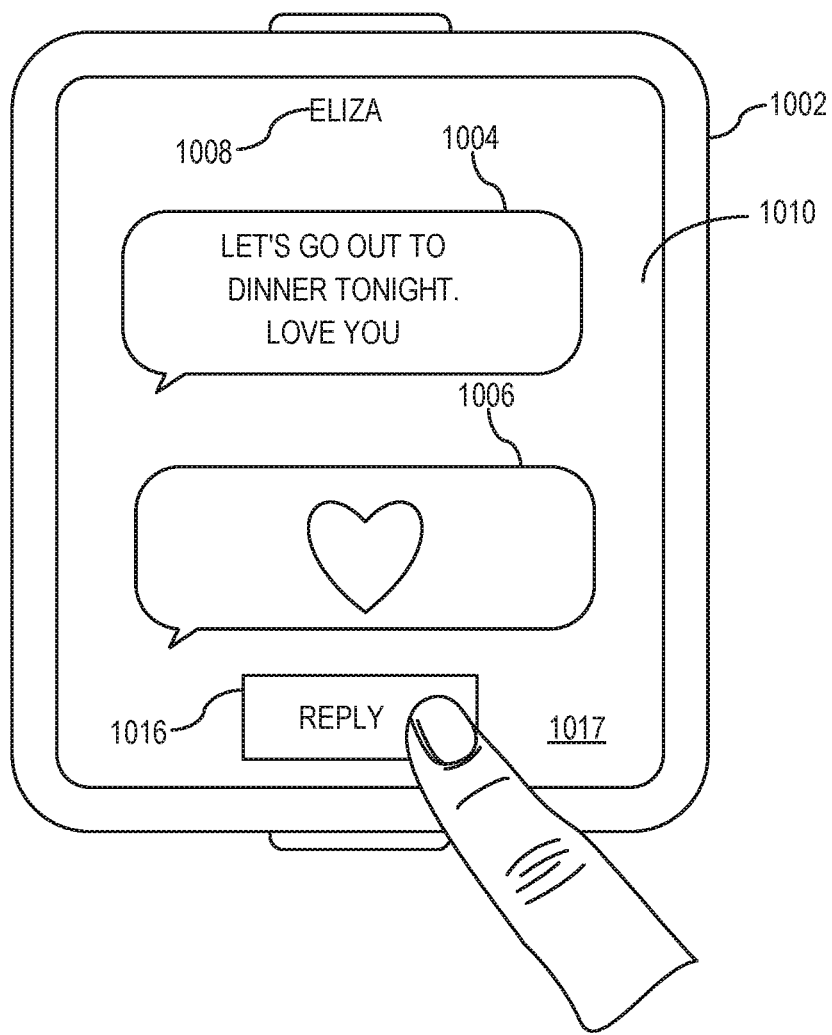
FIGS. 10A-10G illustrate exemplary user interfaces associated with a fifth sequence for composing a message using predictive content in accordance with some embodiments.
Figure 10B:
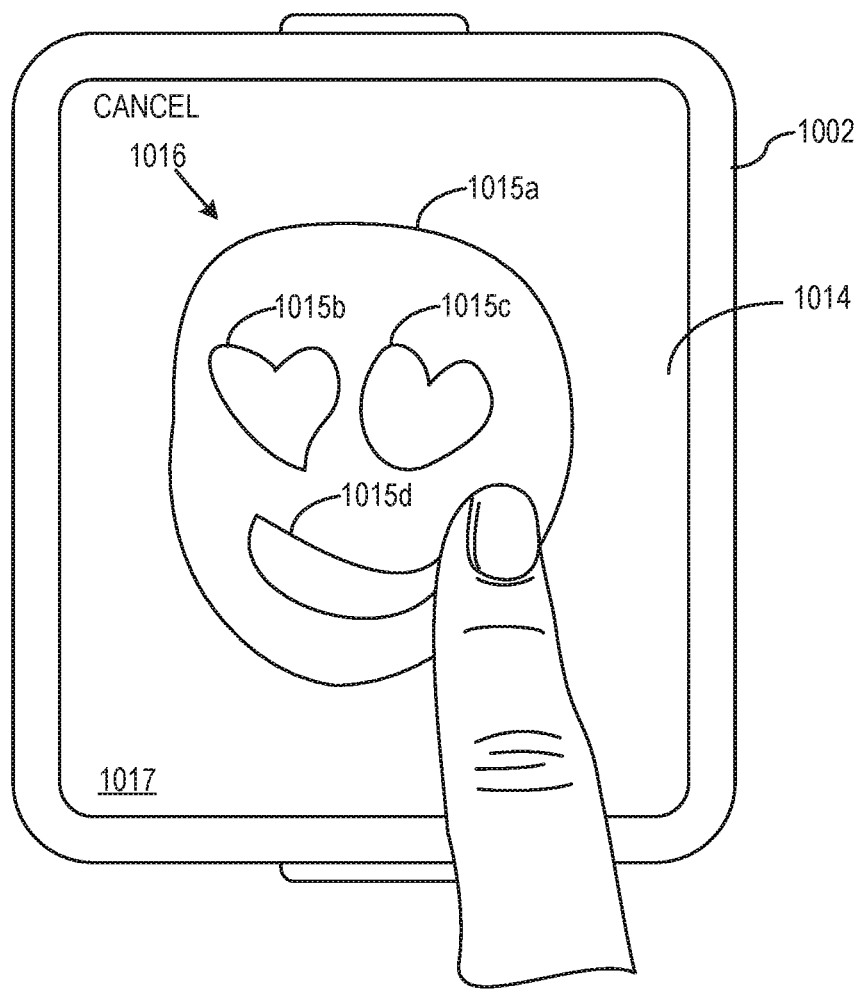

FIGS. 10A-10G illustrate exemplary user interfaces associated with a fifth sequence of user interfaces for composing a message using predictive content, in accordance with some embodiments. As shown in FIG. 10A, device 1002 displays incoming messages 1004 and 1006 created by participant 1008 in message transcript 1010. As shown in FIG. 10B, a user optionally composes reply message 1012 by drawing on message composition area 1014, via touch input on touch-sensitive surface 1017.

Figure 10C:
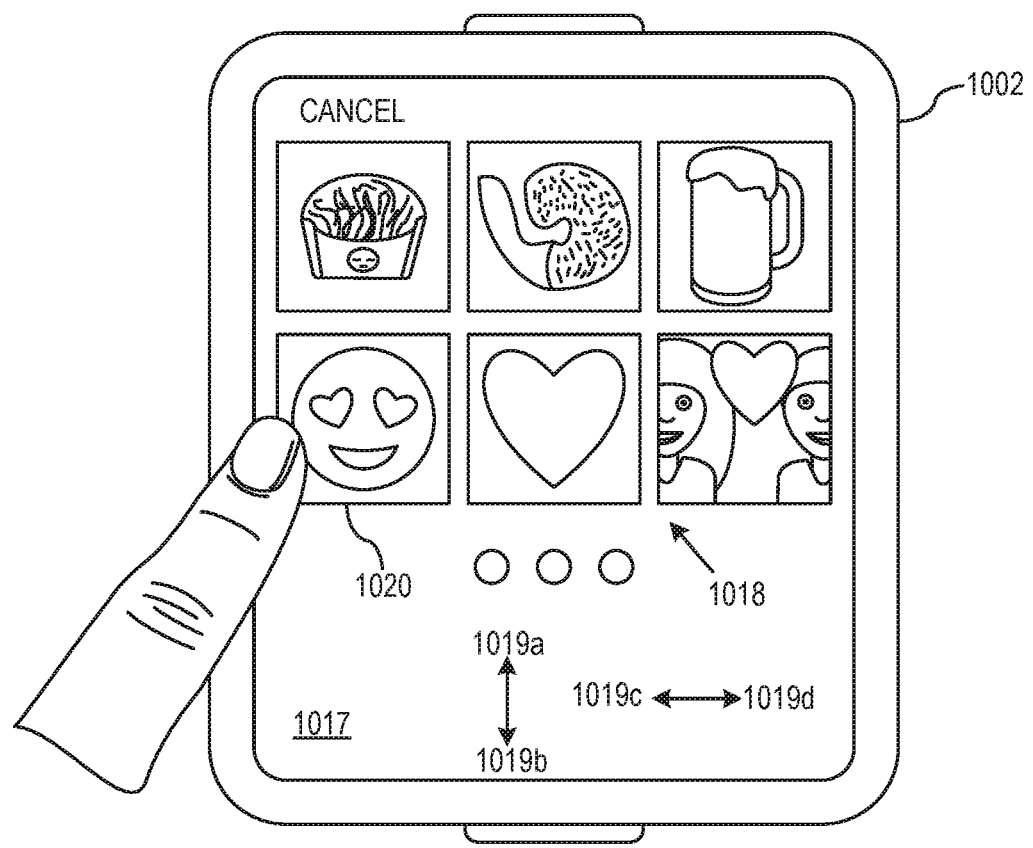
Figure 10D:
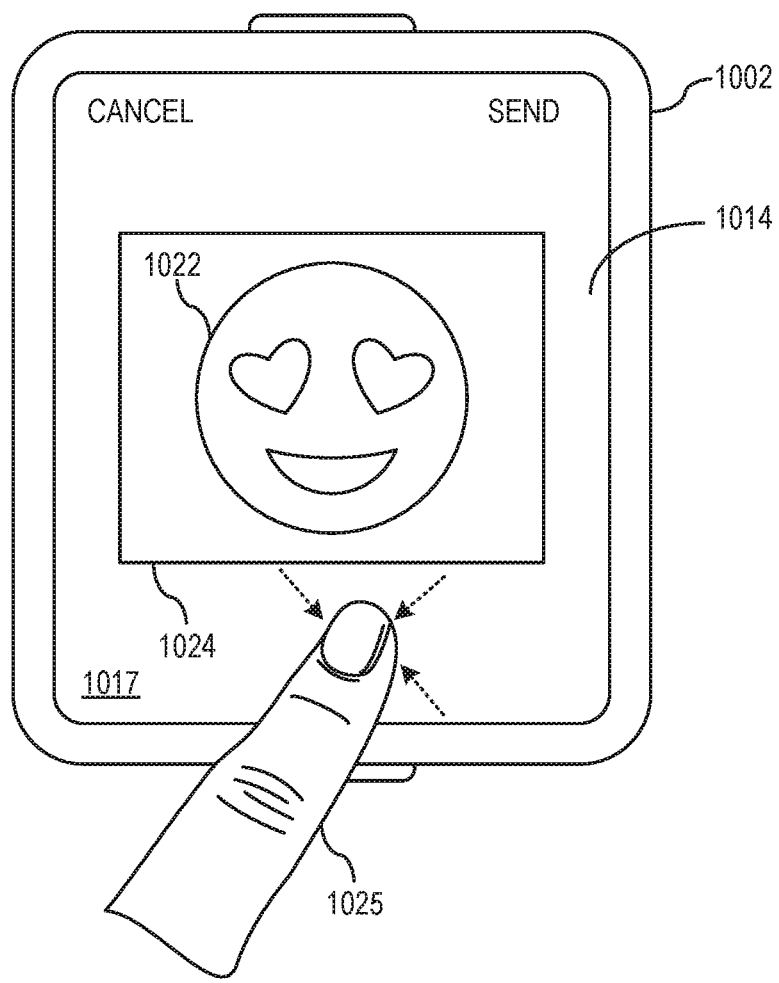

In some examples, device 1002 identifies one or more features or characteristics 1015a-d of custom emoji character 1016 to identify matching, pre-existing emoji characters for use in an electronic message. For example, as can be seen in FIG. 10C, device 1002 displays affordance 1020 for selecting an existing emoji character that resembles the hand-drawn emoji character 1016 of FIG. 10B. Turning to FIG. 10D, responsive to selection of affordance 1020, device 1002 replaces custom emoji 1016 with pre-exiting emoji 1022 in message composition area 1014.

Figure 10E:
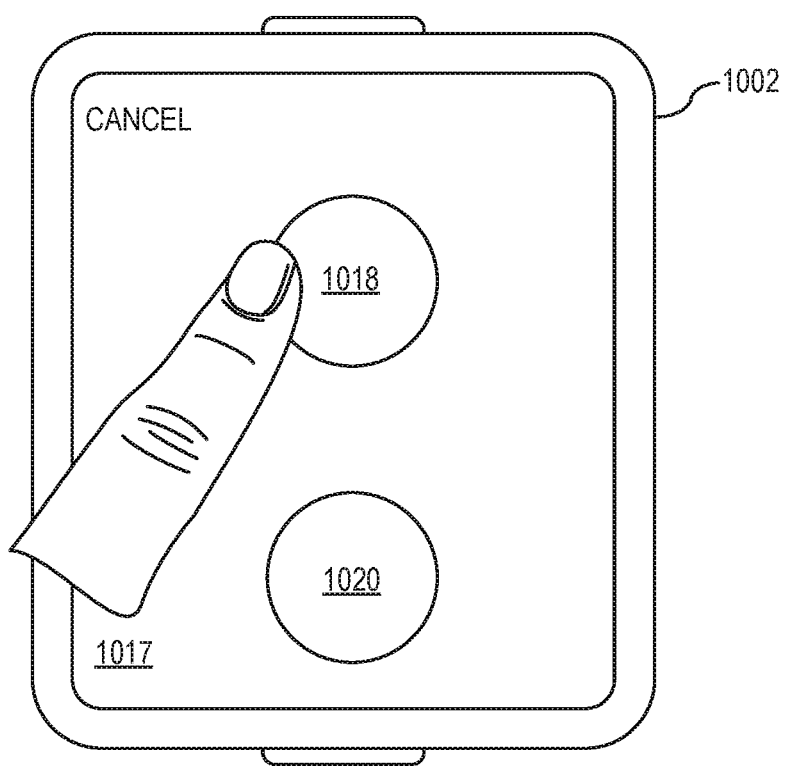
Figure 10F:
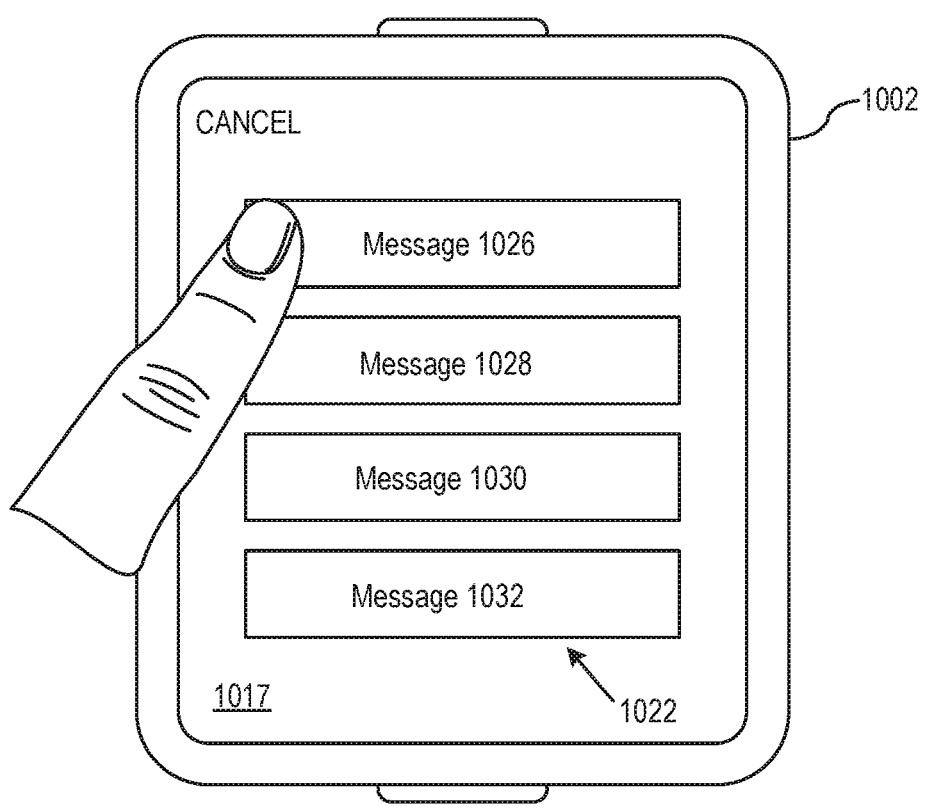
Figure 10G:
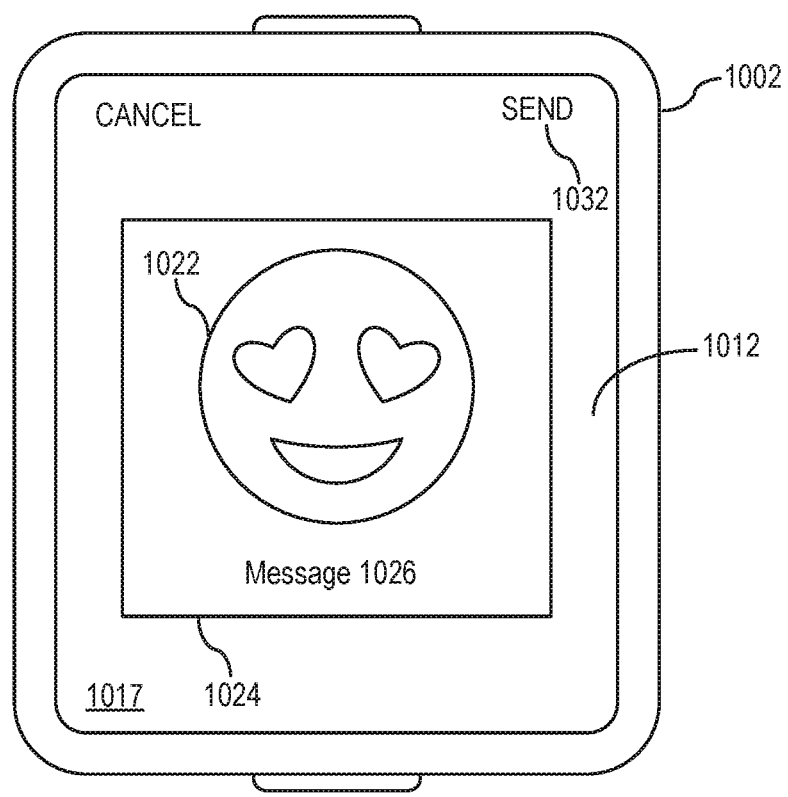

In some examples, response to a deep press (e.g., a touch input exceeding a threshold touch intensity) or a long press (e.g., a touch input exceeding a threshold duration), device 1002 displays affordances for pairing an emoji character with predicted content. Turning to FIG. 10E with continued reference to FIG. 10D, responsive to deep press 1025, device 1002 displays affordances 1018 and 1020 for selecting predictive content that complement the emoji character(s) present in message composition area 1014. For example, selection of first affordance button 1018 causes device 1002 to display one set of predicted content while selection of second affordance button 1020 causes device 1002 to display a different second set of predicted content. In some examples, the first set of predicted content includes predicted messages typically in the form of questions. In some examples, the second set of predicted content includes predicted messages in the form of statements. In the example of FIGS. 10E and 10F, selection of affordance 1018 causes device 1002 to display four predicted questions for inclusion into the message composition area 1014. Turning to FIG. 10G, emoji character 1022 and message 1026 are displayed and are optionally sent by selecting send affordance 1032.

Advantageously, the user interfaces described in connection with FIGS. 10A-10G enables an end-user to pair the expression associated with affordance 1026 with emoji character 1022 for transmission in an electronic message, without requiring the end-user to key-in or type each one of the characters of that expression. Instead, device 1002 detects selection of emoji character 1022, identifies at least one expression that is relevant as a suggestion to pair with emoji character 1022, and then presents the at least one expression as a suggestion for insertion or inclusion in reply message 1024. The present disclosure however is not so limited. This is because device 1002 detects and determines or identifies one or more features or characteristics 1015a-d of custom emoji character 1016 drawn on blank screen 1014, determines that (at least) emoji character 1022 is relevant as a suggestion for insertion or inclusion in reply message 1024, and presents emoji character 1022 as a suggestion for insertion or inclusion in reply message 1024. Additionally, device 1002 detects selection of one of first affordance filter 1018 and second affordance filter 1020 and presents particular expressions as a suggestion for insertion or inclusion in reply message 1024. Additional details associated with such an implementation are discussed in further detail below in connection with at least one of FIG. 11 and FIG. 12.

Exemplary Processes

Figure 11:
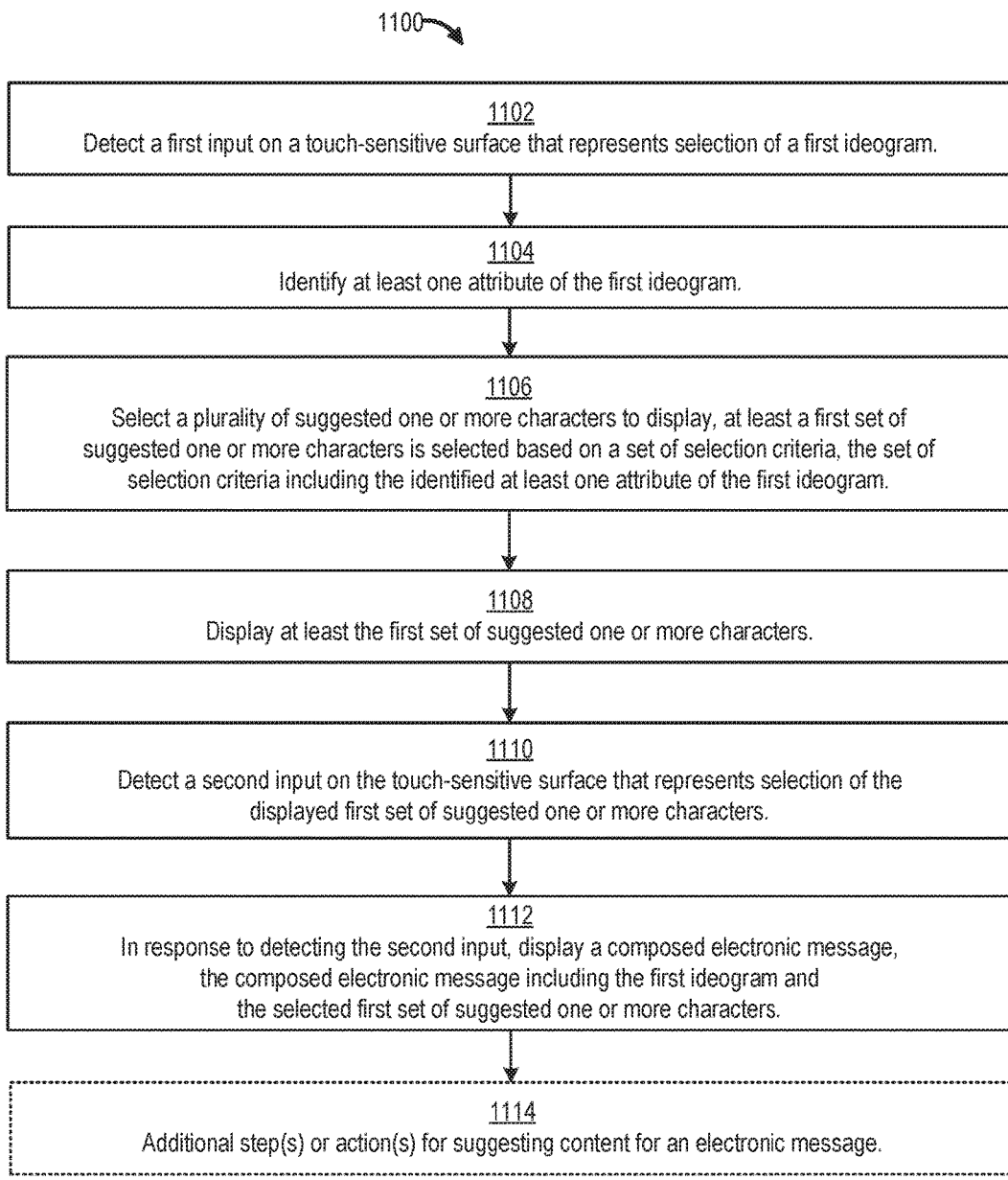
FIG. 11 is a flow diagram illustrating a first process for suggesting content for an electronic message in accordance with some embodiments.

FIG. 11 is a flow diagram illustrating process 1100 for suggesting content for an electronic message. Process 1100 is performed at or by an electronic device with a display and a touch-sensitive surface, such as device 100 (FIG. 1A), 300 (FIG. 1A), 500 (FIG. 5A), for example. At block 1102, the electronic device detects a first input on the touch-sensitive surface that represents selection of a first ideogram. An example of an ideogram is a "smiley face with heart eyes" emoji character. At block 1104, the device identifies at least one attribute of the first ideogram. An example of an ideogram attribute is an indicator that uniquely identifies a particular ideogram, such as a numerical value "X" that is unique to the particular ideogram. At block 1106, the electronic device selects a plurality of suggested one or more characters to display, where at least a first set of suggested one or more characters is selected based on a set of selection criteria, the set of selection criteria including the identified at least one attribute of the first ideogram. Such suggested one or more characters can be drawn from the examples of predictive content discussed above with reference to FIGS. 6A-10G (e.g., "I HAVE EYES FOR YOU!" and "I LOVE SAILING"). Additionally, such one or more characters are selected based on the numerical value "X" that is unique to the first ideogram. For example, a metadata tag associated with each one of the expressions "I HAVE EYES FOR YOU!" and "I LOVE YOU!" can have the numerical value "X", and that metadata tag can be used by the electronic device to select those expressions as discussed in the context of the present disclosure.

At block 1108, the electronic device displays at least the first set of suggested one or more characters. For example, at least the first set of suggested one or more characters can be output by the electronic device to the display for presentation thereby. At block 1110, the electronic device detects a second input on the touch-sensitive surface that represents selection of the displayed first set of suggested one or more characters. For example, an affordance associated with the expression "I HAVE EYES FOR YOU!" can be selected by an end-user to pair or match that expression with the "smiley face with heart eyes" emoji character. At block 1112, in response to detecting the second input, the electronic device displays a composed electronic message, the composed electronic message including the first ideogram and the selected first set of suggested one or more characters. For example, the "smiley face with heart eyes" emoji character and the "I HAVE EYES FOR YOU!" expression is output by the electronic device to the display for presentation so that those two items are associated together and queued for transmission in a text message.

Advantageously, such an implementation as discussed in connection with at least FIG. 11 enables an end-user to pair a particular expression with a particular ideogram for transmission in an electronic message, without requiring the end-user to key-in each one of the characters of that expression. Further steps or actions are however contemplated, represented by block 1114 in FIG. 11 (although, as discussed below, steps or actions of process 1100 are performed or implemented in any particular order), and other benefits and/or advantages flow or follow from such steps or actions.

For example, the electronic device at block 1114, prior to detecting the first input, receives an electronic message and identifies at least one attribute of an ideogram that is embedded in the received electronic message, where the set of selection criteria further includes the at least one attribute of the ideogram that is embedded in the received electronic message. For example, a text message received by the electronic device can contain an "angry face" emoji character, and then a "sad face" emoji character can be selected by an end-user while composing a response. It is contemplated that a suggested expression is selected and displayed by the electronic based on both the "angry face" emoji character and the "sad face" emoji character. The phrase "I'M SORRY THAT YOU ARE ANGRY WITH ME" is an example of such a suggested expression. In practice, the at least one attribute of the ideogram that is embedded in the received electronic message corresponds to a numerical value that is unique to the ideogram, and at least that numerical value is leveraged in order to provide relevant suggested expressions. For example, (1) the "angry face" emoji character has an attribute numerical value "A" and the "sad face" emoji character has an attribute numerical value "B" (2) a look-up is performed by the electronic device using "A" as a query term and, separately, using "B" as a query term (3) query results includes the terms "angry" and "sad" and "sorry" and (4) suggested expressions such as "I'M SORRY THAT YOU ARE ANGRY WITH ME" and "I'M SAD THAT YOU ARE ANGRY WITH ME" are generated and displayed by the electronic device. Advantageously, in such an implementation, selection criteria for suggested expressions is based on contents of a received (and/or sent) electronic message.

As another example, the electronic device at block 1114, prior to detecting the first input, receives an electronic message and identifies at least one constituent of a textual string that is embedded in the received electronic message, where the set of selection criteria further includes the at least one constituent of the textual string that is embedded in the received electronic message. For example, a text message received by the electronic device contains the textual string "I'M ANGRY WITH YOU", and then a "sad face" emoji character is selected by an end-user while composing a response. It is contemplated that a suggested expression is then be selected and displayed by the electronic based on both the textual string "I'M ANGRY WITH YOU" and the "sad face" emoji character. The phrase "I'M SORRY THAT YOU ARE ANGRY WITH ME" is an example of such a suggested expression. In practice, the string is parsed and then each word is identified. That, together with a numerical value that is unique to the first ideogram (discussed in connection with at least block 1102 of FIG. 11) is leveraged in order to provide relevant suggested expressions. For example, (1) the "sad face" emoji character has an attribute numerical value "C" (2) a look-up is performed by the electronic device using "C" as a query term (3) query results includes the terms "angry" and "sad" and "sorry" (4) the textual string is parsed and the terms "I'M" and "ANGRY" and etc. are identified and (5) suggested expressions such as "I'M SORRY THAT YOU ARE ANGRY WITH ME" and "I'M SAD THAT YOU ARE ANGRY WITH ME" are then be generated and displayed by the electronic device. Advantageously, in such an implementation, selection criteria for suggested expressions is based on contents of a received (and/or sent) electronic message.

As another example, the electronic device at block 1114 receives an electronic message, identifies an attribute of an ideogram that is embedded in the received electronic message, and displays the first ideogram (discussed in connection with at least block 1102 of FIG. 11) as a suggested ideogram based on at least the attribute of the ideogram that is embedded in the received electronic message. For example, a text message received by the electronic device contains a "heart" emoji character, and an end-user is navigating a system-generated list of emoji characters while composing a response. It is contemplated that that list is populated with a set of "people in love" emoji characters, a set of "happy face" emoji characters, and etc., where each emoji character presented in the list is selected based on the "heart" emoji character. In practice, the at least one attribute of the ideogram that is embedded in the received electronic message corresponds to a numerical value that is unique to the ideogram, and at least that numerical value is leveraged in order to provide relevant ideogram recommendations. For example, (1) the "heart" emoji character that is in the received electronic has an attribute numerical value "D" (2) a look-up is performed by the electronic device using "D" as a query term (3) query results include various emoji characters or categories of emoji characters that are linked or associated with the "heart" emoji character and (4) suggested emoji characters are then displayed by the electronic device as a recommendation, possibly in a particular order or ordering, such as most-to-least relevant, or grouped according to emoji themes or categories. Advantageously, in such an implementation, selection criteria for suggested ideograms is based on contents of a received (and/or sent) electronic message.

As another example, the electronic device at block 1114 receives an electronic message, identifies at least one constituent of a textual string that is embedded in the received electronic message, and displays the first ideogram (discussed in connection with at least block 1102 of FIG. 11) as a suggested ideogram based on at least the at least one constituent of the textual string that is embedded in the received electronic message. For example, a text message received by the electronic device contains the textual string "I'M ANGRY WITH YOU", and an end-user is navigating a system-generated list of emoji characters while composing a response. It is contemplated that that list is populated with a set of "broken heart" emoji characters, a set of "sad face" emoji characters, and etc., where each emoji character in the list is selected based on the "I'M ANGRY WITH YOU" text. In practice, the textual string is parsed and each word is identified in order to provide relevant ideogram recommendations. For example, (1) the textual string is parsed and the terms "I'm" and "angry" and etc. are identified (2) a look-up is performed by the electronic device to identify emoji characters that have an "angry" sentiment-type metadata associated therewith, and/or variants such as "upset" and "mad" (3) query results include various emoji characters or categories of emoji characters that are linked or associated with the "angry" sentiment-type metadata and (4) suggested emoji characters are then displayed by the electronic device as a recommendation, possibly in a particular order or ordering, such as most-to-least relevant, or grouped according to emoji themes or categories. Advantageously, in such an implementation, selection criteria for suggested ideograms is based on contents of a received (and/or sent) electronic message.

As another example, the electronic device at block 1114, prior to detecting the first input, identifies the first ideogram based on at least one determined characteristic of a custom ideogram detected as an input on the touch-sensitive surface, and displays the first ideogram as a suggested ideogram. For example, an end-user is navigating a system-generated list of emoji characters while composing a message. It is contemplated that that list is populated with a set of "smiley face" emoji characters, a set of "thumbs-up" emoji characters, and etc., where each emoji character in the list is selected based on a custom user-drawn emoji character. For example, the electronic device detects one or more touch gestures on the touch-sensitive surface and identify a "circle" that represents a face, along with a "U" that represents a smile, of the custom user-drawn emoji, and then determines or identifies a match between such characteristics and like or similar characteristics of each emoji character known or otherwise accessible to the electronic device. For example, (1) each identified characteristic of a custom user-drawn emoji is mapped to a particular "value" such as "0" for "face" and "1" for "smile" (2) a look-up is performed by the electronic device to identify emoji characters that have those values associated therewith, which is defined in metadata (3) query results include emoji characters that have those values associated therewith and (4) those emoji characters are then displayed as a recommendation, possibly in a particular order or ordering, such as most-to-least relevant, or grouped according to emoji themes or categories. Advantageously, in such an implementation, selection criteria for suggested ideograms is based on characteristics of a custom user-drawn emoji character.

As another example, the electronic device at block 1114 displays the selected first set of suggested one or more characters with a visual appearance based on the at least one attribute of the first ideogram. For example, a particular phrase "I LOVE YOU" is displayed by the electronic device with a first visual appearance if displayed with a first emoji, but displayed with a second visual appearance if displayed with a second different emoji. It is contemplated that the "visual appearance" of the particular phrase might relate to position or location of the particular phrase with respect to a particular emoji, such as positioned to the left/right or top/bottom of the particular emoji, might relate to color/size/font of the particular message, and/or might relate to "how" the particular message is displayed, such as being displayed similar to a scrolling marquee billboard/ticker. Advantageously, in such an implementation, juxtaposition and/or appearance of a particular selected expression with respect to a selected emoji character is based on the selected emoji character.

Figure 12:
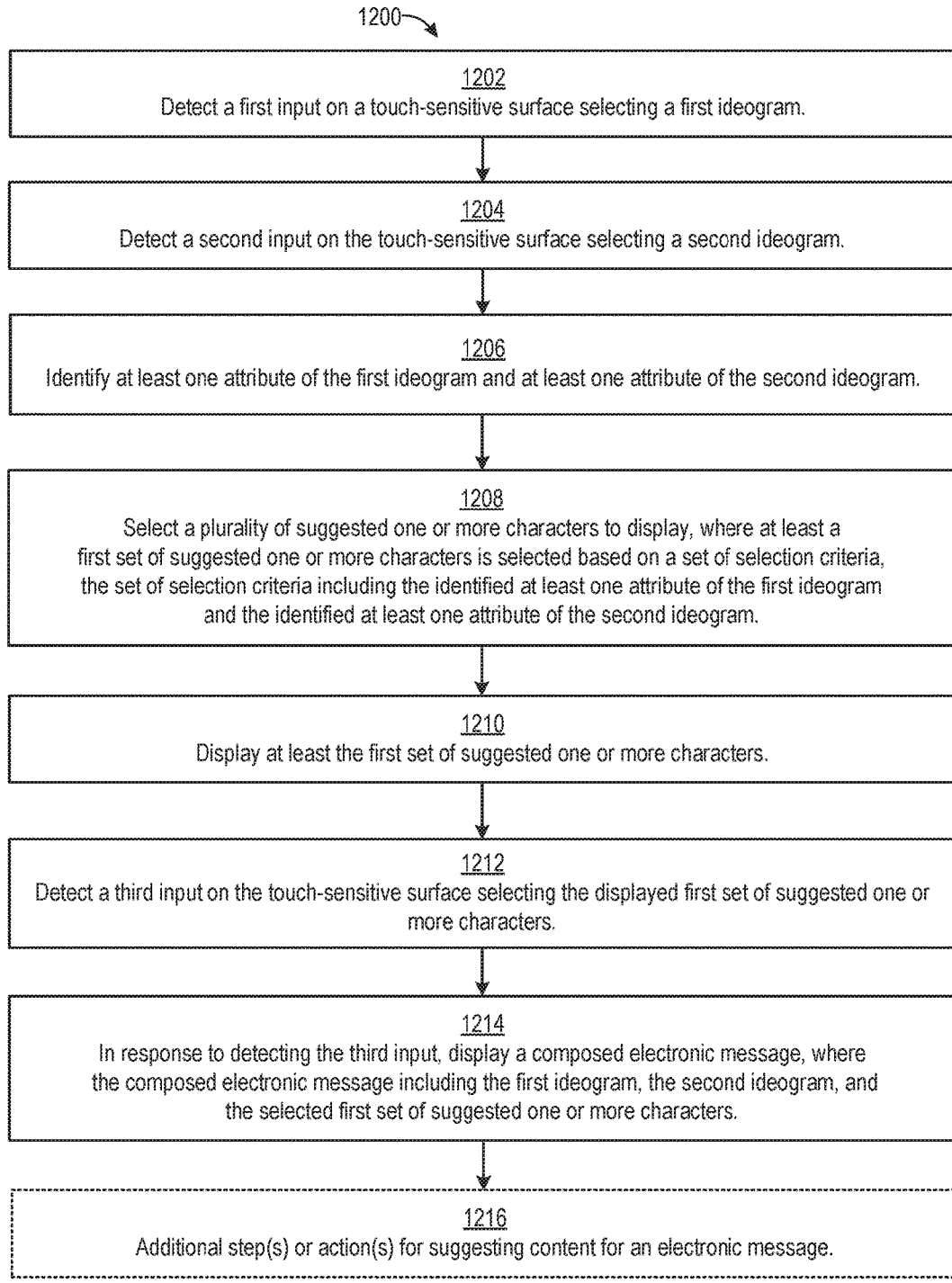
FIG. 12 is a flow diagram illustrating a second process for suggesting content for an electronic message in accordance with some embodiments.

FIG. 12 is a flow diagram illustrating process 1200 for suggesting content for an electronic message. Process 1200 is performed at or by an electronic device with a display and a touch-sensitive surface, such as device 100 (FIG. 1A), 300 (FIG. 1A), 500 (FIG. 5A), for example. At block 1202, the electronic device detects a first input on the touch-sensitive surface selecting a first ideogram. An example of the first ideogram is a "heart" emoji character. At block 1204, the electronic device detects a second input on the touch-sensitive surface selecting a second ideogram. An example of the second ideogram is a "sailboat" emoji character. At block 1206, the electronic device identifies at least one attribute of the first ideogram and at least one attribute of the second ideogram. An example of an ideogram attribute is an indicator that uniquely identifies a particular ideogram, such as a numerical value "X" that is unique to the first ideogram and a numerical value "Y" that is unique to the second ideogram. At block 1208, the electronic device selects a plurality of suggested one or more characters to display, wherein at least a first set of suggested one or more characters is selected based on a set of selection criteria, the set of selection criteria including the identified at least one attribute of the first ideogram and the identified at least one attribute of the second ideogram. Such suggested one or more characters can be drawn from the examples of predictive content discussed above with reference to FIGS. 6A-10G (e.g., "I HAVE EYES FOR YOU!" and "I LOVE SAILING"). Additionally, such one or more characters are selected based on at least one of (1) the numerical value "X" that is unique to the first ideogram (2) the numerical value "Y" that is unique to the second ideogram and (3) the numerical value "X" that is unique to the first ideogram and the numerical value "Y" that is unique to the second ideogram. For example, a first metadata tag and a second metadata tag associated with each one of the expressions "I LOVE SAILBOATS" and "I LOVE SAILING" have the numerical value "X" and the numerical value "Y", respectively, and those metadata tags are used by the electronic device to select those expressions as discussed in the context of the present disclosure.

At block 1210, the electronic device displays at least the first set of suggested one or more characters. For example, at least the first set of suggested one or more characters is output by the electronic device to the display for presentation thereby. At block 1212, the electronic device detects a third input on the touch-sensitive surface selecting the displayed first set of suggested one or more characters. For example, an affordance associated with the expression "I LOVE SAILING" is selected by an end-user to pair or match that expression with the "heart" emoji character and the "sailboat" emoji character. At block 1214, the electronic device, in response to detecting the third input, displays a composed electronic message, the composed electronic message including the first ideogram, the second ideogram, and the selected first set of suggested one or more characters. For example, the "heart" emoji character and the "sailboat" emoji character and the "I LOVE SAILING" expression are output by the electronic device to the display for presentation so that those three items are associated together and queued for transmission in a text message.

Advantageously, such an implementation as discussed in connection with at least FIG. 12 enable an end-user to pair a particular expression with a particular ideogram for transmission in an electronic message, without requiring the end-user to key-in each one of the characters of that expression. Further steps or actions are however contemplated, represented by block 1216 in FIG. 12 (although, as discussed below, steps or actions of process 1200 are performed or implemented in any particular order), and other benefits and/or advantages flow or follow from such steps or actions.

For example, the electronic device at block 1216 receives an electronic message, and identifies at least one attribute of an ideogram that is embedded in the received electronic message, where the set of selection criteria further includes the at least one attribute of the ideogram that is embedded in the received electronic message. For example, a text message received by the electronic device contains an "angry face" emoji character, and then a "sad face" emoji character is selected by an end-user while composing a response. It is contemplated that a suggested expression is then selected and displayed by the electronic based on both the "angry face" emoji character and the "sad face" emoji character. The phrase "I'M SORRY THAT YOU ARE ANGRY WITH ME" is an example of such a suggested expression. In practice, the at least one attribute of the ideogram that is embedded in the received electronic message corresponds to a numerical value that is unique to the ideogram, and at least that numerical value is leveraged in order to provide relevant suggested expressions. For example, (1) the "angry face" emoji character has an attribute numerical value "A" and the "sad face" emoji character has an attribute numerical value "B" (2) a look-up is performed by the electronic device using "A" as a query term and, separately, using "B" as a query term (3) query results include the terms "angry" and "sad" and "sorry" and (4) suggested expressions such as "I'M SORRY THAT YOU ARE ANGRY WITH ME" and "I'M SAD THAT YOU ARE ANGRY WITH ME" are then generated and displayed by the electronic device. Advantageously, in such an implementation, selection criteria for suggested expressions are based on contents of a received (and/or sent) electronic message.

As another example, the electronic device at block 1216 receives an electronic message, and identifies at least one constituent of a textual string that is embedded in the received electronic message, where the set of selection criteria further includes the at least one constituent of the textual string that is embedded in the received electronic message. For example, a text message received by the electronic device contains the textual string "I'M ANGRY WITH YOU", and then a "sad face" emoji character is selected by an end-user while composing a response. It is contemplated that a suggested expression is then selected and displayed by the electronic based on both the textual string "I'M ANGRY WITH YOU" and the "sad face" emoji character. The phrase "I'M SORRY THAT YOU ARE ANGRY WITH ME" is an example of such a suggested expression. In practice, the string is parsed and then each word identified. That, together with a numerical value that is unique to the first ideogram (discussed in connection with at least block 1102 of FIG. 11) is leveraged in order to provide relevant suggested expressions. For example, (1) the "sad face" emoji character has an attribute numerical value "C" (2) a look-up is performed by the electronic device using "C" as a query term (3) query results include the terms "angry" and "sad" and "sorry" (4) the textual string is parsed and the terms "I'M" and "ANGRY" and etc. are identified and (5) suggested expressions such as "I'M SORRY THAT YOU ARE ANGRY WITH ME" and "I'M SAD THAT YOU ARE ANGRY WITH ME" are then generated and displayed by the electronic device. Advantageously, in such an implementation, selection criteria for suggested expressions is based on contents of a received (and/or sent) electronic message.

As another example, the electronic device at block 1216 receives an electronic message, identifies at least one attribute of an ideogram that is embedded in the received electronic message, and displays the first ideogram (discussed in connection with at least block 1202 of FIG. 12) as a suggested ideogram based on the at least one attribute of the ideogram that is embedded in the received electronic message. For example, a text message received by the electronic device contains a "heart" emoji character, and an end-user is navigating a system-generated list of emoji characters while composing a response. It is contemplated that that list is populated with a set of "people in love" emoji characters, a set of "happy face" emoji characters, and etc., where each emoji character presented in the list is selected based on the "heart" emoji character. In practice, the at least one attribute of the ideogram that is embedded in the received electronic message corresponds to a numerical value that is unique to the ideogram, and at least that numerical value is leveraged in order to provide relevant ideogram recommendations. For example, (1) the "heart" emoji character that is in the received electronic has an attribute numerical value "D" (2) a look-up is performed by the electronic device using "D" as a query term (3) query results include various emoji characters or categories of emoji characters that are linked or associated with the "heart" emoji character and (4) suggested emoji characters are displayed by the electronic device as a recommendation, possibly in a particular order or ordering, such as most-to-least relevant, or grouped according to emoji themes or categories. Advantageously, in such an implementation, selection criteria for suggested ideograms is based on contents of a received (and/or sent) electronic message.

As another example, the electronic device at block 1216 receives an electronic message, identifies at least one constituent of a textual string that is embedded in the received electronic message, and displays the first ideogram (discussed in connection with at least block 1202 of FIG. 12) as a suggested ideogram based on the at least one constituent of the textual string that is embedded in the received electronic message. For example, a text message received by the electronic device contains the textual string "I'M ANGRY WITH YOU", and an end-user is navigating a system-generated list of emoji characters while composing a response. It is contemplated that that list is populated with a set of "broken heart" emoji characters, a set of "sad face" emoji characters, and etc., where each emoji character in the list is selected based on the "I'M ANGRY WITH YOU" text. In practice, the textual string is parsed and each word is identified in order to provide relevant ideogram recommendations. For example, (1) the textual string is parsed and the terms "I'm" and "angry" and etc. are identified (2) a look-up is performed by the electronic device to identify emoji characters that have an "angry" sentiment-type metadata associated therewith, and/or variants such as "upset" and "mad" (3) query results include various emoji characters or categories of emoji characters that are linked or associated with the "angry" sentiment-type metadata and (4) suggested emoji characters are displayed by the electronic device as a recommendation, possibly in a particular order or ordering, such as most-to-least relevant, or grouped according to emoji themes or categories. Advantageously, in such an implementation, selection criteria for suggested ideograms are based on contents of a received (and/or sent) electronic message.

As another example, the electronic device at block 1216, prior to detecting the first input, identifies the first ideogram based on at least one determined characteristic of a custom ideogram detected as an input on the touch-sensitive surface, and displays the first ideogram as a suggested ideogram. For example, an end-user is navigating a system-generated list of emoji characters while composing a message. It is contemplated that that list is populated with a set of "smiley face" emoji characters, a set of "thumbs-up" emoji characters, and etc., where each emoji character in the list is selected based on a custom user-drawn emoji character. For example, the electronic device detects one or more touch gestures on the touch-sensitive surface and identifies a "circle" that represents a face, along with a "U" that represents a smile, of the custom user-drawn emoji, and then determines or identifies a match between such characteristics and like or similar characteristics of each emoji character known or otherwise accessible to the electronic device. For example, (1) each identified characteristic of a custom user-drawn emoji is mapped to a particular "value" such as "0" for "face" and "1" for "smile" (2) a look-up is performed by the electronic device to identify emoji characters that have those values associated therewith, with those values defined in metadata (3) query results include emoji characters that have those values associated therewith and (4) those emoji characters are displayed as a recommendation, possibly in a particular order or ordering, such as most-to-least relevant, or grouped according to emoji themes or categories. Advantageously, in such an implementation, selection criteria for suggested ideograms is based on characteristics of a custom user-drawn emoji character.

As another example, the electronic device at block 1216 displays the selected first set of suggested one or more characters with a visual appearance based on at least one of the at least one attribute of the first ideogram and the at least one attribute of the second ideogram. For example, a particular phrase "I LOVE YOU" is displayed by the electronic device with a first visual appearance if displayed with a first emoji, but displayed with a second visual appearance if displayed with a second different emoji. It is contemplated that the "visual appearance" of the particular phrase might relate to position or location of the particular phrase with respect to a particular emoji, such as positioned to the left/right or top/bottom of the particular emoji, might relate to color/size/font of the particular message, and/or might relate to "how" the particular message is displayed, such as being displayed similar to a scrolling marquee billboard/ticker. Advantageously, in such an implementation, juxtaposition and/or appearance of a particular selected expression with respect to a selected emoji character is based on the selected emoji character.

As another example, the electronic device at block 1216 generates a third ideogram based on the least one attribute of the first ideogram and the at least one attribute of the second ideogram, and displays the third ideogram together with the selected first set of suggested one or more characters. For example, the first ideogram corresponds to a "smiley face" emoji character and the second ideogram corresponds to an "apple" emoji character. It is contemplated that a "combined" emoji character is generated and displayed by the electronic device, whereby the combined emoji character is static or animated. An example of an animated emoji character includes the "smiley face" emoji character taking a bite of the "apple" emoji character, played-back at least once or in a periodic loop. Additionally, it is contemplated that an expressions such as "I LOVE APPLE(S)" is displayed together with the combined emoji character. It is contemplated that a numerical value "E" that is unique to the "smiley face" emoji character, and a numerical value "F" that is unique to the "apple" emoji character, is used by the electronic device to (1) determine that the "smiley face" emoji character and the "apple" emoji character are combinable and (2) generate or retrieve the combined emoji character.

It should be understood that the particular order in which the operations in FIGS. 11-12 have been described is merely exemplary and is not intended to indicate that the described order is the only order in which the operations could be performed. One of ordinary skill in the art will recognize various ways to reorder the operations described herein. Additionally, it should be noted that processes 1100 and 1200 can incorporate additional functionalities described above with respect to FIGS. 1A-10G to produce new, additional, and/or alternative processes and user interfaces.

Figure 13:
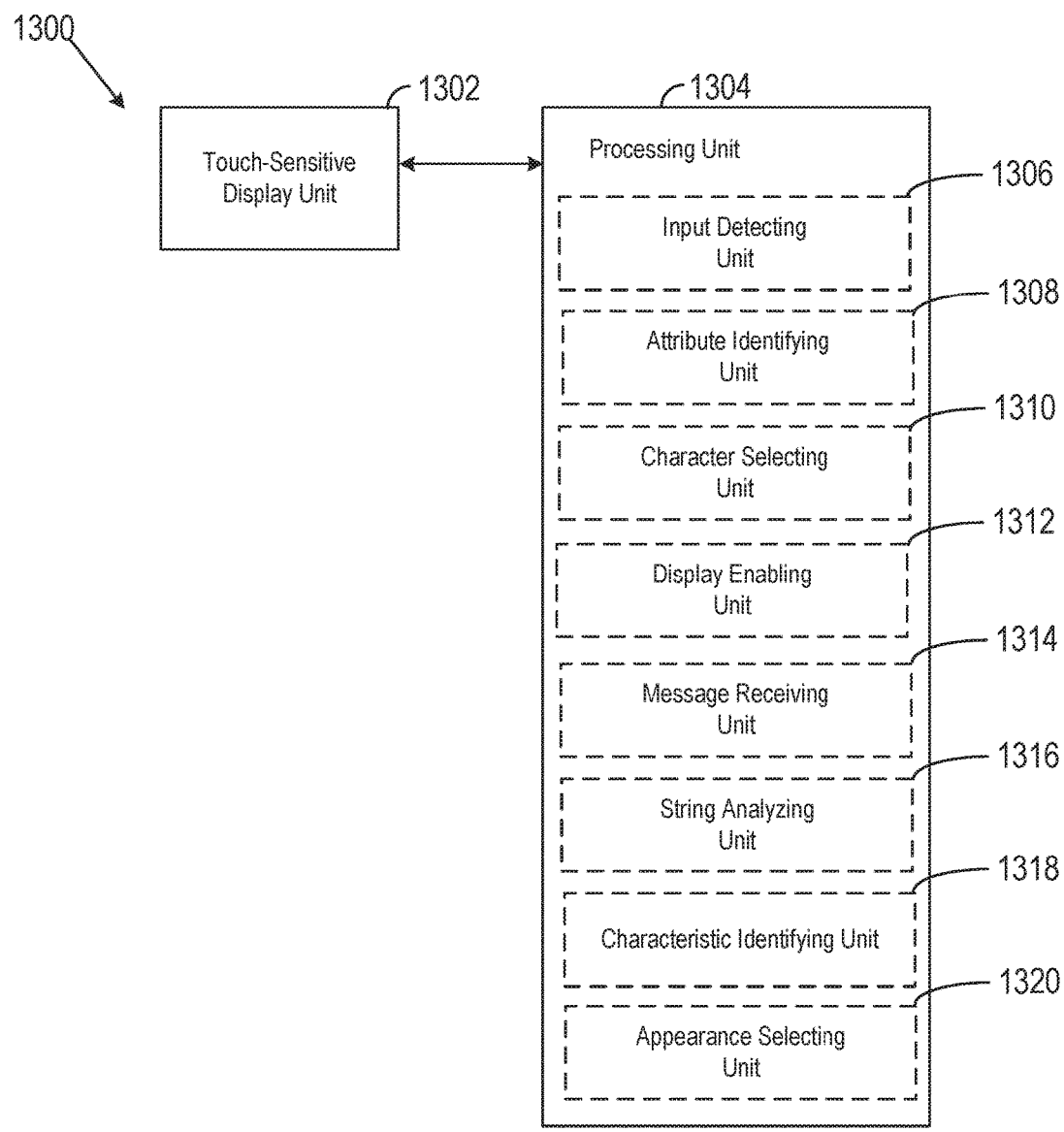
FIG. 13 is a functional block diagram of an electronic device in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, the electronic device 1300 includes a touch-sensitive display unit 1302 configured to display a graphic user interface and to receive contacts (indications of finger contacts with the touch sensitive display unit 1302), and a processing unit 1304 coupled to the touch-sensitive display unit 1302. In some embodiments, the processing unit 1304 includes an input detecting unit 1306, an attribute identifying unit 1308, a character selecting unit 1310, a display enabling unit 1312, a message receiving unit 1314, a string analyzing unit 1316, a characteristic identifying unit 1318, and an appearance selecting unit 1320.

In some embodiments, the processing unit 1304 is configured to: detect (e.g., using input detecting unit 1306) a first input on the touch-sensitive surface that represents selection of a first ideogram; identify (e.g., using attribute identifying unit 1308) at least one attribute of the first ideogram; select (e.g., using character selecting unit 1310) a plurality of suggested one or more characters to display, where at least a first set of suggested one or more characters is selected based on a set of selection criteria, the set of selection criteria including the identified at least one attribute of the first ideogram; display (e.g., using display enabling unit 1312) at least the first set of suggested one or more characters; detect (e.g., using input detecting unit 1306) a second input on the touch-sensitive surface that represents selection of the displayed first set of suggested one or more characters; and in response to detecting the second input, display (e.g., using display enabling unit 1312) a composed electronic message, the composed electronic message including the first ideogram and the selected first set of suggested one or more characters.

In some embodiments, the processing unit 1304 is further configured to: prior to detecting the first input, receive (e.g., using message receiving unit 1314) an electronic message; and identify (e.g., attribute identifying unit 1308) at least one attribute of an ideogram that is embedded in the received electronic message; the set of selection criteria further includes the at least one attribute of the ideogram that is embedded in the received electronic message.

In some embodiments, the processing unit 1304 is further configured to: prior to detecting the first input, receive (e.g., using message receiving unit 1314) an electronic message; and identify (e.g., using string analyzing unit 1316) at least one constituent of a textual string that is embedded in the received electronic message; the set of selection criteria further includes the at least one constituent of the textual string that is embedded in the received electronic message.

In some embodiments, the processing unit 1304 is further configured to: receive (e.g., using message receiving unit 1314) an electronic message; identify (e.g., using attribute identifying unit 1308) an attribute of an ideogram that is embedded in the received electronic message; and display (e.g., using display enabling unit 1312) the first ideogram as a suggested ideogram based on at least the attribute of the ideogram that is embedded in the received electronic message.

In some embodiments, the processing unit 1304 is further configured to: receive (e.g., using message receiving unit 1314) an electronic message; identify (e.g., using string analyzing unit 1316) at least one constituent of a textual string that is embedded in the received electronic message; and display (e.g., using display enabling unit 1312) the first ideogram as a suggested ideogram based on at least the at least one constituent of the textual string that is embedded in the received electronic message.

In some embodiments, the processing unit 1304 is further configured to: prior to detecting the first input, identify (e.g., using a characteristic identifying unit 1318) the first ideogram based on at least one determined characteristic of a custom ideogram detected as an input on the touch-sensitive surface; and display (e.g., using display enabling unit 1312) the first ideogram as a suggested ideogram.

In some embodiments, the processing unit 1304 is further configured to: display (e.g., using display enabling unit 1312) the selected first set of suggested one or more characters with a visual appearance based on the at least one attribute of the first ideogram.

The operations described above with reference to FIG. 11 are, optionally, implemented by components depicted in FIG. 1A-1B, 3, 5A, or 13. For example, the detecting operation 1102, identifying operation 1104, selecting operation 1106, displaying operation 1108, detecting operation 1110, and displaying operation 1112 are, optionally, implemented by event sorter 170, event recognizer 180, and event handler 190. Event monitor 171 in event sorter 170 detects a contact on touch-sensitive display 112, and event dispatcher module 174 delivers the event information to application 136. A respective event recognizer 180 of application 136 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3, 5A, and/or 13.

Figure 14:
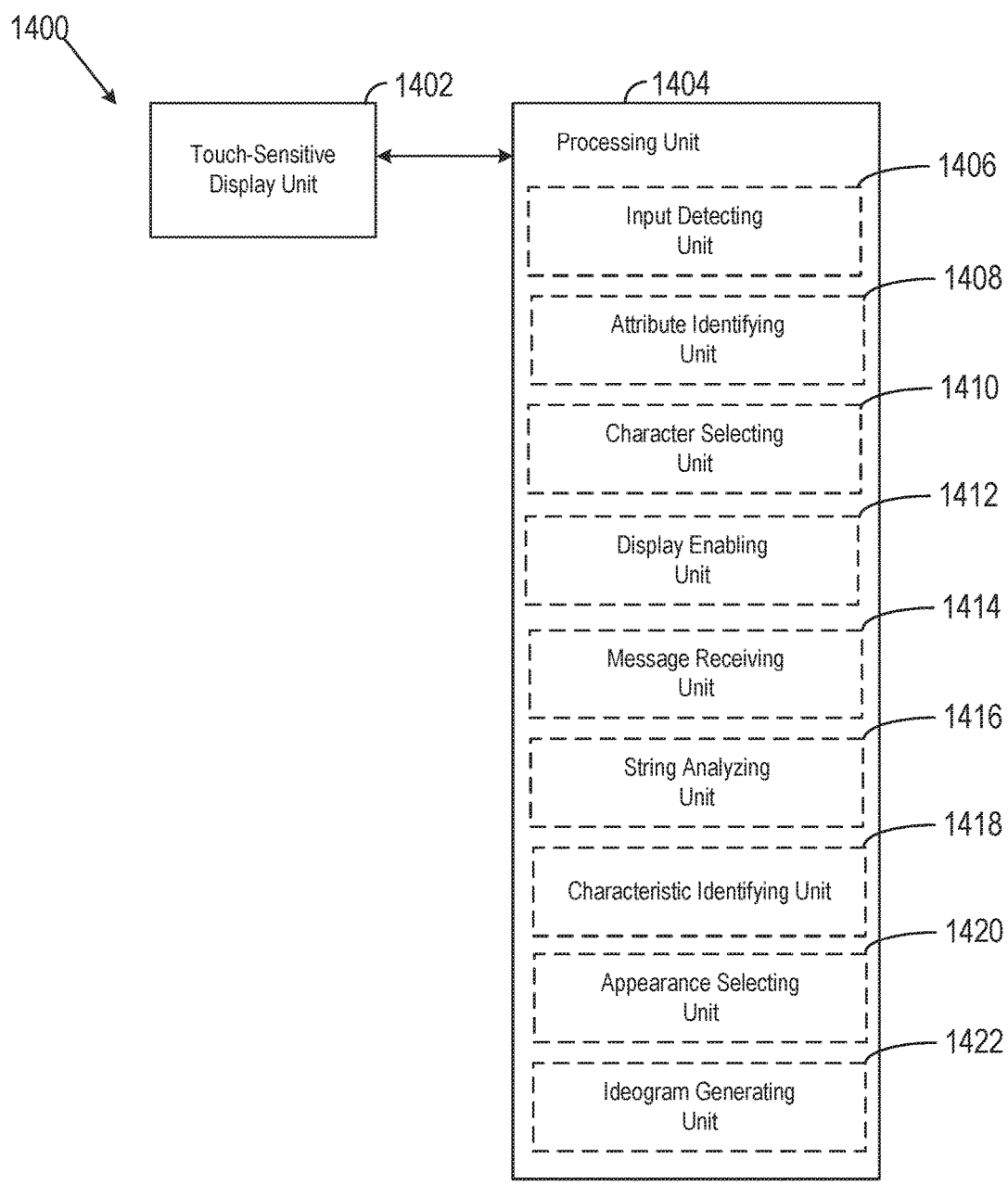
FIG. 14 is a functional block diagram of an electronic device in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, the electronic device 1400 includes a touch-sensitive display unit 1402 configured to display a graphic user interface and to receive contacts (indications of finger contacts with the touch sensitive display unit 1402), and a processing unit 1404 coupled to the touch-sensitive display unit 1402. In some embodiments, the processing unit 1404 includes an input detecting unit 1406, an attribute identifying unit 1408, a character selecting unit 1410, a display enabling unit 1412, a message receiving unit 1414, a string analyzing unit 1416, a characteristic identifying unit 1418, an appearance selecting unit 1420, and an ideogram generating unit 1422.

In some embodiments, the processing unit 1404 is configured to: detect (e.g., using input detecting unit 1406) a first input on the touch-sensitive surface selecting a first ideogram; detect (e.g., using input detecting unit 1406) a second input on the touch-sensitive surface selecting a second ideogram; identify (e.g., using attribute identifying unit 1408) at least one attribute of the first ideogram and at least one attribute of the second ideogram; select (e.g., using character selecting unit 1410) a plurality of suggested one or more characters to display, where at least a first set of suggested one or more characters is selected based on a set of selection criteria, the set of selection criteria including the identified at least one attribute of the first ideogram and the identified at least one attribute of the second ideogram; display (e.g., using display enabling unit 1412) at least the first set of suggested one or more characters; detect (e.g., using input detecting unit 1406) a third input on the touch-sensitive surface selecting the displayed first set of suggested one or more characters; and in response to detecting the third input, display (e.g., using display enabling unit 1412) a composed electronic message, the composed electronic message including the first ideogram, the second ideogram, and the selected first set of suggested one or more characters.

In some embodiments, the processing unit 1404 is further configured to: receive (e.g., using message receiving unit 1414) an electronic message; and identify (e.g., using attribute identifying unit 1408) at least one attribute of an ideogram that is embedded in the received electronic message; the set of selection criteria further includes the at least one attribute of the ideogram that is embedded in the received electronic message.

In some embodiments, the processing unit 1404 is further configured to: receive (e.g., using message receiving unit 1414) an electronic message; and identify (e.g., using string analyzing unit 1416) at least one constituent of a textual string that is embedded in the received electronic message, the set of selection criteria further includes the at least one constituent of the textual string that is embedded in the received electronic message.

In some embodiments, the processing unit 1404 is further configured to: receive (e.g., using message receiving unit 1414) an electronic message; identify (e.g., using attribute identifying unit 1408) at least one attribute of an ideogram that is embedded in the received electronic message; and display (e.g., using display enabling unit 1412) the first ideogram as a suggested ideogram based on the at least one attribute of the ideogram that is embedded in the received electronic message.

In some embodiments, the processing unit 1404 is further configured to: receive (e.g., using message receiving unit 1414) an electronic message; identify (e.g., using string analyzing unit 1416) at least one constituent of a textual string that is embedded in the received electronic message; and display (e.g., using display enabling unit 1412) the first ideogram as a suggested ideogram based on the at least one constituent of the textual string that is embedded in the received electronic message.

In some embodiments, the processing unit 1404 is further configured to: prior to detecting the first input, identify (e.g., using characteristic identifying unit 1418) the first ideogram based on at least one determined characteristic of a custom ideogram detected as an input on the touch-sensitive surface; and display (e.g., using display enabling unit 1412) the first ideogram as a suggested ideogram.

In some embodiments, the processing unit 1404 is further configured to: display (e.g., using display enabling unit 1412; appearance selecting unit 1420) the selected first set of suggested one or more characters with a visual appearance based on at least one of the at least one attribute of the first ideogram and the at least one attribute of the second ideogram.

In some embodiments, the processing unit 1404 is further configured to: generate (e.g., using ideogram generating unit 1422) a third ideogram based on the least one attribute of the first ideogram and the at least one attribute of the second ideogram; and display (e.g., using display enabling unit 1412) the third ideogram together with the selected first set of suggested one or more characters.

The operations described above with reference to FIG. 12 are, optionally, implemented by components depicted in FIG. 1A-1B, 3, 5A, or 14. For example, the detecting operation 1202, detecting operation 1204, identifying operation 1206, selecting operation 1208, displaying operation 1210, detecting operation 1212, and displaying operation 1214 are, optionally, implemented by event sorter 170, event recognizer 180, and event handler 190. Event monitor 171 in event sorter 170 detects a contact on touch-sensitive display 112, and event dispatcher module 174 delivers the event information to application 136. A respective event recognizer 180 of application 136 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3, 5A, and/or 14.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A non-transitory computer-readable storage medium storing one or more programs configured to be executed by one or more processors of an electronic device with a touch-sensitive surface, the one or more programs including instructions for:

displaying, on a display, an ideogram keyboard, wherein the ideogram keyboard includes a plurality of ideograms, wherein the ideogram keyboard is displayed in a first area on the display;

detecting a first input on the touch-sensitive surface that represents selection of a first ideogram from the plurality of ideograms;

in response to detecting a first input on the touch-sensitive surface, displaying the first ideogram in a second area on the display;

identifying at least one attribute of the first ideogram;

determining a plurality of suggested one or more characters to display, wherein at least a first set of suggested one or more characters is selected based on a set of selection criteria, the set of selection criteria including the identified at least one attribute of the first ideogram;

in response to determining a plurality of suggested one or more characters to display, displaying at least the first set of suggested one or more characters in a third area;

detecting a second input on the touch-sensitive surface that represents selection of the displayed first set of suggested one or more characters; and in response to detecting the second input, displaying a composed electronic message in the second area, the composed electronic message including the first ideogram and the selected first set of suggested one or more characters, wherein the first area, the second area, and the third area are different areas on the display.

2. The non-transitory computer-readable storage medium of claim 1, further comprising instructions for:

prior to detecting the first input, receiving an electronic message; and identifying at least one attribute of an ideogram that is embedded in the received electronic message; and wherein the set of selection criteria further includes the at least one attribute of the ideogram that is embedded in the received electronic message.

3. The non-transitory computer-readable storage medium of claim 1, further comprising instructions for:

prior to detecting the first input, receiving an electronic message; and identifying at least one constituent of a textual string that is embedded in the received electronic message; and wherein the set of selection criteria further includes the at least one constituent of the textual string that is embedded in the received electronic message.

4. The non-transitory computer-readable storage medium of claim 1, further comprising instructions for:

receiving an electronic message;

identifying an attribute of an ideogram that is embedded in the received electronic message; and displaying the first ideogram as a suggested ideogram based on at least the attribute of the ideogram that is embedded in the received electronic message.

5. The non-transitory computer-readable storage medium of claim 1, further comprising instructions for:

receiving an electronic message;

identifying at least one constituent of a textual string that is embedded in the received electronic message; and displaying the first ideogram as a suggested ideogram based on at least the at least one constituent of the textual string that is embedded in the received electronic message.

6. The non-transitory computer-readable storage medium of claim 1, further comprising instructions for:

prior to detecting the first input:

identifying the first ideogram based on at least one determined characteristic of a custom ideogram detected as an input on the touch-sensitive surface; and displaying the first ideogram as a suggested ideogram.

7. The non-transitory computer-readable storage medium of claim 1, wherein displaying the composed electronic message includes displaying the selected first set of suggested one or more characters with a visual appearance based on the at least one attribute of the first ideogram.

8. An electronic device, comprising:

a touch-sensitive surface;

one or more processors;

a memory; and one or more programs, wherein the one or more programs are stored in the memory and are configured to be executed by the one or more processors, the one or more programs including instructions for:

displaying, on a display, an ideogram keyboard, wherein the ideogram keyboard includes a plurality of ideograms, wherein the ideogram keyboard is displayed in a first area on the display;

detecting a first input on the touch-sensitive surface that represents selection of a first ideogram from the plurality of ideograms;

in response to detecting a first input on the touch-sensitive surface, displaying the first ideogram in a second area on the display;

identifying at least one attribute of the first ideogram;

determining a plurality of suggested one or more characters to display, wherein at least a first set of suggested one or more characters is selected based on a set of selection criteria, the set of selection criteria including the identified at least one attribute of the first ideogram;

in response to determining a plurality of suggested one or more characters to display, displaying at least the first set of suggested one or more characters in a third area;

detecting a second input on the touch-sensitive surface that represents selection of the displayed first set of suggested one or more characters; and in response to detecting the second input, displaying a composed electronic message in the second area, the composed electronic message including the first ideogram and the selected first set of suggested one or more characters, wherein the first area, the second area, and the third area are different areas on the display.

9. The electronic device of claim 8, the one or more programs further including instructions for:

prior to detecting the first input, receiving an electronic message; and identifying at least one attribute of an ideogram that is embedded in the received electronic message; and wherein the set of selection criteria further includes the at least one attribute of the ideogram that is embedded in the received electronic message.

10. The electronic device of claim 8, the one or more programs further including instructions for:

prior to detecting the first input, receiving an electronic message; and identifying at least one constituent of a textual string that is embedded in the received electronic message; and wherein the set of selection criteria further includes the at least one constituent of the textual string that is embedded in the received electronic message.

11. The electronic device of claim 8, the one or more programs further including instructions for:

receiving an electronic message;

identifying an attribute of an ideogram that is embedded in the received electronic message; and displaying the first ideogram as a suggested ideogram based on at least the attribute of the ideogram that is embedded in the received electronic message.

12. The electronic device of claim 8, the one or more programs further including instructions for:

receiving an electronic message;

identifying at least one constituent of a textual string that is embedded in the received electronic message; and displaying the first ideogram as a suggested ideogram based on at least the at least one constituent of the textual string that is embedded in the received electronic message.

13. The electronic device of claim 8, the one or more programs further including instructions for:
prior to detecting the first input:
identifying the first ideogram based on at least one determined characteristic of a custom ideogram detected as an input on the touch-sensitive surface; and
displaying the first ideogram as a suggested ideogram.

14. The electronic device of claim 8, wherein displaying the composed electronic message includes displaying the selected first set of suggested one or more characters with a visual appearance based on the at least one attribute of the first ideogram.

15. A method, comprising:
at an electronic device with a touch-sensitive surface:
displaying, on a display, an ideogram keyboard, wherein the ideogram keyboard includes a plurality of ideograms, wherein the ideogram keyboard is displayed in a first area on the display;
detecting a first input on the touch-sensitive surface that represents selection of a first ideogram from the plurality of ideograms;
in response to detecting a first input on the touch-sensitive surface, displaying the first ideogram in a second area on the display;
identifying at least one attribute of the first ideogram;
determining a plurality of suggested one or more characters to display, wherein at least a first set of suggested one or more characters is selected based on a set of selection criteria, the set of selection criteria including the identified at least one attribute of the first ideogram;
in response to determining a plurality of suggested one or more characters to display, displaying at least the first set of suggested one or more characters in a third area;
detecting a second input on the touch-sensitive surface that represents selection of the displayed first set of suggested one or more characters; and
in response to detecting the second input, displaying a composed electronic message in the second area, the composed electronic message including the first ideogram and the selected first set of suggested one or more characters,
wherein the first area, the second area, and the third area are different areas on the display.

16. The method of claim 15, further comprising:
prior to detecting the first input, receiving an electronic message; and
identifying at least one attribute of an ideogram that is embedded in the received electronic message; and
wherein the set of selection criteria further includes the at least one attribute of the ideogram that is embedded in the received electronic message.

17. The method of claim 15, further comprising:
prior to detecting the first input, receiving an electronic message; and
identifying at least one constituent of a textual string that is embedded in the received electronic message; and
wherein the set of selection criteria further includes the at least one constituent of the textual string that is embedded in the received electronic message.

18. The method of claim 15, further comprising:
receiving an electronic message;
identifying an attribute of an ideogram that is embedded in the received electronic message; and
displaying the first ideogram as a suggested ideogram based on at least the attribute of the ideogram that is embedded in the received electronic message.

19. The method of claim 15, further comprising:
receiving an electronic message;
identifying at least one constituent of a textual string that is embedded in the received electronic message; and
displaying the first ideogram as a suggested ideogram based on at least the at least one constituent of the textual string that is embedded in the received electronic message.

20. The method of claim 15, further comprising:
prior to detecting the first input:
identifying the first ideogram based on at least one determined characteristic of a custom ideogram detected as an input on the touch-sensitive surface; and
displaying the first ideogram as a suggested ideogram.

21. The method of claim 15, wherein displaying the composed electronic message includes displaying the selected first set of suggested one or more characters with a visual appearance based on the at least one attribute of the first ideogram.

* * * * *

UNITED STATES PATENT AND TRADEMARK OFFICE
CERTIFICATE OF CORRECTION

| | | |
|---|---|---|
| PATENT NO. | : 10,445,425 B2 | Page 1 of 1 |
| APPLICATION NO. | : 15/188081 | |
| DATED | : October 15, 2019 | |
| INVENTOR(S) | : Tiffany S. Jon | |

It is certified that error appears in the above-identified patent and that said Letters Patent is hereby corrected as shown below:

In the Claims

In Column 47, Line 46, Claim 5, delete "at least the at least" and insert -- the at least --, therefor.
In Column 49, Line 2, Claim 12, delete "at least the at least" and insert -- the at least --, therefor.
In Column 50, Line 33, Claim 19, delete "at least the at least" and insert -- the at least --, therefor.

Signed and Sealed this
Twenty-sixth Day of November, 2019

Andrei Iancu
*Director of the United States Patent and Trademark Office*